United States Patent
Kverel et al.

(10) Patent No.: US 9,777,132 B2
(45) Date of Patent: *Oct. 3, 2017

(54) APPLICATIONS FOR INORGANIC FULLERENE-LIKE PARTICLES

(71) Applicant: Nanotech Industrial Solutions, Inc., Avenel, NJ (US)

(72) Inventors: Eugene Kverel, New York, NY (US); George Diloyan, Cranford, NJ (US)

(73) Assignee: NANOTECH INDUSTRIAL SOLUTIONS, INC., Avenel, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,424

(22) Filed: Sep. 19, 2016

(65) Prior Publication Data

US 2017/0002173 A1 Jan. 5, 2017

Related U.S. Application Data

(63) Continuation of application No. 14/826,692, filed on Aug. 14, 2015, now Pat. No. 9,446,965.

(60) Provisional application No. 62/038,104, filed on Aug. 15, 2014.

(51) Int. Cl.
| | |
|---|---|
| *C08K 3/30* | (2006.01) |
| *C01G 41/00* | (2006.01) |
| *C10M 111/04* | (2006.01) |
| *C01G 39/06* | (2006.01) |
| *C01B 19/00* | (2006.01) |
| *C01G 1/02* | (2006.01) |
| *C01G 1/12* | (2006.01) |
| *C09D 7/12* | (2006.01) |
| *C09D 163/00* | (2006.01) |
| *C09K 8/03* | (2006.01) |
| *C10M 125/22* | (2006.01) |
| *B82Y 30/00* | (2011.01) |
| *B82Y 40/00* | (2011.01) |

(52) U.S. Cl.
CPC ............ *C08K 3/30* (2013.01); *C01B 19/00* (2013.01); *C01G 1/02* (2013.01); *C01G 1/12* (2013.01); *C01G 39/06* (2013.01); *C01G 41/00* (2013.01); *C09D 7/1216* (2013.01); *C09D 163/00* (2013.01); *C09K 8/032* (2013.01); *C10M 111/04* (2013.01); *C10M 125/22* (2013.01); *B82Y 30/00* (2013.01); *B82Y 40/00* (2013.01); *C01P 2004/32* (2013.01); *C01P 2004/61* (2013.01); *C01P 2004/62* (2013.01); *C01P 2004/64* (2013.01); *C08K 2003/3009* (2013.01); *C10M 2201/065* (2013.01); *Y10S 977/734* (2013.01); *Y10S 977/753* (2013.01); *Y10S 977/842* (2013.01)

(58) Field of Classification Search
CPC ... C01G 41/00; C10M 111/04; C01P 2004/64; C01P 2004/61; Y10S 977/734; Y10S 977/753; B82Y 30/00; Y10T 428/2982
USPC ...... 428/402, 404; 423/324, 561.1; 508/167; 525/330.3; 556/9, 57; 977/734, 753
See application file for complete search history.

(56) References Cited

U.S. PATENT DOCUMENTS

| | | |
|---|---|---|
| 6,217,843 B1 | 4/2001 | Homyonfer et al. |
| 6,710,020 B2 | 3/2004 | Tenne et al. |
| 6,841,142 B1 | 1/2005 | Tenne et al. |
| 7,018,606 B2 | 3/2006 | Tenne et al. |
| 7,524,481 B2 | 4/2009 | Tenne et al. |
| 7,641,869 B2 | 1/2010 | Tenne et al. |
| 7,641,886 B2 | 1/2010 | Tenne et al. |
| 7,959,891 B2 | 6/2011 | Tenne et al. |
| 8,329,138 B2 | 12/2012 | Tenne et al. |
| 8,513,364 B2 | 8/2013 | Sasabe et al. |
| 9,446,965 B2 * | 9/2016 | Kverel ............... C01G 1/02 |
| 2006/0120947 A1 | 6/2006 | Tenne et al. |
| 2010/0172823 A1 | 7/2010 | Tenne et al. |
| 2010/0227782 A1 | 9/2010 | Tenne et al. |
| 2013/0109601 A1 | 5/2013 | Tenne et al. |
| 2014/0231145 A1 * | 8/2014 | Kverel ............... C09K 8/032 |
| | | 175/65 |
| 2014/0231148 A1 * | 8/2014 | Kverel ............... C10M 125/22 |
| | | 175/320 |
| 2014/0235513 A1 * | 8/2014 | Kverel ............... C10M 125/22 |
| | | 508/103 |

FOREIGN PATENT DOCUMENTS

| | | | |
|---|---|---|---|
| WO | WO98/23796 | * | 6/1998 |
| WO | WO01/66462 | * | 9/2001 |
| WO | WO2011/161676 | * | 12/2011 |

* cited by examiner

*Primary Examiner* — Leszek Kiliman
(74) *Attorney, Agent, or Firm* — Tutunjian & Bitetto, P.C.

(57) ABSTRACT

A nanostructure that includes a multi-layered fullerene-like nano-structure composed of a plurality of layers each having a metal chalcogenide composition that has a molecular formula of $MX_2$, in which M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. An outer layer of the multi-layered fullerene-like structure includes at least one sectioned portion that extends along a direction away from the curvature of the multi-layered fullerene-like nano-structure.

20 Claims, 17 Drawing Sheets

APPLICATIONS FOR INORGANIC FULLERENE-LIKE PARTICLES

CROSS REFERENCE TO RELATED APPLICATIONS

This application is a continuation of U.S. patent application Ser. No. 14/826,692 filed Aug. 14, 2015, which claims the benefit of U.S. Provisional Application No. 62/038,104 filed Aug. 15, 2014 titled "Applications for Inorganic Fullerene-like Particles", which is incorporated herein in its entirety by reference.

This application is related to U.S. patent application Ser. No. 14/180,927, filed on Feb. 14, 2014, which claims the benefit of U.S. Provisional Application No. 61/766,898 filed on Feb. 20, 2013, titled "Coating Including Inorganic Fullerene-like Particles and Inorganic Tubular-like Particles", and is related to U.S. patent application Ser. No. 14/180,955, filed on Feb. 14, 2014, which claims the benefit of U.S. Provisional Application No. 61/766,399 filed on Feb. 19, 2013, titled "Composite Materials Including Fullerene-like Hollow Particles and Inorganic Tubular-like Particles in a Polymer Matrix", each of which are incorporated herein in their entirety by reference. The application is also related to U.S. patent application Ser. No. 14/182,949, filed on Feb. 18, 2014, which claims the benefit of U.S. Provisional Application No. 61/766,431 filed on Feb. 19, 2013, titled "Inorganic Fullerene-like Particles and Inorganic Tubular-like Particles in Fluids and Lubricants and Applications to Subterranean Drilling", each of which are incorporated herein in its entirety by reference.

FIELD OF THE INVENTION

The present disclosure relates to fullerene like particles.

SUMMARY OF THE INVENTION

In one embodiment of the present disclosure, a nanostructure is provided that includes a multi-layered fullerene-like nano-structure comprising a plurality of layers each comprised of an metal chalcogenide composition has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The outer layer of the multi-layered fullerene-like structure comprises at least one sectioned portion. The at least one sectioned portion extends along a direction away from the curvature of the multi-layered fullerene-like nano-structure, and the at least one sectioned portion engaged to remaining section of the outer layer.

In another embodiment, the present disclosure provides a lubricant. The lubricant may include a fluid medium; and at least one intercalation compound of a metal chalcogenide having molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The intercalation compound has a multi-layered fullerene-like geometry. An outer layer of the multi-layered fullerene-like geometry comprises at least one sectioned portion. The at least one sectioned portion extends along a direction away from the curvature of the multi-layered fullerene-like geometry, and the at least one sectioned portion is engaged to remaining section of the outer layer. The lubricant may further comprise a functionalizing agent. In some other embodiments, the metal chalcogenide has a fullerene-like geometry, e.g., substantially spherical fullerene-like geometry, that does not include the sectioned outer layer, and/or the metal chalcogenide has a tubular-like geometry. The fullerene-like geometry without the sectioned outer layer may be substituted for the fullerene-like geometry with the sectioned layer, or the two different geometries may be employed together in the drilling fluid, with or without the metal chalcogenide having the tubular-like geometry.

In yet another embodiment, the present disclosure provides a drilling fluid that includes a drilling fluid medium selected from the group consisting of water, air and water, air and foaming agent, a water based mud, an oil based mud, a synthetic based fluid, and a combination thereof; and at least one intercalation compound of a metal chalcogenide. The metal chalcogenide has the molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and a combination thereof, and X is a chalcogen element selected from the group consisting of sulfur (S), selenium (Se), tellurium (Te), oxygen (O) and a combination thereof. The intercalation compound has a multi-layered fullerene-like geometry, wherein an outer layer of the multi-layered fullerene-like geometry comprises at least one sectioned portion. The at least one sectioned portion extends along a direction away from the curvature of the multi-layered fullerene-like geometry, and the at least one sectioned portion engaged to remaining section of the outer layer. In some other embodiments, the intercalation compound has a fullerene-like geometry, e.g., substantially spherical fullerene-like geometry, that does not include the section outer layer, and/or the inorganic material of the metal chalcogenide has a tubular-like geometry. The fullerene-like geometry without the sectioned outer layer may be substituted for the fullerene-like geometry with the sectioned layer, or the two different geometries may be employed together in the drilling fluid, with or without the metal chalcogenide having the tubular-like geometry.

In a further embodiment, the present disclosure provides a subterranean drilling method that includes providing a drilling member; and applying the drilling member to a terrain an surface to form a subterranean wellbore. The subterranean drilling method may further include lubricating at least one of the subterranean wellbore and the drilling member with a drilling fluid including at least one intercalation compound of a metal chalcogenide having molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au) and mercury (Hg), and X is a chalcogen element selected from the group consisting of Sulfur (S), selenium (Se), tellurium (Te) and oxygen (O). The intercalation compound may have a multi-layered fullerene-like geometry, wherein an outer layer of the multi-layered fullerene-like geometry comprises at least one sectioned portion. The at least one sectioned portion extends along a direction away from the curvature of the multi-layered fullerene-like geometry, and the at least one sectioned portion engaged to remaining section of the outer layer. In some other embodiments, the intercalation compound has a fullerene-like geometry, e.g., substantially spherical fullerene-like geometry, that does not include the sectioned outer layer, and/or the intercalation compound has a tubular-like geometry. The fullerene-like geometry without the sectioned outer layer may be substituted for the fullerene-like geometry with the sectioned layer, or the two different geometries may be employed together in the drilling method, with or without the intercalation compound having the tubular-like geometry.

In yet further embodiment, the present disclosure provides a composite that includes a dispersed phase of an inorganic material of a metal chalcogenide composition with a multi-layered fullerene-like nano-structure that is present in a polymeric matrix, wherein the inorganic material of the metal chalcogenide has a molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. In some embodiments, an outer layer of the multi-layered fullerene-like geometry comprises at least one sectioned portion, the at least one sectioned portion extends along a direction away from the curvature of the multi-layered fullerene-like geometry, the at least one sectioned portion engaged to remaining section of the outer layer. In some other embodiments, the metal chalcogenide composition has a fullerene-like geometry, e.g., substantially spherical fullerene-like geometry, that does not include the sectioned outer layer, and/or the metal chalcogenide composition has a tubular-like geometry. The fullerene-like geometry without the sectioned outer layer may be substituted for the fullerene-like geometry with the sectioned layer, or the two different geometries may be employed together in the composite, with or without the metal chalcogenide having the tubular-like geometry.

In another embodiment, a drilling string is provided that includes a rotor and a stator within an external casing, the stator being composed of a composite having a dispersed phase of an inorganic material of a metal chalcogenide composition with a multi-layered fullerene-like geometry that is present in a polymeric matrix, wherein the inorganic material of the metal chalcogenide has a molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof, wherein an outer layer of the multi-layered fullerene-like geometry comprises at least one sectioned portion, the at least one sectioned portion extends along a direction away from the curvature of the multi-layered fullerene-like geometry, the at least one sectioned portion engaged to remaining section of the outer layer. In some other embodiments, the metal chalcogenide composition has a fullerene-like geometry, e.g., substantially spherical fullerene-like geometry, that does not include the sectioned outer layer, and/or the metal chalcogenide composition has a tubular-like geometry. The fullerene-like geometry without the sectioned outer layer may be substituted for the fullerene-like geometry with the sectioned layer, or the two different geometries may be employed together in the drill string, with or without the metal chalcogenide having the tubular-like geometry.

In yet another embodiment, the present disclosure provides a drill pipe for insertion into a wellbore that is produced by subterranean drilling with a drill string. The drill pipe may include a coating on an interior wall of the drill pipe that is composed of a composite having a dispersed phase of an inorganic material of a metal chalcogenide composition with a multi-layered fullerene-like geometry that is present in a polymeric matrix, wherein the inorganic material of the metal chalcogenide has a molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and x is a chalcogen element selected from the group consisting of sulfur (S), selenium (Se), tellurium (Te), oxygen (O) and combinations thereof. The outer layer of the multi-layered fullerene-like geometry comprises at least one sectioned portion. The at least one sectioned portion extends along a direction away from the curvature of the multi-layered fullerene-like geometry, and the at least one sectioned portion engaged to remaining section of the outer layer. In some other embodiments, the metal chalcogenide composition has a fullerene-like geometry, e.g., substantially spherical fullerene-like geometry, that does not include the sectioned outer layer, and/or the metal chalcogenide composition has a tubular-like geometry. The fullerene-like geometry without the sectioned outer layer may be substituted for the fullerene-like geometry with the sectioned layer, or the two different geometries may be employed together in the drill pipe, with or without the metal chalcogenide having the tubular-like geometry.

In a further embodiment, the present disclosure provides a coating. The coating may include a deposition surface; and a coating on the deposition surface. The coating including particles of a metal chalcogenide comprising a multi-layered fullerene-like geometry, wherein the metal chalcogenide composition has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof, wherein an outer layer of the multi-layered fullerene-like geometry comprises at least one sectioned portion, the at least one sectioned portion extends along a direction away from the curvature of the multi-layered fullerene-like geometry, the at least one sectioned portion engaged to remaining section of the outer layer. In some other embodiments, the metal chalcogenide composition has a fullerene-like geometry, e.g., substantially spherical fullerene-like geometry, that does not include the sectioned outer layer, and/or the metal chalcogenide composition has a tubular-like geometry. The fullerene-like geometry without the sectioned outer layer may be substituted for the fullerene-like geometry with the sectioned layer, or the two different geometries may be employed together in the coating, with or without the metal chalcogenide having the tubular-like geometry.

In yet a further embodiment, a deposition method is provided that include providing a deposition surface; and depositing by a physical vapor deposition (PVD) method a coating on the deposition surface. The coating including particles of a metal chalcogenide having a multi-layered fullerene-like geometry, wherein the metal chalcogenide composition has a molecular formula of $MX_2$ and M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. An outer layer of the multi-layered fullerene-like geometry comprises at least one sectioned portion. The at least one sectioned portion extends along a direction away from the curvature of the multi-layered fullerene-like geometry, and the at least one sectioned portion engaged to remaining section of the outer layer. In some other embodiments, the metal chalcogenide composition has a fullerene-like geometry, e.g., substantially spherical fullerene-like geometry, which does not include the sectioned outer layer, and/or the metal chalcogenide composition has a tubular-like geometry. The fullerene-like geometry without the sectioned outer layer may be substituted for the fullerene-like geometry with the sectioned layer, or the two different geometries may be employed together in the coating, with or without the metal chalcogenide having the tubular-like geometry.

In another embodiment, the coating method may include providing a deposition surface; and depositing by an electroplating method a coating on the deposition surface, the coating includes particles of a metal chalcogenide comprising a multi-layered fullerene-like geometry, wherein the metal chalcogenide composition has a molecular formula of $MX_2$ and M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof, wherein an outer layer of the multi-layered fullerene-like geometry comprises at least one sectioned portion. In some embodiments, the at least one sectioned portion extends along a direction away from the curvature of the multi-layered fullerene-like geometry, and the at least one sectioned portion engaged to remaining section of the outer layer. In some other embodiments, the metal chalcogenide composition has a fullerene-like geometry, e.g., substantially spherical fullerene-like geometry, which does not include the sectioned outer layer, and/or the metal chalcogenide composition has a tubular-like geometry. The fullerene-like geometry without the sectioned outer layer may be substituted for the fullerene-like geometry with the sectioned layer, or the two different geometries may be employed together in the coating, with or without the metal chalcogenide having the tubular-like geometry.

In another embodiment, a coating method is provided that includes providing a deposition surface; and depositing by solvent transport medium a coating on the deposition surface includes particles of a metal chalcogenide comprising a multi-layered fullerene-like geometry. The metal chalcogenide composition may have a molecular formula of $MX_2$ and M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof, wherein an outer layer of the multi-layered fullerene-like geometry comprises at least one sectioned portion. The at least one sectioned portion may extend along a direction away from the curvature of the multi-layered fullerene-like geometry, and the at least one sectioned portion engaged to remaining section of the outer layer. In some other embodiments, the metal chalcogenide composition has a fullerene-like geometry, e.g., substantially spherical fullerene-like geometry, which does not include the sectioned outer layer, and/or the metal chalcogenide composition has a tubular-like geometry. The fullerene-like geometry without the sectioned outer layer may be substituted for the fullerene-like geometry with the sectioned layer, or the two different geometries may be employed together in the coating, with or without the metal chalcogenide having the tubular-like geometry.

BRIEF DESCRIPTION OF THE DRAWINGS

The following detailed description, given by way of example and not intended to limit the disclosure solely thereto, will best be appreciated in conjunction with the accompanying drawings, wherein like reference numerals denote like elements and parts, in which.

DETAILED DESCRIPTION

Detailed embodiments of the present disclosure are described herein; however, it is to be understood that the disclosed embodiments are merely illustrative of the compositions, structures and methods of the disclosure that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the compositions, structures and methods disclosed herein. References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. When a numerical range is provided, the range includes each value within the range, as well as the end points of the range. Unless, specifically designated otherwise, as used herein, the term "fullerene-like" and "fullerene like" in the patent specification denote fullerene like particles including a sectioned outer layer and/or without a sectioned outer layer as described in the following portions titled "METAL CHALCOGENIDE FULLERENE-LIKE NANOPARTICLE AND METAL CHALCOGENIDE TUBULAR-LIKE GEOMETRY" and "MULTI-LAYERED FULLERENE-LIKE NANOPARTICLE STRUCTURE HAVING SECTIONED OUTER LAYER WITH SECTIONED PORTIONS PROTRUDING FROM THE SURFACE OF NANOPARTICLE".

Metal Chalcogenide Fullerene-Like Nanoparticle and Metal Chalcogenide Tubular-Like Geometry As used herein, the term "fullerene-like" denotes a substantially spherical geometry. In some instances, the fullerene-like structures may be perfectly spherical, i.e., having the form of a sphere. The spherical nature of the metal chalcogenide fullerene-like structures provided herein is distinguished from metal chalcogenide nanostructures that may be oblong, oval (e.g., open ended oval), football shaped, columnar shaped, plate-like shaped, or any irregularly shaped particle that deviates from being spherical which typically results from a method of reducing particle size physically, such as milling of particles from the macro and micron scale to the nanometer scale. Or the milling of particles from a larger nanoscale size to a less nanoscale size.

Figure 1:
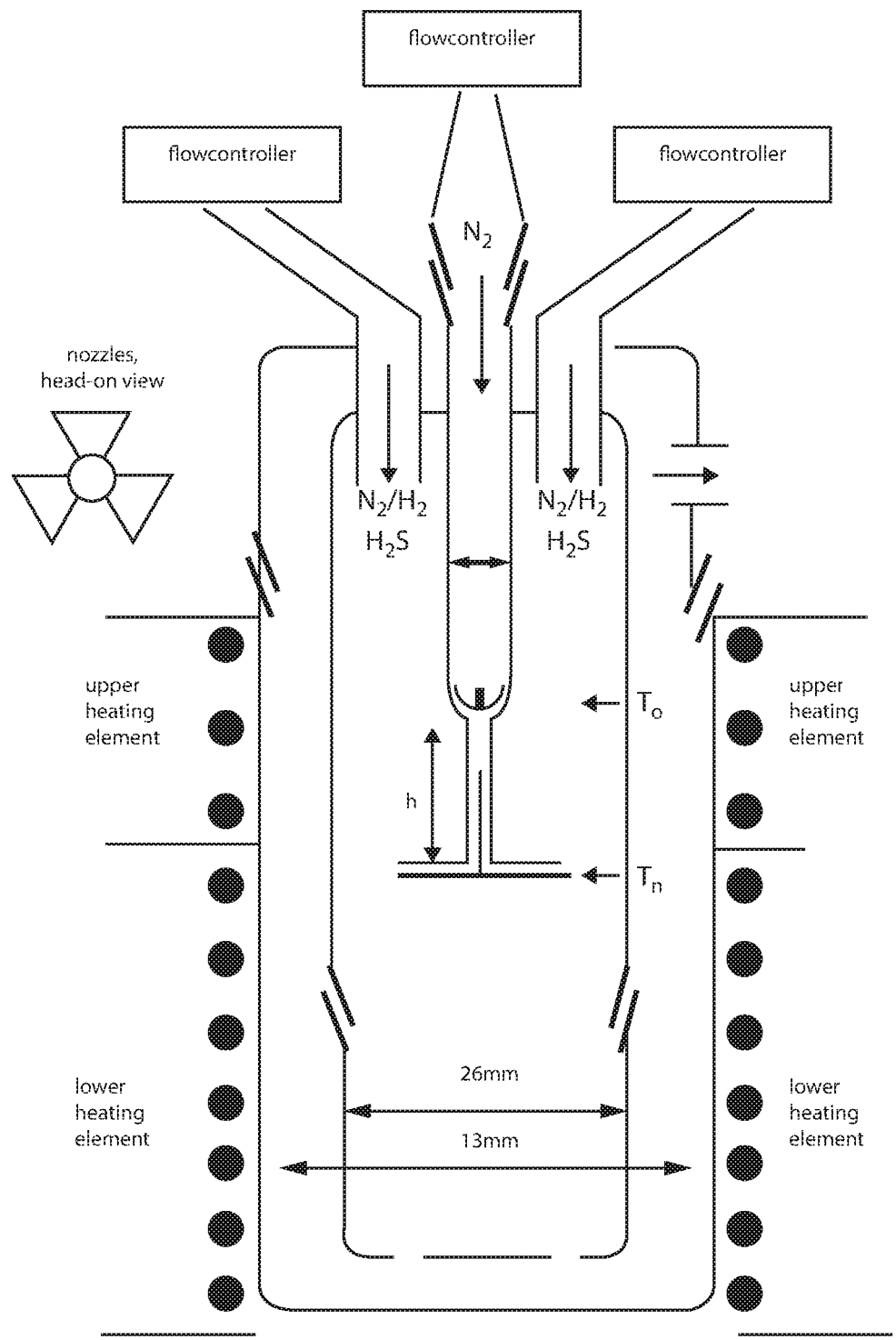
FIG. 1 is a schematic view illustrating one embodiment of chemical reactor for forming some examples of metal chalcogenide nanoparticles, such as fullerene-like nanoparticles, in accordance with one embodiment of the present disclosure.

The spherical nature of the metal chalcogenide composition fullerene-like structures provided by the present disclosure results from being synthesized within the nano-sized regime using chemical methods. For example, synthesis of inorganic fullerene-like molybdenum disulfide (IF-$MoS_2$) may be based upon the sulfidization of amorphous $MO_3$, e.g., $MO_3$ thin films, in a reducing atmosphere at elevated temperatures (e.g., ~850° C.). It is noted, that the metal chalcogenide IFs, such as IF-$MoS_2$, can also be synthesized using high-temperature methods that occur above 650° C. These methods typically involve such techniques as growth from gas phase, e.g., in which $MoO_3$ in the vapor phase is reached with $H_2S$ in a carrier, as employed in the apparatus depicted in FIG. 1. One embodiment, of the process that may be consistent with the apparatus depicted in FIG. 1 includes the use of $MoO_3$ powder placed in the inner part of the reactor (a) which can be heated to a temperature of approximately 780° C. Molecular clusters $(MoO_3)_3$ can be formed and carried down through the reactor by $N_2$ gas. Hydrogen gas diffuses through the nozzles (c) from the outer reactor (b) and starts to react with the molecular clusters. The mild reduction conditions yield reduced $MoO_3$ clusters, which are less volatile, and form $MoO_3$ nanosize particles at the low part of (a). The suboxide nanoparticles reach a size less than 5 nm before the sulfidization step. The coated oxide nanoparticles are swept by the carrier gas outside the reactor (a). Because the nanoparticles are surface-passivated, they land on the ceramic filter (d) and the oxide-to-sulfide conversion continues within the core without coalescence of the nanoparticles. The gas-phase reactor synthesis process generates pure IF-$MoS_2$ phase, and can control the size and shape of the nanoparticles. In other embodiments, inorganic materials having the metal chalcogenide composition, e.g., $WS_2$, and the fullerene-like geometry and/or tubular-like geometry may be produced via sulfidization of tungsten oxide nanoparticles in reduction atmosphere in fluidized bed reactor.

The inorganic materials having the metal chalcogenide composition and the fullerene-like geometry and/or tubular-like geometry may also be formed in accordance with at least one of the methods disclosed in U.S. Patent Application Publication No. 2006/0120947, U.S. Pat. No. 7,524,481, U.S. Pat. No. 6,217,843, U.S. Pat. No. 7,641,869, U.S. Patent Application Publication No. 2010/0172823, U.S. Pat. No. 6,710,020, U.S. Pat. No. 6,841,142, U.S. Pat. No. 7,018,606, U.S. Pat. No. 8,513,364, U.S. Pat. No. 8,329,138, U.S. Pat. No. 7,959,891, U.S. Pat. No. 7,018,606, U.S. Patent Application Publication No. 2013/0109601, U.S. Patent Application Publication No. 2010/0227782 and U.S. Pat. No. 7,641,886, which are each incorporated herein in their entirety. The inorganic materials having the metal chalcogenide composition and the fullerene-like geometry and/or tubular-like geometry formed using the methods within the scope of the above provided description can have a very small particle size distribution. It is noted that the methods disclosed in the aforementioned patents are only some examples of methods that are suitable for forming the inorganic materials having the metal chalcogenide composition and the fullerene-like and/or tubular-like geometry. Any method may be employed for forming the above-described inorganic materials having the metal chalcogenide composition, so long as the compound formed has a fullerene-like and/or tubular-like geometry.

Figure 2A:
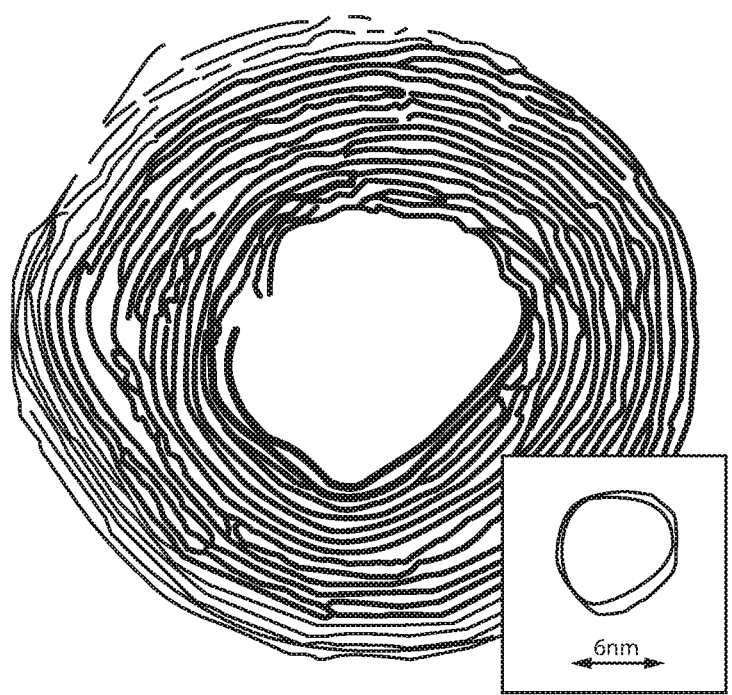
FIG. 2A is an illustration of a transmission electron microscope (TEM) image of a metal chalcogenide nanoparticle having a molecular formula $MX_2$ and a fullerene-like geometry that is spherical, in accordance with one embodiment of the present disclosure.
Figure 2B:
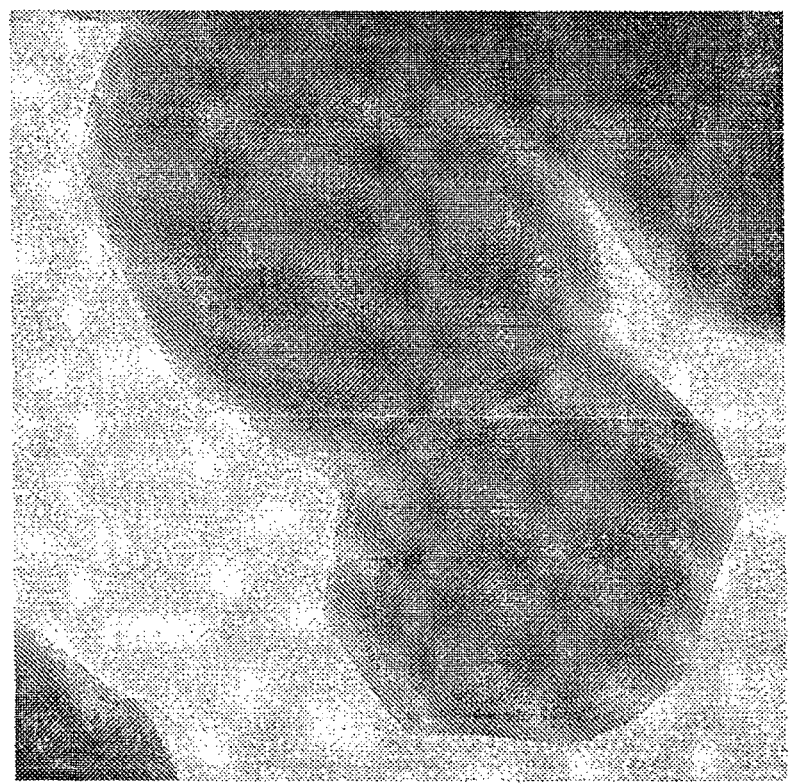
FIG. 2B is a transmission electron microscope (TEM) images of a metal chalcogenide nanoparticle having a molecular formula $MX_2$ and a fullerene-like geometry, in accordance with one embodiment of the present disclosure.
Figure 2C:
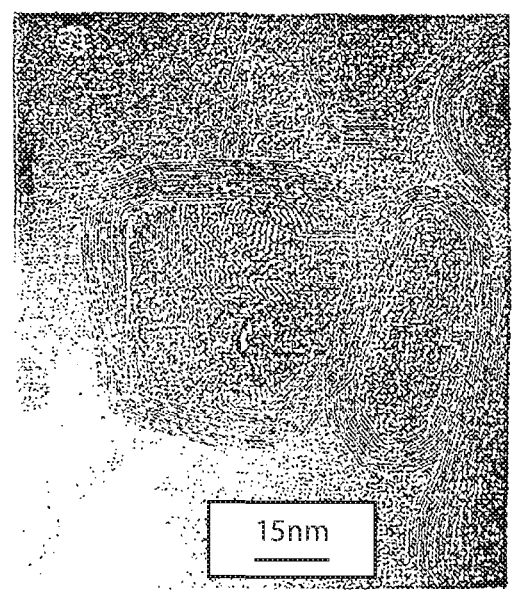
FIG. 2C is a transmission electron microscope (TEM) images of a metal chalcogenide nanoparticle having a molecular formula $MX_2$ and a fullerene-like geometry, in accordance with another embodiment of the present disclosure.
Figure 3:
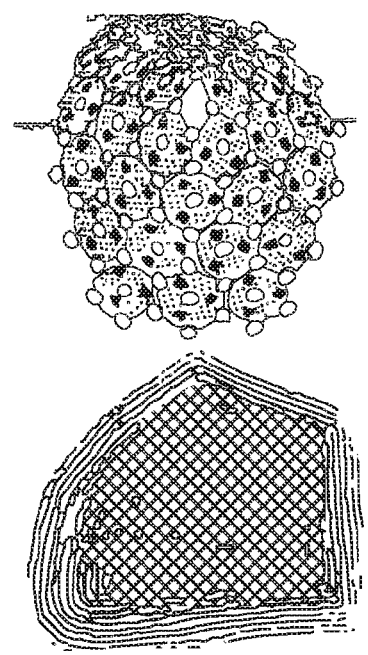
FIG. 3 is an illustration of the chemical structure of a fullerene-like $MoS_2$ nanoparticle above an illustration of a TEM image of a metal chalcogenide nanoparticle having the molecular formula $MX_2$, in accordance with one embodiment of the present disclosure.
Figure 4:
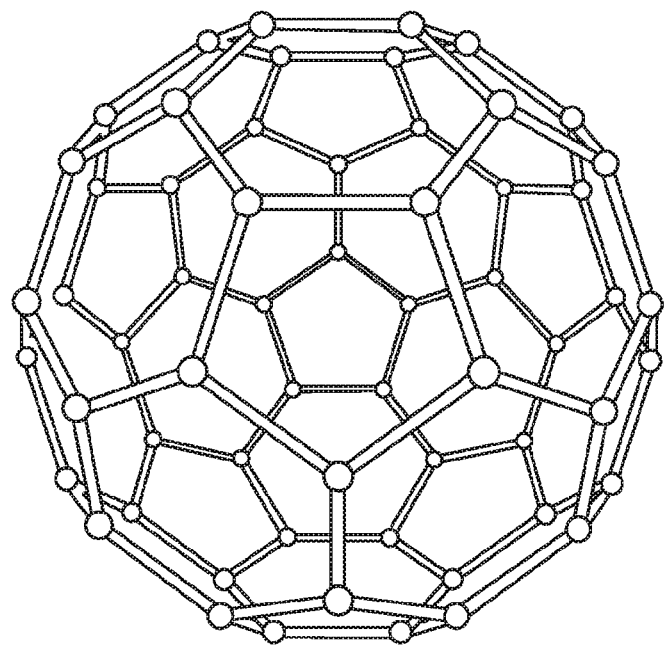
FIG. 4 is an illustration of the chemical structure of carbon 60 fullerene.
Figure 5:
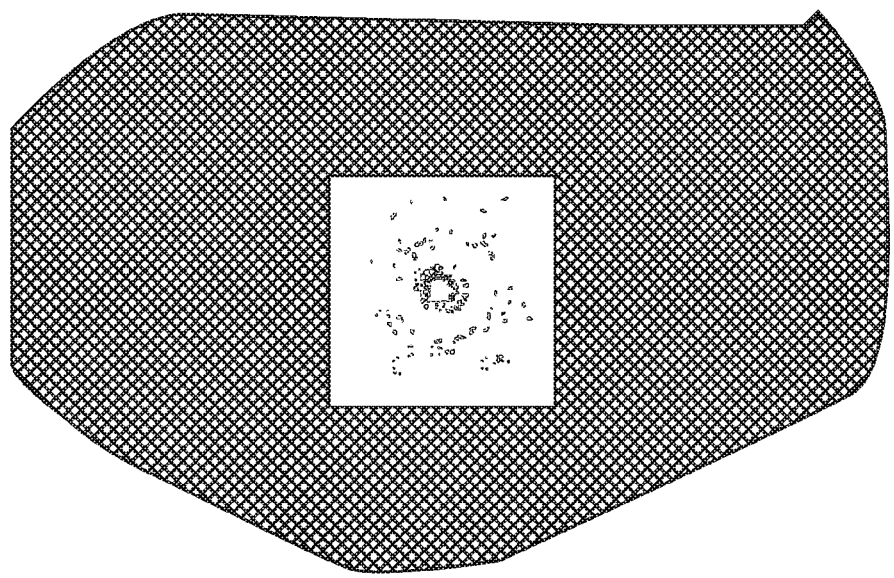
FIG. 5 is electron diffraction pattern of the 400 nm-IF particle, wherein the IF particles fullerene-like metal chalcogenide nanoparticle.

A characteristic image of IF nanoparticles produced in the gas-phase reactor that has been described above is illustrated in FIGS. 2A-2C. FIG. 2A depicts one embodiment of a fullerene-like structures may be perfectly spherical, in accordance with the present disclosure. FIG. 3 is an illustration of the chemical structure of a fullerene-like $MoS_2$ nanoparticle, which is a cage like spherical geometry of molybdenum identified by black circles and sulfur identified by white circles. FIG. 4 is a carbon 60 fullerene structure for comparative purposes. Comparison of FIGS. 3 and 4 illustrates that the that inorganic metal chalcogenide having the caged substantially spherical structure is similar to the caged structure of carbon 60 illustrating a fullerene like arrangement. As discussed above, the fullerene-like structures of metal chalcogenide may be perfectly spherical. FIG. 5 illustrates that the fullerene-like structures disclosed herein may be perfectly spherical, or is very close to a sphere. FIG. 5 is an electron diffraction of the 400 nm-IF particle consistent with at least FIG. 2A. The particles obtained by the present disclosure can have a more perfect spherical shape, than those obtained by the conventional synthetic tools. This stems from the fact that, according to some embodiments of the present disclosure, the reaction takes place in the gas phase, where an isotropic environment for the reaction prevails. Consequently, much larger oxide nanoparticles could be converted into IF when they flow in the gas stream.

The core of the fullerene-like geometry may be hollow, solid, amorphous, or a combination of hollow, solid and amorphous portions. A fullerene like geometry may also be referred to as having a cage geometry. In one example, an inorganic material having the metal chalcogenide composition with a fullerene like geometry may be a cage geometry that is hollow at its core and layered at is periphery. In another example, an inorganic material having the metal chalcogenide composition with a fullerene like geometry may be a cage geometry that is solid at its core and layered at is periphery. For example, the inorganic material having the metal chalcogenide composition and the fullerene like geometry may be a single layer or double layered structure. The inorganic material having the metal chalcogenide composition and the fullerene like geometry is not limited on only single layer or double layered structures, as the inorganic material may have any number of layers. For example, the metal chalcogenide composition may be layered to include 5 layers to 100 layers of metal chalcogenide material that can exfoliate from the particle. In another embodiment, the metal chalcogenide composition may be layered to include 10 layers to 50 layers of metal chalcogenide material that can exfoliate from the particle. In yet another embodiment, the metal chalcogenide composition may be layered to include 15 layers to 20 layers of metal chalcogenide material that can exfoliate from the particle. These structures are also referred to in the art as being "nested layer structures".

One example of an inorganic material having the metal chalcogenide composition and the fullerene like geometry fullerene-like geometry is depicted in FIGS. 2A-3. FIG. 2A depicts a transmission electron microscope (TEM) image of an inorganic material having a tungsten disulfide ($WS_2$) composition with a fullerene-like geometry. In another example, the inorganic material having the metal chalcogenide composition and the inorganic fullerene like geometry is composed of molybdenum disulfide ($MoS_2$). It is noted that the inorganic material with the fullerene-like geometry that is depicted in FIGS. 2A-3 is not limited to only tungsten disulfide ($WS_2$) and molybdenum disulfide ($MoS_2$). Inorganic materials with a metal chalcogenide composition and having a fullerene-like geometry may have any inorganic composition that meets the formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Rg) and combinations thereof, and X is a chalcogen element selected from the group consisting of sulfur (S), selenium (Se), tellurium (Te), oxygen (O) and combinations thereof.

The inorganic material having the metal chalcogenide composition and fullerene-like geometry may have a diameter ranging from 1 nm to 15 microns. In another embodiment, the inorganic material having the metal chalcogenide composition and the fullerene-like geometry may have a diameter ranging from 2 nm to 10 microns. In yet another embodiment, the inorganic material having the metal chalcogenide composition and the fullerene-like geometry may have a diameter ranging from 5 nm to 5 microns. The inorganic material having the metal chalcogenide composition and the fullerene-like geometry may have a diameter that is any value within the above ranges. It is noted that the above dimensions are provided for illustrative purposes only, and are not intended to limit the present disclosure. In some embodiments, most of the nanoparticles will have diameters ranging between 20 nm to 500 nm, and even more typically will have diameters between 30 nm to 200 nm.

The above described particles may be referred to as "fullerene-like geometry without a sectioned outer layer".

The component of the coating that is provided by the inorganic material of the metal chalcogenide composition may also have tubular-like geometry. As used herein, the term "tubular-like geometry" denotes a columnar or cylindrical geometry, in which one axis of the intercalation compound. In some embodiments, an inorganic material having the metal chalcogenide composition and the tubular-like geometry may be a cage geometry that is hollow at its core and layered at its periphery. In other embodiments, an inorganic material having the metal chalcogenide composition and the tubular-like geometry may be a cage geometry that is solid at its core, and/or amorphous at its core, and layered at its periphery. For example, the inorganic material having the metal chalcogenide composition and the tubular-like geometry may be a single layer or double layered structure. These structures are also referred to in the art as being "nested layer structures". The number of layers in the inorganic material having the metal chalcogenide composition and the tubular-like geometry may be similar to the number of layers in the inorganic material having the metal chalcogenide composition and the fullerene-like geometry. In some examples, the minimum number of layers for the inorganic material having the tubular-like geometry is approximately 4 layers.

Figure 6:
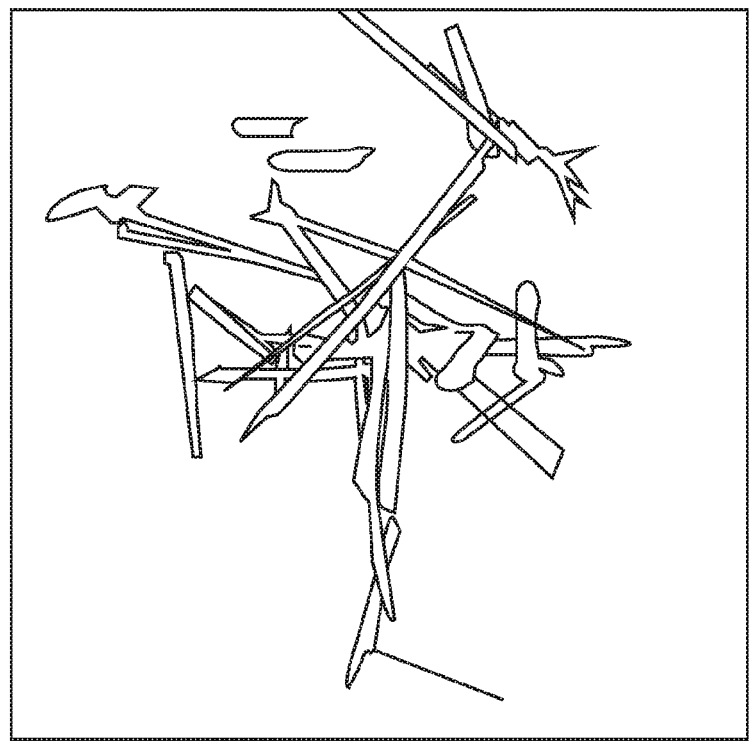
FIG. 6 is an illustration of a transmission electron microscope (TEM) image of a metal chalcogenide having a molecular formula $MX_2$ and a tubular-like geometry, in accordance with one embodiment of the present disclosure.

One example of an inorganic material having the metal chalcogenide composition and the tubular-like geometry is depicted in FIG. 6. FIG. 6 depicts a transmission electron microscope (TEM) image of an intercalation compound having a tungsten disulfide ($WS_2$) composition with an inorganic tubular-like geometry. In another example, the inorganic material having the metal chalcogenide composition and the tubular-like geometry is composed of molybdenum disulfide ($MoS_2$). It is noted that the inorganic material having the metal chalcogenide composition and the tubular-like geometry that is depicted in FIG. 6 is not limited to only tungsten disulfide ($WS_2$) and molybdenum disulfide ($MoS_2$). Inorganic materials having a tubular-like geometry may have any inorganic composition that meets the formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), and combinations thereof, and X is a chalcogen element selected from the group consisting of sulfur (S), selenium (Se), tellurium (Te) and oxygen (O).

The inorganic materials having the metal chalcogenide composition and the tubular-like geometry may have a diameter, i.e., distance perpendicular to the greatest axis of the tubular-like geometry, ranging from 1 nm to 300 nm. In another embodiment, the inorganic materials having the metal chalcogenide composition and the tubular-like geometry may have a diameter ranging from 5 nm to 125 nm. In yet another embodiment, the inorganic materials have the metal chalcogenide composition and the tubular-like geometry with a diameter ranging from 10 nm to 100 nm. The inorganic materials having the metal chalcogenide composition and the tubular-like geometry may have a length, i.e., greatest axis of the tubular-like geometry, that ranges from 1 nm to 20 cm. In another embodiment, the inorganic materials having the metal chalcogenide composition and the tubular-like geometry may have a length, i.e., greatest axis of the tubular-like geometry, that ranges from 5 nm to 15 cm. In yet another embodiment, the inorganic materials having the metal chalcogenide composition and the tubular-like geometry may have a length, i.e., greatest axis of the tubular-like geometry, that ranges from 100 nm to 10 cm. The inorganic materials having the metal chalcogenide composition and the tubular-like geometry may have a length or diameter that is any value within the above ranges. It is noted that the above dimensions are provided for illustrative purposes only, and are not intended to limit the present disclosure.

Figure 7:
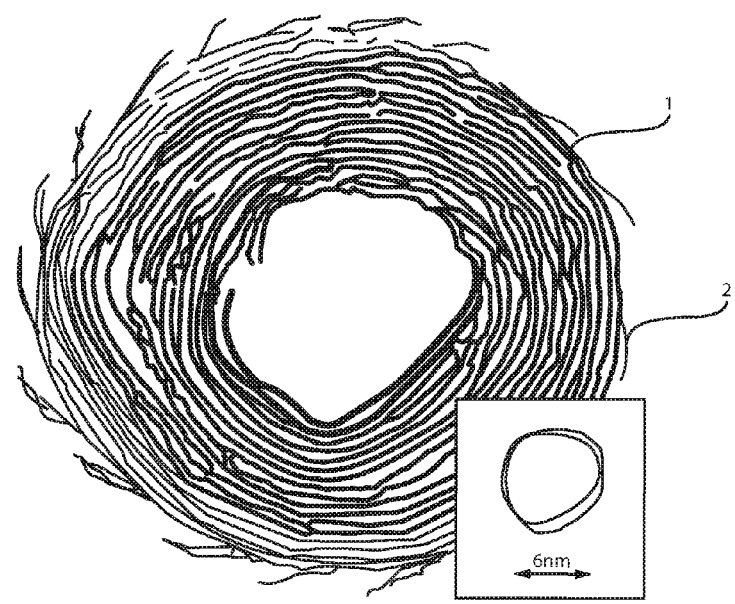
FIG. 7 is an illustration of a transmission electron microscope (TEM) image of a metal chalcogenide nanoparticle having a molecular formula $MX_2$ and a fullerene-like geometry, wherein an outer layer of the multi-layered fullerene-like geometry comprises at least one sectioned portion, in which the sectioned portion may extend along a direction away from the curvature of nanoparticle, in accordance with one embodiment of the present disclosure.

Multi-Layered Fullerene-Like Nanoparticle Structure Having Sectioned Outer Layer with Sectioned Portions Protruding from the Surface of Nanoparticle FIG. 7 depicts one embodiment of a multi-layered fullerene-like nano-structure comprising a plurality of layers 1 each comprised of an metal chalcogenide composition has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. Two example compositions for the structure depicted in FIG. 7 include $MoS_2$ and $WS_2$. An outer layer of the multi-layered fullerene-like structure comprises at least one sectioned portion 2. The at least one sectioned portion 2 extends along a direction away from the curvature of the multi-layered fullerene-like nano-structure. The at least one sectioned portion 2 is engaged to remaining section of the outer layer.

The multi-layered fullerene-like nano-structure can be substantially spherical, and in some instances may include layers that are perfectly spherical. The core of the multi-layered fullerene-like nano-structure having the sectioned outer layer may be hollow, solid, amorphous, or a combination of hollow, solid and amorphous portions. In some embodiments, the at least one sectioned portion 2 that extends along a direction away from the curvature of the multi-layered fullerene-like nano-structure extends along a direction that is tangent to the curvature surface of the multi-layered fullerene-like nano-structure. The at least one sectioned portion 2 that extends along a direction away from the curvature of the multi-layered fullerene-like nano-structure may extends along a direction that can be close to being substantially normal to the curvature surface of the multi-layered fullerene-like nano-structure.

The inorganic material having the metal chalcogenide composition and the fullerene like geometry with the sectioned outer layer is not limited on only single layer or double layered structures, as the inorganic material may have any number of layers. For example, the metal chalcogenide composition may be layered to include 5 layers to 100 layers of metal chalcogenide material that can exfoliate from the particle. In another embodiment, the metal chalcogenide composition may be layered to include 10 layers to 50 layers of metal chalcogenide material that can exfoliate from the particle. In yet another embodiment, the metal chalcogenide composition may be layered to include 15 layers to 20 layers of metal chalcogenide material that can exfoliate from the particle. These structures are also referred to in the art as being "nested layer structures".

The inorganic material having the metal chalcogenide composition and fullerene-like geometry with sectioned outer layer as depicted in FIG. 7 may have a diameter ranging from 1 nm to 15 microns. In another embodiment, the inorganic material having the metal chalcogenide composition and the fullerene-like geometry may have a diameter ranging from 2 nm to 10 microns. In yet another embodiment, the inorganic material having the metal chalcogenide composition and the fullerene-like geometry with sectioned outer layer, as depicted in FIG. 7, may have a diameter ranging from 5 nm to 5 microns. The inorganic material having the metal chalcogenide composition and the fullerene-like geometry may have a diameter that is any value within the above ranges. It is noted that the above dimensions are provided for illustrative purposes only, and are not intended to limit the present disclosure. In some embodiments, most of the nanoparticles will have diameters ranging between 20 nm to 500 nm, and even more typically will have diameters between 30 nm to 200 nm.

The sectioned portions of the outer layer may be present around an entire outer surface of the substantially spherical nanoparticle. The outer layer including the plurality of sectioned portions comprises dangled bonds that provide a charged surface of the outer layer of the multi-layered fullerene-like nano-structure. In one embodiment, the section portions 2 of the outer layer have a length ranging from 1% to 80% of a diameter of the multi-layered fullerene-like nano-structure, e.g., 1% to 70% of the multi-layered fullerene-like nano-structure.

In some embodiments, the outer layer of the multi-layered fullerene-like nano-structure is functionalized with a functionalizing agents selected from the group consisting of silanes, thiols, ionic, anionic, cationic, nonionic surfactants, amine based dispersant and surfactants, succinimide groups, fatty acids, acrylic polymers, copolymers, polymers, monomers and combinations thereof. Any of the functionalizing agents described in this paper are suitable for use with the multi-layered fullerene-like nano-structure having the sectioned outer layer.

Although, fullerenes structures have been specifically described, metal chalcogenides tube-like structures having an outer layer that includes at least one sectioned portion is within the scope of the present disclosure. For example, the at least one sectioned portion of the outer layer of the multilayered tube-like structure of metal chalcogenide may extend along a direction away from the curvature of the multi-layered tube-like nano-structure, the at least one sectioned portion engaged to remaining section of the outer layer.

The multi-layered fullerene-like structure comprises at least one sectioned portion that is depicted in FIG. 7 may be formed beginning with the multilayered fullerene like structures that are formed using the methods described above with in the section titled "METAL CHALCOGENIDE FULLERENE-LIKE NANOPARTICLE AND METAL CHALCOGENIDE TUBULAR-LIKE GEOMETRY". Beginning with a multi-layered fullerene-like structure that does not include a sectioned outer layer, a force is applied to open up sections in the outer layer, which peels a portion of the outer layer from the curvature of the multi-layered fullerene-like structure. The force may be applied using any means to apply a physical force to the particles, such as milling, e.g., dry and/or wet milting, sonification, ultrasonication, and combinations thereof. The time and force is dependent upon the degree of sectioning preferred in the outer layer.

The sectioned outer layer provides a charged surface for the nanoparticle. The charged surface that results from the sectioned outer layer facilitates grafting of functional groups onto the multi-layered fullerene-like structure, which can be used to control rheology of dispersions and mixtures including the multi-layered fullerene-like structure having the sectioned outer layer. For example, the functionalized sectioned outer layer may allow for the multi-layered fullerene-like structure to be dispersed more easily than multi-layered fullerene-like structures that do not include the sectioned outer layer. Further, the sectioned outer layer can allow for layers of metal chalcogenide to be exfoliated in response to lower pressures and forces in lubrication of frictional surfaces, and repair of frictional surfaces in comparison to multi-layered fullerene-like structure that do not include the sectioned outer layer.

Coating Including Inorganic Fullerene-Like Particles and Inorganic Tubular-Like Particles In one embodiment, a coating is provided that includes an inorganic material of a metal chalcogenide composition having a fullerene-like geometry without a sectioned outer layer, a fullerene-like geometry with a sectioned outer layer, and/or tubular-like geometry. The description of the metal chalcogenide composition having a fullerene-like geometry without a sectioned outer layer, a fullerene-like geometry with a sectioned outer layer, and/or tubular-like geometry is provided by the above sections titled "MULTI-LAYERED FULLERENE-LIKE NANOPARTICLE STRUCTURE HAVING SECTIONED OUTER LAYER WITH SECTIONED PORTIONS PROTRUDING FROM THE SURFACE OF NANOPARTICLE" and "METAL CHALCOGENIDE FULLERENE-LIKE NANOPARTICLE AND METAL CHALCOGENIDE TUBULAR-LIKE GEOMETRY". The term "with and/or without a sectioned outer layer" and "with or without a sectioned outer layer" denote that the fullerene-like nanoparticles used can be solely those have a sectioned outer layer, solely nanoparticles without a sectioned outer layer or a combination of nanoparticles including the sectioned outer layer and nanoparticles without the sectioned outer layer. The particles of the metal chalcogenide can be functionalized with at least one of non-anionic surfactants, anionic surfactants, cationic surfactants, zwitterionic surfactants, surfactants, silanes, thiols, polymers and dopants.

The deposition surface that the coating is formed on may be composed of metals, such as steel, aluminum, copper alloys, and zinc alloys. In other examples, the deposition surface that the coating is formed on may be a dielectric, polymeric or ceramic material. In some other examples, the deposition surface may be a semiconductor material. The coating composition may further include a base material layer selected from the group consisting of chrome (Cr), chromium oxide ($Cr_2O_3$), diamond like carbon (DLC), silicon carbide (SiC), silicon nitride ($Si_3N_4$), titanium carbide (TiC), nickel titanium (NiTi), aluminum oxide ($AhO_3$), boron carbide ($B_4C$), boron, tungsten cobalt (WCo) and combinations thereof. In some embodiments, the base material layer provides the majority of the coating.

In some embodiments, the base material for the coating composition is a polymeric material. In one example, base material is provided by an elastomer. An elastomer is a cross-linked, amorphous polymer when above its glass transition temperature. Each of the monomers, which link to form the polymer in an elastomer is usually made of carbon, hydrogen, oxygen and/or silicon. At ambient temperatures, elastomers are relatively soft, e.g., E~3 MPa, and deformable. Elastomers are usually thermosets (requiring vulcanization), but may also be thermoplastic. The long polymer chains cross-link during curing, i.e., vulcanizing. The elasticity is derived from the ability of the long chains to reconfigure themselves to distribute an applied stress. The covalent cross-linkages ensure that the elastomer will return to its original configuration when the stress is removed. As a result of this extreme flexibility, elastomers can reversibly extend from 5-700%, depending on the specific material, without the cross-linkages or with short, uneasily reconfigured chains, the applied stress would result in a permanent deformation.

Examples of elastomers that are suitable for use with the present disclosure include unsaturated rubbers that can be cured by sulfur vulcanization, which include, but are not limited to: natural polyisoprene: cis-1,4-polyisoprene natural rubber (NR) and trans-1,4-polyisoprene gutta-percha; synthetic polyisoprene (IR for Isoprene Rubber); polybutadiene (BR for Butadiene Rubber); chloroprene rubber (CR), polychloroprene, neoprene, baypren etc; butyl rubber (copolymer of isobutylene and isoprene, IIR); halogenated butyl rubbers (chioro butyl rubber: CIIR; bromo butyl rubber: BIIR); styrene-butadiene rubber (copolymer of styrene and butadiene, SBR); nitrile rubber (copolymer of butadiene and acrylonitrile, NBR) (also called Buna N rubbers); hydrogenated nitrile rubbers (HNBR); therban; and zetpol.

In another embodiment, examples of elastomers that are suitable for use with the present disclosure include saturated rubbers that cannot be cured by sulfur vulcanization, which include, but are not limited to: EPM (ethylene propylene rubber, a copolymer of ethylene and propylene) and EPDM rubber (ethylene propylene diene rubber, a terpolymer of ethylene, propylene and a diene-component); Epichlorohydrin rubber (ECO); Polyacrylic rubber (ACM, ABR); Silicone rubber (SI, Q, VMQ); Fluorosilicone Rubber (FVMQ); Fluoroelastomers (FKM, and FEPM) Viton, Tecnoflon, Fluorel, Aflas and Dai-El; Perfluoroelastomers (FFKM) Tecnoflon PFR, Kalrez, Chernraz, Perlast; Polyether block amides (PEBA); Chiorosulfonated polyethylene (CSM); Ethylene-vinyl acetate (EVA) and combinations thereof.

Other types of elastomers that are suitable for use with the present disclosure include thermoplastic elastomers (TPE); the proteins resilin and elastin; and polysulfide rubber. In some embodiments, when an elastomer serves as the base material of the coating having a dispersed phase of an inorganic material of a metal chalcogenide composition with a fullerene-like (with and/or without a sectioned outer layer) or tubular-like geometry, the mechanical properties of the coating including the fullerene-like or tubular-like geometry inorganic material of metal chalcogenide composition are greater than the elastomer by itself. For example, the stress strain behavior of the coating is increased in comparison to the performance of the elastomer without the dispersed phase of the fullerene-like or tubular-like geometry inorganic material of metal chalcogenide composition. The coating also has greater lubricating qualities that the elastomer by itself.

In another embodiment, the polymer that is selected for the base material of the coating may be an epoxy. Epoxies are typically thermosetting. Epoxy resins, also known as polyepoxides are a class of reactive prepolymers and polymers which contain epoxide groups. Epoxy resins may be reacted (cross-linked) either with themselves through catalytic homopolymerization, or with a wide range of co-reactants including polyfunctional amines, acids (and acid anhydrides), phenols, alcohols and thiols. These co-reactants are often referred to as hardeners or curatives, and the cross-linking reaction is commonly referred to as curing. Epoxy compositions that are suitable for use with the present disclosure may include bisphenol A epoxy resin, bisphenol F epoxy resin, novolac epoxy resin, aliphatic epoxy resin, glycidylamine epoxy resin and combinations thereof. One example of the repeating unit for an epoxy that is suitable for use with the present disclosure is a diglycidyl: ether of bisphenol A, DGEPA, as follows:

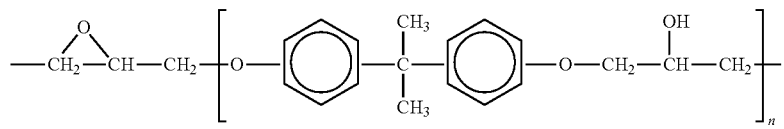

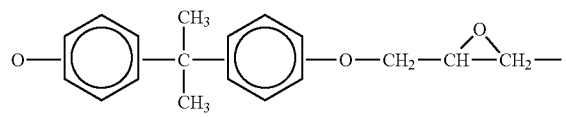

In some embodiments, when an epoxy serves as base layer for the coating having a dispersed phase of an inorganic material of a metal chalcogenide composition, such as tungsten disulfide ($WS_2$), with a fullerene like (with and/or without a sectioned outer layer or tubular-like geometry, the mechanical properties of the coating are greater than the mechanical properties of the epoxy by itself. For example, the peel strength and shear strength performance of the coating including the epoxy base material and the inorganic materials of the metal chalcogenide composition with the fullerene-like (with and/or without a sectioned outer layer) or tubular-like geometry is greater than the peel strength and shear strength performance of the epoxy by itself, i.e., the epoxy without the dispersed phase of an inorganic material of a metal chalcogenide composition with a fullerene like or tubular-like geometry.

In some embodiments, the inclusion of the dispersed phase of an inorganic material of the metal chalcogenide composition with the fullerene-like (with and/or without a sectioned outer layer) or tubular-like geometry can double the peel strength and shear strength performance of the composite when compared to the epoxy. Impact strength is also increased. Energy absorbance, as indicated from the area under the stress-strain curve (e.g. of a tensile test according to ASTM D638) is also increased when compared to epoxy.

In another embodiment, the polymer for the base material of the coating may be a thermoplastic material, such as polyether ether ketone (PEEK) and polypropylene (PP). PEEK polymers are obtained by step-growth polymerization by the dialkylation of bisphenolate salts. When PEEK is employed as the matrix, e.g., base material, of a coating including a dispersed phase of inorganic materials of the metal chalcogenide composition with the fullerene-like (with and/or without a sectioned outer layer) and/or tubular-like geometry, the mechanical properties of the coating are greater than the mechanical properties of PEEK without the dispersed phase of inorganic materials. For example, the Young's modulus may be doubled by the inclusion of the dispersed phase of inorganic materials of the metal chalcogenide composition with the fullerene-like or tubular-like geometry into a matrix of PEEK. Impact strength is also increased. Applications for PEEK in accordance with the present disclosure include medical implants, aerospace structures, automotive structures, bearings, piston parts, pumps, compressor plate valves, and cable insulation.

Polypropylene (PP) is an addition polymer made from the monomer propylene. Low-density polyethylene (LDPE) and high-density polyethylene (HDPE) are both suitable for use with the present disclosure, as well as other density characterizations for polypropylene (PP). Polypropylene (PP) may be suitable for use as the base material of a coating in accordance with the present disclosure, and is suitable for use in automotive and aerospace applications. Polypropylene (PP) may also be suitable for coatings used in shielding piping and wire cable sheathing applications. The mechanical properties and impact strength of polypropylene (PP) is increased by incorporation of a dispersed phase of inorganic material having a metal chalcogenide composition with a fullerene-like (with and/or without a sectioned outer layer) and/or tubular like geometry.

In another embodiment, the polymer for the base material of the coating may be a polyamide. A polyamide is a polymer containing monomers of amides joined by peptide bonds. An amide group has the formula —$CONH_2$. An amide link has this structure:

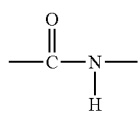

The polyamide polymer may have a high crystallinity, a low crystallinity or may be amorphous. Polyamide polymers that are suitable for use with the present disclosure may be homopolymers or copolymers. The polyamide polymers may aliphatic, semi aromatic, aromatic or a combination thereof.

In one embodiment, the polyamide used for the base material of the coating may be nylon. Nylon may be an aliphatic polymer. In nylon, the repeating units contain chains of carbon atoms. There are various different types of nylon depending on the nature of those chains. Examples of nylons that may be suitable for use as the base material layer of the coating may include nylon-6,6; nylon-6; nylon-6,9; nylon-6,10; nylon-6,12; nylon-11; nylon-12 and nylon-4,6. The repeating unit for nylon-6 is as follows:

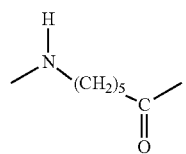

The repeating unit for nylon 6-6 is as follows:

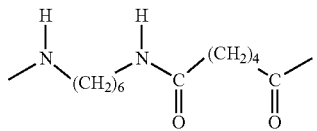

In some embodiments, nylons are condensation copolymers formed by reacting equal parts of a diamine and a dicarboxylic acid, so that amides are formed at both ends of each monomer in a process analogous to polypeptide biopolymers. Chemical elements included are carbon, hydrogen, nitrogen, and oxygen.

In another embodiment, the polyamide for the base layer of the coating is kevlar. Kevlar is similar in structure to nylon-6,6 except that instead of the amide links joining chains of carbon atoms together, they join benzene rings.

In another embodiment, the polyamide used for the base material of the coating may be polyphthalamide (aka. PPA, High Performance Polyamide). PPA is a thermoplastic synthetic resin of the polyamide (nylon) family. PPA's are polyamides containing aromatic rings in their backbones, which gives them high mechanical strength and thermal resistance. The term PPA is used when 60% or more moles of the carboxylic acid portion of the repeating unit in the polymer chain is composed of a combination of terephthalic (TPA) and isophthalic (IPA) acids. PPA's may be a semi-crystalline material composed from a diacid and a diamine. PPA is typically formed by the reaction of aromatic acids with aliphatic diamines. In some embodiments, the diacid portion contains at least 55% terephthalic acid (TPA) or isophthalic acid (IPA). Molar masses for PPA's made with direct polycondensation techniques range between 12,000 and 16,000 g/mol.

In another embodiment, the polyamide used for the base material of the coating may be a polyphthalamide blend. For example, the base material of the coating may be composed of at least one of polyphthalamide/polyamide blends and polyphthalamide/polyamide/polyolefin blends.

Other polyamides that are suitable for use as the base material of the coating include polyvinyl chloride (PVC), polyester (PES), polyethermide (PEI) and polyphenylene sulfide (PPS).

In some embodiments, the base material of the coating may be composed of polyamide-imides. The polyamide-imides may be thermosetting or thermoplastic amorphous polymers. Polamide-imide polymers include a polymer chain that comprises amide linkages alternating with imide linkages. The mer unit for one example of a polyamide-imide used in accordance with the present disclosure is as follows:

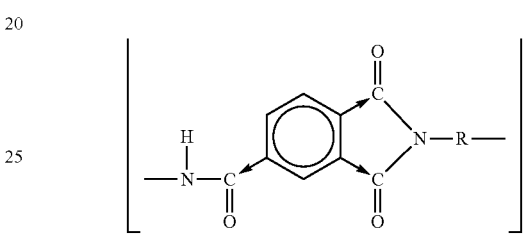

Polyamide-imides may be made from isocyanates and TMA (trimellic acid-anhydride) in N-methylpyrrolidone (NMP). For example, one route to the formation of polyamide-imides is the condensation of an aromatic diamine, such as methylene dianiline (MDA) and trimellitic acid chloride (TMAC). Reaction of the anhydride with the diamine produces an intermediate amic acid. The acid chloride functionality reacts with the aromatic amine to give the amide bond and hydrochloric acid (HCl) as a by-product. In the commercial preparation of polyamideimides, the polymerization is carried out in a dipolar, aprotic solvent such as N-methylpyrrolidone (NMP), dimethylacetamide (DMAC), dimethylformamide (DMF), or dimethylsulfoxide (DMSO) at temperatures between 20-60° C. The byproduct hydrochloric acid (HCl) is typically neutralized in situ or removed by washing it from the precipitated polymer. In another example, polyamide-imides may be formed by reacting diisocyanate, often 4,4'-methylenediphenyldiisocyanate (MDI), with trimellitic anhydride (TMA). Polyamide-imides that are suitable for the methods and structures disclosed herein may be available from Solvay Advanced Polymers under the trademark Torlon, such as Torlon 4301, Torlon ai-10, Torlon ai-10 LM or Torlon 4000. Polyamide-imides (PAI) may be used in conjunction with fluoropolymers.

In some embodiments, the base layer of the coating may be provided by polyethylene (PE). The term polyethylene describes a family of resins obtained by polymerizing ethylene gas, $H_2C=CH_2$. In some examples, low density polyethylene typically has a density value ranging from 0.91 to 0.925 g/cm$^3$, linear low density polyethylene is in the range of 0.918 to 0.94 g/cm$^3$, while high density polyethylene ranges from 0.935 to 0.96 g/cm$^3$ and above.

In another embodiment, the base layer of the coating may be cross linked polyethylene (PEX). Typically, PEX is made from high density polyethylene (HDPE). Cross linked polyethylene (PEX) contains cross-linked bonds in the polymer structure, changing the thermoplastic to a thermoset. In one embodiment, in order to be classified as being cross linked polyethylene (PEX), the required degree of cross-linking, according to ASTM Standard F 876-93, is between 65% and 89%.

In yet another embodiment, the polymer for the base layer of the coating may be a polyester. Polyester is a category of polymers which contain the ester functional group in their main chain. In some examples, polyester that is suitable for the base layer of the coating may include polybutylene terephthalate (PBT) and polyethylene terephthalate (PET). The repeating unit of polybutylene terephthalate (PBT) is as follows:

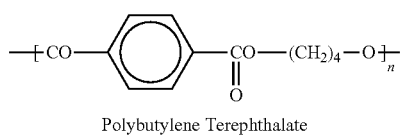

Polybutylene Terephthalate

The repeating unit of polyethylene terephthalate (PET) is as follows:

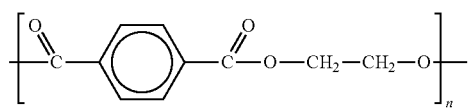

Polyesters are synthesized by reacting an organic acid, in this case terephthalic acid, with an alcohol. In the case of polybutylene terephthalate (PBT), the alcohol is generically referred to as butylene glycol, while in polyethylene terephthalate (PET) it is ethylene glycol. The resulting polymers are known, therefore, as polybutylene terephthalate (PBT) and polyethylene terephthalate (PET).

In one embodiment, the inorganic material of the metal chalcogenide having the molecular formula $MX_2$ with the fullerene-like geometry having the sectioned outer layer, the fullerene-like geometry not having the sectioned outer layer and/or tubular-like geometry is present in the coating in an amount of greater than 0.1 wt %. For example, the inorganic material of the metal chalcogenide having the molecular formula $MX_2$ may be present in the coating in an amount ranging from 0.1 wt % to 99.5 wt %. In yet another example, the inorganic material of the metal chalcogenide having the molecular formula $MX_2$ may be present in the coating in an amount ranging from 0.5 wt % to 70 wt %. In some examples, the inorganic material of the metal chalcogenide having the molecular formula $MX_2$ may be present in the coating in an amount greater than 0.01% by volume.

In some embodiments, such as when the coating includes a polymeric base material layer, the coating may be a composite structure. A composite, such as a composite coating, is a material composed of two or more distinct phases, e.g., matrix phase and dispersed phase, and having bulk properties different from those of any of the constituents by themselves. As used herein, the term "matrix phase" denotes the phase of the composite, and contains the dispersed phase, and shares a load with it. In some embodiments, the matrix phase may be the majority component of the composite coating. In some embodiments, when the coating includes a polymeric base material layer, the matrix phase may be provided by the polymer base material layer. As used herein, the term "dispersed phase" denotes a second phase (or phases) that is embedded in the matrix phase of the composite. The dispersed phase may be uniformly distributed throughout an entirety of the matrix phase. A composite coating in accordance with the present disclosure includes a dispersed phase of an inorganic material of a metal chalcogenide composition with a fullerene-like (with and/or without a sectioned outer layer) or tubular-like geometry that is present in a second material that provides a matrix phase. In some embodiments, the composite coating may include a uniformly dispersed phase, in which the dispersed phase is uniformly distributed so that the dispersed phase is present throughout an entirety of the matrix. In other embodiments, the dispersed phase may be graded to have a high concentration area in the matrix for the coating, such as having a higher concentration of the dispersed phase a the base of the coating closer to the deposition surface, or having a higher concentration of the dispersed phase at an portion of the matrix phase at upper surface of the coating opposite the surface in contact with the deposition surface.

In other embodiments, substantially the entire coating is comprised of the inorganic material of a metal chalcogenide composition having a fullerene-like geometry without a sectioned outer layer, a fullerene-like geometry including a sectioned outer layer and/or tubular-like geometry.

The component of the coating that is provided by the inorganic material of the metal chalcogenide composition may have a fullerene-like geometry with a sectioned outer layer, a fullerene geometry without a sectioned outer layer or a tubular-like geometry. The description of the metal chalcogenide composition having a fullerene-like geometry without a sectioned outer layer, a fullerene-like geometry with a sectioned outer layer, and/or tubular-like geometry is provided by the above sections titled "MULTI-LAYERED FULLERENE-LIKE NANOPARTICLE STRUCTURE HAVING SECTIONED OUTER LAYER WITH SECTIONED PORTIONS PROTRUDING FROM THE SURFACE OF NANOPARTICLE" and "METAL CHALCOGENIDE FULLERENE-LIKE NANOPARTICLE AND METAL CHALCOGENIDE TUBULAR-LIKE GEOMETRY".

In some embodiments, the coating may include a second dispersed phase of a carbon containing material, such as carbon nanotubes, e.g., single wall carbon nanotubes (CNT) or multi-wall carbon nanotubes (SWNT), or graphitic materials, such as carbon black (CB), graphitic fibers, diamond like carbon (DLC) and graphite platelets. The second dispersed phase of carbon containing materials could be used in polymer matrices for reinforcement or in order to obtain desired physical, chemical or mechanical properties.

In one embodiment, the carbon containing material that is provided by carbon nanotubes may have a high purity on the order of about 95% to about 99% carbon. In an even further embodiment, the carbon nanotubes have a high purity on the order of about 99% or greater. The diameter of a single wall carbon nanotube may range from about 1 nanometer to about 400 nanometers. In another embodiment, the diameter of a single wall carbon nanotube may range from about 1.2 nanometers to about 1.6 nanometers. In one embodiment, the nanotubes used in accordance with the present invention have an aspect ratio of length to diameter on the order of approximately 200:1. In the final coating, a carbon containing material may be present in the final coating in an amount ranging from 01 wt. % to 10 wt. %.

In some embodiments, in which the coating includes a polymer base material, the carbon containing material may be present in the polymer matrix with the metal chalcogenide inorganic material with the fullerene-like (with and/or without a sectioned outer layer) and/or tubular-like geometry, wherein the carbon containing material is present in an amount ranging from 0.1 wt % to 60 wt. %. In another embodiment, the carbon containing material may be present in the polymer matrix in an amount ranging from 0.1 wt % to 40 wt. %. In yet another embodiment, the carbon containing material in the polymer matrix in an amount ranging from 0.1 wt % to 30 wt. %.

Figures 8A, 8B:
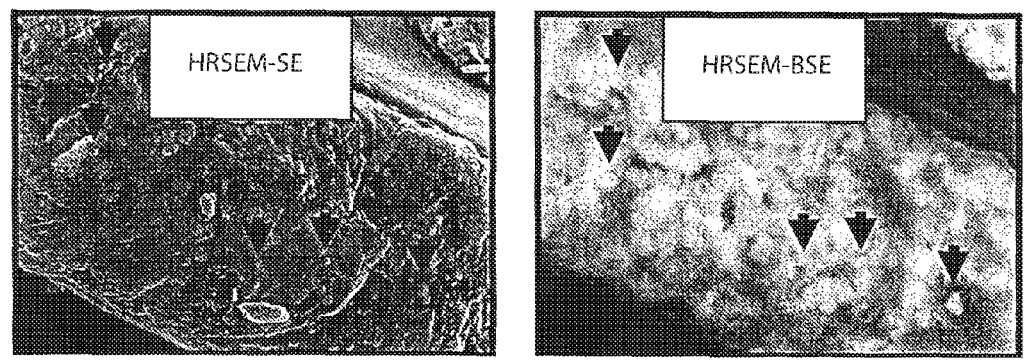
FIG. 8A is are scanning electron microscope (SEM) images of metal chalcogenide having a molecular formula $MX_2$ with a fullerene-like geometry that is dispersed within a polymer matrix, in accordance with one embodiment of the present disclosure.
FIG. 8B is are scanning electron microscope (SEM) images of metal chalcogenide having a molecular formula $MX_2$ with a fullerene-like geometry that is dispersed within a polymer matrix, in accordance with another embodiment of the present disclosure.

In one embodiment, the thickness of the coating including the base material and at least the inorganic materials having the metal chalcogenide composition and the fullerene-like geometry (with and/or without a sectioned outer layer) and/or tubular-like geometry may range from 5 microns to 50 microns. In another embodiment, the thickness of the coating including the base material and the inorganic materials having the metal chalcogenide composition and the fullerene-like geometry and/or tubular-like geometry may range from 5 microns to 20 microns. In yet another embodiment, the thickness of the coating including the base material and the inorganic materials having the metal chalcogenide composition and the fullerene-like geometry and/or tubular-like geometry may range from 2 microns to 10 microns. FIGS. 8A and 8B depict one embodiment of a coating including a polymeric base material and a dispersed phase of nanospheres with a fullerene-like geometry and metal chalcogenide composition with a molecular formula $MX_2$, such as $WS_2$.

In one embodiment, the inorganic material having the metal chalcogenide composition and the fullerene-like geometry with and/or without the sectioned outer layer, and/or tubular-like geometry is present in the polymeric base material at volume percent ranging from 0.001% to 80%. In another embodiment, the inorganic material having the metal chalcogenide composition and the fullerene-like geometry with and/or without the sectioned outer layer, and/or the tubular-like geometry is present in the polymeric base material at volume percent ranging from 0.01% to 30%.

In another aspect of the present disclosure, a deposition method is provided to form a coating including inorganic materials having the metal chalcogenide composition and the fullerene-like geometry and/or tubular-like geometry. In some embodiments, such as the methods of forming a coating including a polymeric base material, the deposition surface of the component being coated may be treated with a surface pre-treatment prior to being coated.

In some embodiments, the pre-treatment process modifies the surface of the substrate, i.e., modifies by a mechanism of surface exchange (not the addition of a new layer), in order to allow better wetting, coating, interlocking on the substrate surface, chemical computability and consequently to all of these, improved adhesion and coating performance. One example of a surface exchange methods that are suitable for use with the present disclosure include phosphating.

Phosphating is a chemical process for treating the deposition surface, such as an iron containing deposition surface, e.g., steel, whereby the metal-phosphate modified surfaces that are hardly soluble are formed on the base material. Phosphating of depositions surfaces including iron, such as carbon steel, may include manganese phosphate, zinc phosphate, iron phosphate and a combination thereof. In addition to iron and steel, other materials that may be treated using a phosphating pretreatment include zinc, cadmium, aluminum, tin and galvanized steel, and combinations thereof.

The metal-phosphate modified surfaced created by phosphating are porous, absorbent and are suitable without further treatment for coating. In some embodiments, the application of phosphate pre-treatment processes makes use of phosphoric acid and takes advantage of the low solubility of phosphates in medium or high pH solutions. Iron, zinc or manganese phosphate salts may be dissolved in a solution of phosphoric acid. In some embodiments, when a deposition surface of steel or iron parts is placed in the phosphoric acid, an acid and metal reaction takes place which locally depletes the hydronium ($H_3O^+$) ions, raising the pH, and causing the dissolved salt to fall out of solution and be precipitated on the surface. The acid and metal reaction also creates iron phosphate locally which may also be deposited, such as zinc phosphate or manganese phosphate. In some embodiments, the acid and metal reaction also generates hydrogen gas in the form of tiny bubbles that adhere to the surface, e.g., deposition surface, of the metal being treated. The presence of the hydrogen bubbles adhering to the deposition surface can prevent the acid from reaching the metal being treated and slows down the reaction. To overcome the formation of hydrogen bubbles at the deposition surface during the phosphating pre-treatment process, sodium nitrite may be added to act as an oxidizing agent that reacts with the hydrogen to form water. In this example, hydrogen is prevented from forming a passivation layer on the surface by the oxidant additive. In one embodiment, the process sequence for a phosphating pre-treatment process includes cleaning the deposition surface, rinsing, surface activation, phosphating, rinsing and drying. Surface activation may include activating the metal with, for example, a titanium based alkali chemical, to obtain fine crystalline structure for phosphate coating, which will increase corrosion resistance and adhesion properties. Prior to phosphating, the substrate is degreased (using organic solvents and/or an alkaline cleaner), roughened (via sand blasting), with rinsing between each of these steps (with distilled or deionized water).

In addition to phosphating, other pre-treatment processes that are suitable for use with the present disclosure include oxide coatings. Oxide coatings are in fact corrosion products having a thickness of less than 0.25 microns, which provide for good adhesion of the later formed coating. Oxide coatings may be formed using heat, chemical reaction or electrochemical reactions. Some examples of oxide coating processes suitable for the pretreatment of the deposition surface include gun-bluing oxidation, oxides formed from chemical baths, and anodizing.

In other embodiments, the pre-treatment process for treating the deposition surface prior to coating may be chromate coatings. Chromate coating are a chemical conversion process. Chromate coatings may be formed by reaction of water solutions of chromic acid or chromium salts. Chromate coatings as a pre-treatment process may be applied to metal deposition surfaces, such as aluminum surfaces, zinc surfaces, cadmium surfaces and magnesium surfaces.

It is noted that the above description of pre-treatment processes are provided for illustrative purposes only and are not intended to limit the present disclosure. It is further noted that the above described pre-treatment processes may be optional in some of the following described deposition methods for forming the coating.

In one embodiment, the deposition method employs physical vapor deposition (PVD) to form a coating including the inorganic materials having the metal chalcogenide composition and the fullerene-like geometry (with and/or without a sectioned outer layer) and/or tubular-like geometry. Physical vapor deposition (PVD) is a process to produce a metal deposition species that can be deposited on electrically conductive materials as a thin adhered pure metal or alloy coating. The process may be carried out in a vacuum chamber at high vacuum ($10^{-6}$ torr). Examples of PVD processes include plating, single target sputtering, dual target sputtering, cathodic arc deposition, electron beam physical vapor deposition, evaporation deposition, pulsed laser deposition, and combinations thereof.

Cathodic arc deposition is a PVD method, in which a high power electric arc discharged at the target (source) material blasts away some into highly ionized material to be deposited onto the workpiece. Electron beam physical vapor deposition is a PVD method in which the material to be deposited is heated by electron bombardment in a vacuum and is transported by diffusion to be deposited by condensation on the (cooler) workpiece, i.e., deposition surface. Evaporative deposition is a PVD method, in which the material to be deposited is heated to a high vapor pressure by electrically resistive heating in a "low" vacuum. Pulsed laser deposition is a PVD method in which a high power laser ablates material from the target into a vapor. As used herein, "sputtering" means a method of depositing a film of material on a deposition surface, in which a target of the desired material, i.e., source, is bombarded with particles, e.g., ions, which knock atoms from the target, and the dislodged target material deposits on the deposition surface. Examples of sputtering apparatuses include DC diode type systems, radio frequency (RF) sputtering, magnetron sputtering, and ionized metal plasma (IMP) sputtering.

In each of the above described PVD methods, a target is provided as a source material for deposition. To provide the coatings of the present disclosure the target may include a powder of the base material layer in combination with the inorganic materials having the metal chalcogenide composition and the fullerene-like geometry and/or tubular-like geometry. When the target includes both the material for the base material layer and the inorganic materials having the metal chalcogenide composition and the fullerene-like geometry (with and/or without a sectioned outer layer) and/or tubular-like geometry, the system may be referred to as a single target. The material for the base material layer and the inorganic materials having the metal chalcogenide composition and fullerene-like geometry and/or tubular-like geometry may be milled together to provide a sufficient particle size using at least one of high-shear mixers, two or three roll mixers, homogenizers, bead mills, ultrasonic pulverizer, attritor, agitator, ball mill, bead mill, basket mill, colloid mill, high speed disperser, edge runner, jar mill, low speed paddle mixer, variable speed mixer, paste mixer, ribbon blender, pug mixer, nauta mixer, sand/perl mill, triple roll mill, two roll mill, planetary mixer, slow speed mixer, high speed mixer, twin shaft mixer, multi shaft mixer, sigma kneader, rotor-Stator mixer, homogenizer/emulsifier, high shear mixer, conical blender, V-blender, double cone blender, suspended mixer and combinations thereof. In some embodiments, a fluid medium, such as water or an alcohol, is employed during milling. In other embodiments, two targets may be employed in the physical vapor deposition (PVD) process. For example, one target may provide the source for the base material layer, and a second target may provide the source for the inorganic materials having the metal chalcogenide composition and the fullerene-like geometry and/or tubular-like geometry.

In some embodiments, when forming the target for the physical vapor deposition (PVD) method the particles of the metal chalcogenide may be functionalizing with an agent that is selected from the group consisting of non-anionic surfactants, anionic surfactants, cationic surfactants, zwitterionic surfactants, surfactants, silanes, thiols, polymers and dopants.

Following formation of the target, the deposition surface may be cleaned of any oxide or surface residue, and the coating may be applied by the physical vapor deposition (PVD) process.

In another aspect of the present disclosure, the coating may be deposited using an electroplating process. Electroplating is a process that uses electrical current to control the flow of charged particles, such as metal cations and anions, so that they form a coherent metal coating on an electrode, which may provide the deposition surface. The process used in electroplating is called electrodeposition. It is analogous to a galvanic cell acting in reverse. The part to be plated is the cathode of the circuit. In one technique, the anode is made of the metal to be plated on the part. Both components are immersed in a solution called an electrolyte containing one or more dissolved metal salts as well as other ions that permit the flow of electricity. A power supply supplies a direct current to the anode, oxidizing the metal atoms that comprise it and allowing them to dissolve in the solution. At the cathode, the dissolved metal ions in the electrolyte solution are reduced at the interface between the solution and the cathode, such that they "plate out" onto the cathode.

In one embodiment, both the component that provides the base material layer in combination with the inorganic materials having the metal chalcogenide composition and the fullerene-like geometry (with and/or without a sectioned outer layer) or tubular-like geometry are positioned within the plating solution.

In one example, the electroplating process is a chrome plating process applied to a steel bearing, in which the chrome plating includes an inorganic material of a tungsten disulfide ($WS_2$) or molybdenum disulfide ($MoS_2$) composition having a fullerene-like geometry (with and/or without a sectioned outer layer) and/or tubular-like geometry. In one example, a chrome plating process includes degreasing of the deposition surface to remove soiling and placement of the deposition surface into a chrome plating vat. Once the deposition surface is present in the chrome plating vat it is allowed to warm to solution temperature, and a plating current is applied to the system, under which the deposition surface is left for the required time to attain thickness. In some embodiments, the electroplating method may include non-anionic, anionic, cationic, zwitterionic, surfactants, silanes, thiols, polymers to functionalize a surface of a deposition precursor for the coating method. The electroplating method may further include doping and alloying.

Hexavalent chromium plating, also known as hex-chrome, $Cr^{+6}$, and chrome (VI) plating, uses chromic anhydride, also known as chromium trioxide, as the main ingredient of the plating bath that is contained within the plating vat. In another embodiment, the chromium bath is a mixture of chromium trioxide ($CrO_3$) and sulfuric acid (sulfate, $SO_4$). Trivalent chromium plating, also known as tri-chrome, $Cr^{+3}$, and chrome (III) plating, uses chromium sulfate or chromium chloride as the main ingredient of the plating bath. The inorganic material of tungsten disulfide ($WS_2$) or molybdenum disulfide ($MoS_2$) composition having a fullerene-like geometry (with and/or without a sectioned outer layer) and/or tubular-like geometry may be included in the plating bath for incorporation into the coating during plating of the deposition surface. The inorganic material of a tungsten disulfide ($WS_2$) or molybdenum disulfide ($MoS_2$) composition having a fullerene-like geometry (with or without sectioned outer portion) and/or tubular-like geometry may be functionalized to provide the appropriate charge for plating to the deposition surface.

In another embodiment, the coating may be formed by chemical vapor deposition (CVD). Chemical vapor deposition (CVD) is a deposition process in which a deposited species is formed as a result of a chemical reaction between gaseous reactants at greater than room temperature, wherein solid product of the reaction is deposited on the surface on which a film, coating, or layer of the solid product is to be formed. Variations of CVD processes suitable for providing at least one element of the coating include, but are not limited to: Atmospheric Pressure CVD (APCVD), Low Pressure CVD (LPCVD), Plasma Enhanced CVD (PECVD), Metal-Organic CVD (MOCVD), atomic layer deposition, and combinations thereof.

In yet another embodiment, the coating may be formed by solvent transport medium a coating on the deposition surface includes particles of a metal chalcogenide comprising a fullerene-like geometry (with and/or without a sectioned outer layer), a tubular-like geometry or a combination of fullerene-like geometries and tubular-like geometries particles, wherein the metal chalcogenide composition has a molecular formula of $MX_2$. In some embodiments, the coating formed by the solvent transport medium may be one method that can be employed for forming a coating including a polymeric base material, e.g., a polymer provides the matrix phase of the coating containing a dispersed phase of nanospheres with a fullerene-like geometry and/or tubular like geometry, and metal chalcogenide composition with a molecular formula $MX_2$. In some embodiments, when the coating includes a polymeric base material, a pre-treatment process, such as phosphating with manganese phosphate, zinc phosphate, and/or iron phosphate, is applied to the deposition surface prior to applying the coating.

The solvent transport medium may include an aqueous medium or alkyds, acrylics, vinyl-acrylics, vinyl acetate/ ethylene (V AE), polyurethanes, polyesters, melamine resins, epoxy, or oil based medium. The solvent transport medium applied to the deposition surface using at least one of brushing, dipping, spraying, curtain coating and combinations thereof. The solvent transport medium may include non-anionic surfactants, anionic surfactants, cationic surfactants, zwitterionic surfactants, surfactants, silanes, thiols, polymers, doping and alloying additives to functionalize a surface of the particles of the metal chalcogenide.

In some embodiments, such as the embodiments in which the coating includes a polymeric base material, the solvent for applying the coating may include alcohols, such as ethanol and isopropanol, pyrrolidones, such as N-Methyl-2-pyrrolidone (NMP) and N-ethyl-2-pyrrolidone (NEP), xylenes, ethylbenzene, and n-butyl-acetate. Some examples of solvents that are suitable for forming coatings by solvent transport medium include acetic acid, acetone, acetonitrile, benzene, n-butanol, butyl acetate, carbon tetrachloride, chloroform, cyclohexane, 1,2-dichloroethane, dichloromethane, dimethylformamide, N,N-dimethylacetamide (DMAC), propylene carbonate (PC), dimethyl sulfoxide, dioxane, ethanol, ethyl acetate, di-ethyl ether, heptane, hexane, methanol, methyl-t-butyl ether, methyl ethyl ketone, pentane, n-propanol, iso-propanol, di-iso-propyl ether, tetrahydrofuran, toluene, trichloroethylene, water, xylene and combinations thereof. Xylene (also referred to as Dimethylbenzenes) is an aromatic hydrocarbon consisting of a benzene ring with two methyl substituents. Xylene as a solvent transport medium may xylenes having a molecular formula of $C_8H_{10}$, $C_6H_4(CH_3)_2$ or combinations thereof. In some examples, xylene may include ortho-xylene (1,2-Dimethylbenzene), meta-xylene (1,3-Dimethylbenzene), para-xylene (1,4-Dimethylbenzene) and combinations thereof.

In some embodiments, in which the coating includes a base layer of a polymer containing a dispersed phase of the inorganic material of a metal chalcogenide composition with a fullerene like (with and/or without a sectioned outer layer) and/or tubular-like geometry, such as tungsten disulfide ($WS_2$), the coating method may begin with forming a dispersion. When the inorganic material of a metal chalcogenide composition with a fullerene like or tubular-like geometry has a geometry with a greatest dimension greater than $10^{-6}$ nm, the dispersion may be a suspension, in which the inorganic material of a metal chalcogenide composition with a fullerene like (with and/or without a sectioned outer layer) and/or tubular-like geometry can settle from suspension, but may be reintroduced into the suspension by agitation by a mechanical means, e.g., by shaking or stirring. In some examples, additives may be employed to improve the stability of the dispersion. For example, in some embodiments, when the inorganic material of a metal chalcogenide composition with a fullerene like or tubular-like geometry has a geometry with a greatest dimension of $10^{-9}$ nm, the dispersion is a suspension, in which the metal chalcogenide with a fullerene like or tubular-like geometry stays in suspension. In other embodiments, when the inorganic material of a metal chalcogenide composition with a fullerene like or tubular-like geometry has a geometry with a greatest dimension ranging from $10^{-6}$ nm to $10^{-8}$ nm, the dispersion is a colloidal dispersion, in which the metal chalcogenide with a fullerene like or tubular-like geometry stays in suspension.

In some embodiments, the dispersion for forming the coating may include at least one solvent, at least one precursor for polymer formation and a metal chalcogenide having a molecular formula $MX_2$ and a fullerene (with and/or without a sectioned outer layer) and/or tubular-like geometry. For example, the amount of metal chalcogenide having a molecular formula $MX_2$ and a fullerene and/or tubular-like geometry in the dispersion may range from 0.1 wt. % to 50 wt. %. In another example, the amount of metal chalcogenide having a molecular formula $MX_2$, and a fullerene and/or tubular-like geometry in the dispersion may range from 0.1 wt. % to 20 wt. %. In different embodiments, the amount of metal chalcogenide in the dispersion may be at least 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. % nm, 29 wt. %, 31 wt. %, 32 wt. %, 33 wt. %, 34 wt. % or 35 wt. % or any range therebetween (e.g., 15 wt. % to 20 wt. %, 20 wt. % to 25 wt. %, 25 wt. % to 30 wt. %, or 30 wt. % to 35 wt. %), or between any of the foregoing values and up to or less than 50 wt. %. The metal chalcogenide may be any of the above described compositions having the molecular formula $MX_2$, such as tungsten disulfide ($WS_2$). In some embodiments, the metal chalcogenide may include more than one composition. For example, the metal chalcogenide composition with a fullerene like or tubular-like geometry may include a portion of tungsten disulfide $WS_2$ in combination with molybdenum disulfide $MoS_2$. Other particles may also be introduced to this dispersion, e.g., graphite and $MoS_2$ platelets.

The amount of polymer precursor in the dispersion may from 5 wt. % to 40 wt. %. In another example, the amount of polymer precursor in the dispersion may range from 7 wt. % to 15 wt. %. In different embodiments, the amount of polymer precursor in the dispersion may be at least 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. % or 20 wt. % or any range there between (e.g., 5 wt. % to 10 wt. %, 10 wt. % to 15 wt. %, or 15 wt. % to 20 wt. %, or between any of the foregoing values and up to or less than 30 wt. %. The polymer precursor may be any material that can provide one of the aforementioned polymers for the base layer of the coating. For example, the polymer precursor may provide a polyamide and/or polyamide imide.

The amount of solvent in the dispersion may range from 20 wt. % to 90 wt. %. In another example, the amount of solvent in the dispersion may range from 50 wt. % to 90 wt. %. In different embodiments, the amount of solvent in the dispersion may be at least 40 wt. %, 42 wt. %, 44 wt. %, 46 wt. %, 48 wt. %, 50 wt. %, 52 wt. %, 54 wt. %, 56 wt. %, 58 wt. %, 60 wt. %, 62 wt. %, 64 wt. % or 65 wt. % or any range therebetween (e.g., 40 wt. % to 45 wt. %, 45 wt. % to 55 wt. %, 55 wt. % to 60 wt. % or 60 wt. % to 65 wt. %), or between any of the foregoing values and up to or less than 70 wt. %. The solvent may include any the aforementioned solvents. For example, the solvent may include a combination of NMP (M-methyl-2-pyrrolidone), xylene, and ethylbenzene. The solvent content can be set to provide a concentrated dispersion product that is to be diluted by the customer prior to use, or at a solvent content for use without dilution.

In some embodiments, the dispersion may further include a carbon containing material, such as graphite, carbon black or carbon nanotubes.

In some embodiments, the dispersion may be formed by mixing the solvent, polymer precursor, the metal chalcogenide having a molecular formula $MX_2$ and a fullerene (with and/or without a sectioned outer layer) and/or tubular-like geometry, and the optional carbon containing material through the use of a mixer, such as two or three roll mixers, homogenizers, bead mills, ultrasonic pulverizer, ribbon blender, v blender, colloid mills, stirrers, agitators, blending systems, continuous processor, cone screw blender, double planetary, counter-rotating, vacuum mixer, dispersion mixer, magnetic stirrers, high shear mixtures and variations thereof.

In one example, in which the dispersion is formed in a high-shear mixer, such as a high speed mixer sold under the tradename DISPERMAT® by VMA-GETZMANN GMBH. The high-shear mixer may include a double jacket for containing the cooling liquid. The high shear mixture may employ metallic media beads, e.g., 2 mm diameter media, or ceramic media beads, e.g., 0.4 m to 0.6 mm diameter ceramic media. A nylon impeller is used to stir the media and the material being formed into the dispersion. The vessel of the high-shear mixture is connected to a cooling system, and sealed during the mixing process to eliminate evaporation of solvents.

In another example, in which the dispersion is formed in a stirred bead mill, such as a stirred bead mill produced by WAB, the media to form the dispersion may be stirred in a vessel, and pumped into a closed chamber with $ZrO_2$ beads that stir at a high velocity. The grinded media may be circulated and stirred from between the chamber and the vessel of the stirred bead mill.

Table 1 is the composition of one example of a dispersion, in accordance with the present disclosure.

TABLE 1

EXAMPLE: DISPERSION COMPOSITION

| MATERIAL | PERCENTAGE (BY WT. %) |
|---|---|
| NMP (M-methy-2-pyrrolidone) | 42.6 |
| PAI (poly-amide-imide) | 6.4 |
| Tungsten disulfide ($WS_2$) | 21 |
| Xlyene | 22.7 |
| Ethylbenzene | 7.3 |

For the composition of the dispersion that is described in Table 1, the media beads, e.g., 0.8 mm ceramic beads, of the high shear mixer or the stirred bead mill may be present at approximately 267 gram beads per 100 grams of material being mixed in forming the dispersion.

In one embodiment, the procedure for mixing the dispersion for forming the coating having the polymeric base material in a high shear mixer includes dissolving the polymer precursor, e.g., poly-amide-imine (PAI), in solvent, such as NMP (M-methyl-2-pyrrolidone). For example, mixing the polymer precursor with solvent, may include pouring a measured amount of solvent into the vessel of the stirring apparatus followed by adding metal and/or ceramic media beads. The polymer precursor material, e.g., poly-amide-imide (PAI), may then be added to the solvent and media that is contained within the vessel, wherein the mixture is stirred for 5 minutes to 30 minutes, e.g., 15 minutes, under cooling and sealing.

In a following step, the metal chalcogenide having the molecular formula $MX_2$ and a fullerene (with and/or without a sectioned outer layer) and/or tubular-like geometry, e.g., fullerene geometry tungsten disulfide $WS_2$, may then be added to the mixture of the polymer precursor and solvent in the vessel of the high shear mixer. In some embodiments, when the optional carbon-containing material is being introduced, the carbon containing material can be mixed into the mixture of the polymer precursor and the solvent with the metal chalcogenide having the molecular formula $MX_2$ and a fullerene and/or tubular-like geometry. In some embodiments, a homogeneous mix of inorganic fullerene-like and/or tubular particles with carbon-containing materials is provided by premixing the inorganic material having the metal chalcogenide composition and the fullerene-like and/or tubular-like geometry with the carbon containing material.

In one embodiment, the premixing step for mixing the inorganic material having the metal chalcogenide composition and the fullerene-like and/or tubular-like geometry with the carbon containing material may be done by dry mixing. In another embodiment, the premixing step may employ a solvent as a mixing media, such as alcohol. Examples of mixing media that are suitable for mixing the inorganic material having the metal chalcogenide composition and the fullerene-like and/or tubular-like geometry with the carbon containing materials include an alcohol, such as methyl alcohol, ethyl alcohol, isopropyl alcohol, propanol, butanol, hexanol, heptanol, octanol, ethylene glycol, glycerol and combinations thereof. In another embodiment, the mixing media may be an inert solvent. The carbon containing material and is optional and may be omitted from the dispersion.

The combination of the metal chalcogenide having the molecular formula $MX_2$ and a fullerene and/or tubular-like geometry, the polymer precursor, the solvent and the optional carbon containing material may then be stirred for three hours to nine hours. In one example, stirring of the metal chalcogenide, polymer precursor, and the solvent may be mixed for six hours. In one embodiment, the dispersion may be finalized by adding additional solvent, such as xylene, ethylbenzene and combinations thereof. The function of xylene and ethylbenzene is to form a liquid that is paintable (via spray, brush etc.), they are used as thinners for the highly viscous mixture based on PAI in NMP. The mixture may then be stirred for an additional 5 minutes to 20 minutes, e.g., 15 minutes. The media from the high shear mixer may then be sieved from the dispersion, and the dispersion may then be stored for use. It is important to store it in a sealed vessel, e.g. a metallic can, in order to prevent water absorption and degradation.

In another aspect of the present disclosure, the dispersion of solvent, polymer precursor, the metal chalcogenide having a molecular formula $MX_2$ and a fullerene and/or tubular-like geometry, and the optional carbon containing material may be applied to a metal surface to form a coating of a polymeric base layer (also referred to as polymer matrix) with a dispersed phase of the inorganic material of a metal chalcogenide composition with a fullerene like or tubular-like geometry, and an optional dispersed phase of carbon containing material. In some embodiments, the dispersion provides nanoparticulate suspension in a carrier solvent, which is to be applied to a deposition surface via brushing, dipping or spraying to form a coating that reduces the coefficient of friction (COF) and wear of the deposition surface. In some embodiments, the dispersion allows for shipping of the product to an intended user, which allows for storage of the dispersion until it is used in a coating application.

In some embodiments, the application of the dispersion of solvent, polymer precursor, the metal chalcogenide having a molecular formula $MX_2$ and a fullerene and/or tubular-like geometry, and the optional carbon containing material may be applied to a metal surface to form a coating of a polymeric base layer (also referred to as polymer matrix) using a process sequence that includes surface conditioning for the deposition surface, phosphating the deposition surface, and spraying the dispersion onto the depositions surface to form a coating. In this example, the deposition surface may be an iron containing surface, such as carbon steel.

In one embodiment, the conditioning step for applying the coating from the dispersion, such as the dispersion having the composition in Table 1, to the deposition surface may begin with sonicating the deposition surface in a hot chemical soap, i.e., 80 parts water: 20 parts soap. The time period for sonicating may range from 10 minutes to 20 minutes. In one example, the time period for sonicating may be on the order of 15 minutes. Another form of treatment with chemical soap may be via an alkaline formula designated for metal cleaning, e.g. Enprep Q576.

In one embodiment, the phosphating step may include mixing all of the phosphating ingredients in a container suitable, such as a glass container, for the deposition surface to be phosphated and heated to a temperature ranging from 95° C. to 98° C. The phosphating ingredients for treating an iron containing deposition surface, such as carbon steel, may include the composition of Table 2, as follows:

TABLE 2

| EXAMPLE: PHOSPHATING COMPOSITION | |
|---|---|
| MATERIAL | AMOUNT |
| Ento-Phos MN-850 | 26-30 ml |
| DDW (doule distilled water) | 170 ml |
| Iron sulfate | 300 mg-480 mg |

In another embodiment, a surface treatment is provided by a designated chemical bath (made of, e.g. polystyrene) with built in heater, agitation setup (e.g. condensed air outlet pipe), and a thermometer. Additionally, there are other phosphating processes that are suitable for use with the present disclosure including different materials and conditions. For example, a process of zinc-phosphate surface exchange treatment may be employed at a temperature ranging from 60° C.-88° C. with the following composition including Amphos in an amount ranging from 300-240 ml, Amphos in an amount ranging from 504-480 ml, DDW (doule distilled water) to complete to 12 L, and sodium carbonate (soda ash) at approximately 5 grams.

The deposition surface may be dipped in the solution described in Table 2 for a time period ranging from 5 minutes to 30 minutes. For example, the time period for submersion of the deposition surface within the phosphating solution may range from 6 minutes to 15 minutes. The time period of the phosphating treatment may vary depending on the size and geometry of the deposition surface. In some examples, the time period for phosphating may continue until the formation of bubbles within the phosphating solution becomes seldom. The formation of bubbles indicate the phosphate exchange process at the surface, when an equilibrium is formed, the bubbles stop. Following the submersion time in the phosphating solution, the component including the deposition surface is removed from the phosphating solution and washed with water, such as double distilled water. It is noted that any of the above mentioned pretreatment processes for surface treating the deposition surface prior to forming the coating may be substituted for the phosphating step.

The deposition surface may then be coated. For example, a dispersion, as described above, e.g., the dispersion described in Table 1, may be applied using a spray deposition process. In one example, the spray deposition process includes a device to spray a coating (paint, ink, varnish, etc.) through the air onto the deposition surface. For example, the spray deposition process may include the use of an air-pressurized spray gun with an air source provided by an air compressor. In one example, in a manual operation method the air-gun sprayer is positioned about 6 inches to 10 inches (15-25 cm) from the deposition surface, and moved back and forth over the deposition surface, each stroke overlapping the previous to ensure a continuous coat.

In an automatic process the gun head is attached to a mounting block and delivers the stream of dispersion material for forming the coating having the polymeric material from that position. The deposition surface being coated is usually placed on rollers or a turntable to ensure overall equal coverage of all sides.

In some embodiments, the air spay system may be a HVLP (High Volume Low Pressure) system, in which the spray gun use 8-20 cfm (13.6-34 $m^3$/hr); or a LVLP (Low Volume Low Pressure), which operates at a lower pressure and lower volume of air than HVLP systems. In another embodiment, the coating may be applied by electrostatic spray painting. In electrostatic spray painting or powder coating, the atomized particles of the dispersion are electrically charged, thereby repelling each other and spreading themselves evenly as they exit the spray nozzle of the gun. The deposition surface being coated is charged oppositely or grounded. The dispersion for the coating is then attracted to deposition surface giving a more even coat than wet spray painting, and also greatly increasing the percentage of paint that sticks to the object. In other embodiments, the dispersion for the coating may be applied to the deposition surface using hot spray, air assisted airless spray guns, airless spray guns, automated linear spray systems, vacuum coating systems, automated flat line spray systems and combinations thereof.

It is noted that spraying is only one example of a deposition method for applying the dispersion for forming the coating onto the deposition surface. It is noted that other methods for applying the dispersion to the deposition surface include brushing, dipping or curtain coating.

Following application of the coating onto the deposition surface, e.g., spraying of the dispersion onto the deposition surface, the coating may be dried. For example, drying of the coating may begin with ambient drying, i.e., drying at room temperature, e.g., 20° C. to 25° C., for a time period of 15 minutes to 1 hour, e.g., 30 minutes. In some cases, this step is skipped, in order to avoid water absorption to the coating, and the coated substrate is directly heated to 60-80° C. Following ambient drying, the coating may be dried at temperature of 60° C. to 100° C., e.g., 90° C., for 15 minutes to 1 hour, e.g., 30 minutes. In a following process step, the coating may be cured at a temperature ranging from 200° C. to 240° C., e.g., 220° C., for 15 minutes to 1 hour, e.g., 30 minutes. The temperature of the coating may be increased using furnaces, ovens, induction heaters, resistance heaters, and combinations thereof. Following curing, the coating may be allowed to cool to room temperature.

Figure 10:
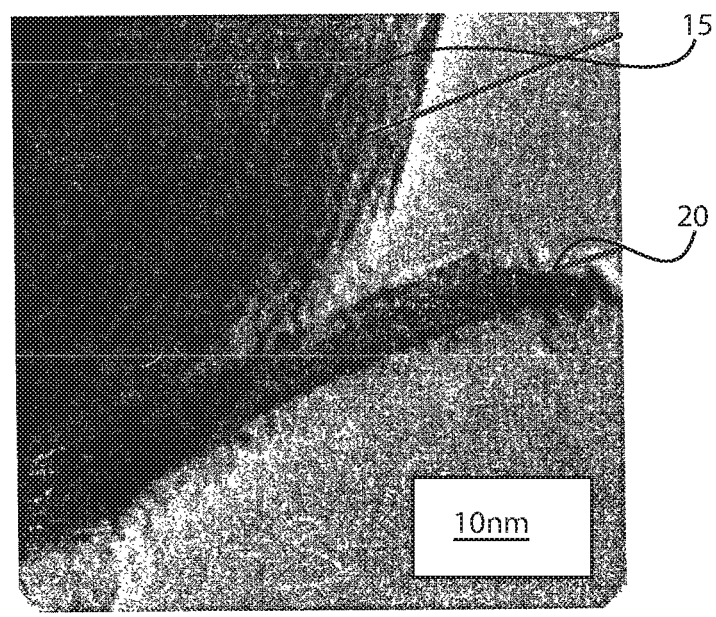
FIG. 10 is transmission electron microscope (TEM) image of a multi-layered nanosphere of metal chalcogenide having a molecular formula $MX_2$ with a fullerene-like geometry under a stress that exfoliates tribofilm lamellas that fill and re-smoothen damaged surfaces, in accordance with one embodiment of the present disclosure.

FIG. 10 depicts one embodiment of how continuous friction applied to a metal chalcogenide of tungsten disulfide ($WS_2$) having a fullerene like geometry 15 will exfoliate the outer layers of material onto a frictional surface that is applying pressure to the tungsten disulfide material, wherein the exfoliating outer layers create a tribofilm layer 20. A "tribofilm" is defined as a thin solid film generated as a consequence of sliding contact, which is adhered on a contacting, i.e., frictional, surface, but has different chemical composition, structure and tribological behavior than the contacting surface.

Figure 11:
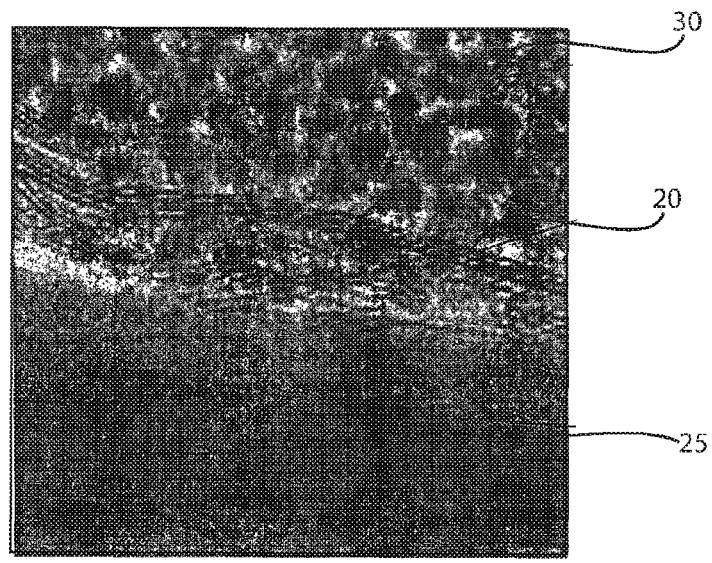
FIG. 11 is a transmission electron microscope (TEM) image of a surface coated with the tribofilm.

One example, of a tribofilm layer 20 formed on a surface 25 is depicted in FIG. 11. The exfoliated nano-particle layers accumulate in wear crevices in the surface 25 that the tribofilm layer 20 is formed on, and attaches to the metal surface, creating a continuous super-lubricating tribofilm layer 20. The exfoliated tribofilm layers from the metal chalcogenide of the coating may be referred to as lamellas. The lamellas orient parallel to the deposition surface in the direction of the frictional motion. Even between highly loaded stationary surfaces the lamellar structure is able to prevent contact.

In some embodiments, the tribofilm layer 20 provides a damping effect to absorb shock between the surface 25 that the tribofilm layer 20 is formed on an a second surface that the tribofilm layer 20 is formed on. The particles, being closed-cage, absorb pressure. Additionally, in the direction of motion the lamellas of the tribofilm layer 20 easily shear over each other resulting in a low friction. The lubricating tribofilm layer 20 repairs wear damage, prevents further wear, reduces the coefficient of friction and reduces the local temperature.

Dynamic mechanical systems, such as certain parts within combustions engines used in transportation applications, which withstand friction conditions with a metallic counterpart can be modified with a polymer film (in thickness of a few μm and up, depending on the required tolerance) including dispersed phase of the inorganic material of a metal chalcogenide composition with a fullerene like or tubular-like geometry. The significance of such a film is both in reducing the coefficient of friction (COF), and in impeding the wear of the surface. For example, main crankshaft (slide-journal) bearings of vehicles work normally under hydrodynamic lubrication regime. However, under certain conditions, e.g., the beginning of engine run and high-cornering of vehicles, local 'oil-starvation' occurs at bearing surfaces, resulting in mixed or even boundary lubrication conditions. In vehicles employing fuel-efficient technologies, such as 'start-stop' and hybrid engines, this difficulty is amplified.

Figure 12A:
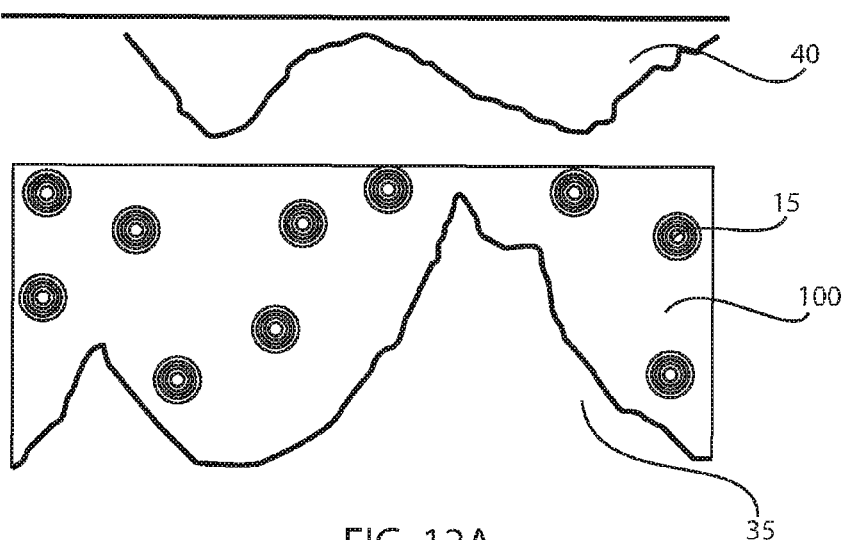
FIG. 12A is an illustration depicting a surface that has been coated with a coating including a polymeric base material and a dispersed phase of metal chalcogenide having a molecular formula $MX_2$ and a fullerene-like geometry, in accordance with one embodiment of the present disclosure.
Figure 12B:
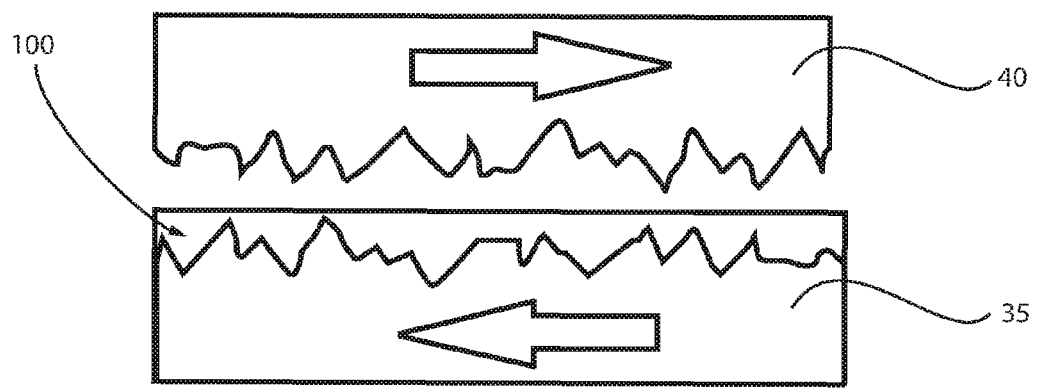
FIG. 12B is an illustration depicting another stage of the application of a friction force to the surface that has been coated with a coating including a polymeric base material and a dispersed phase of metal chalcogenide having a molecular formula $MX_2$ and a fullerene-like geometry, in accordance with one embodiment of the present disclosure.
Figure 12C:
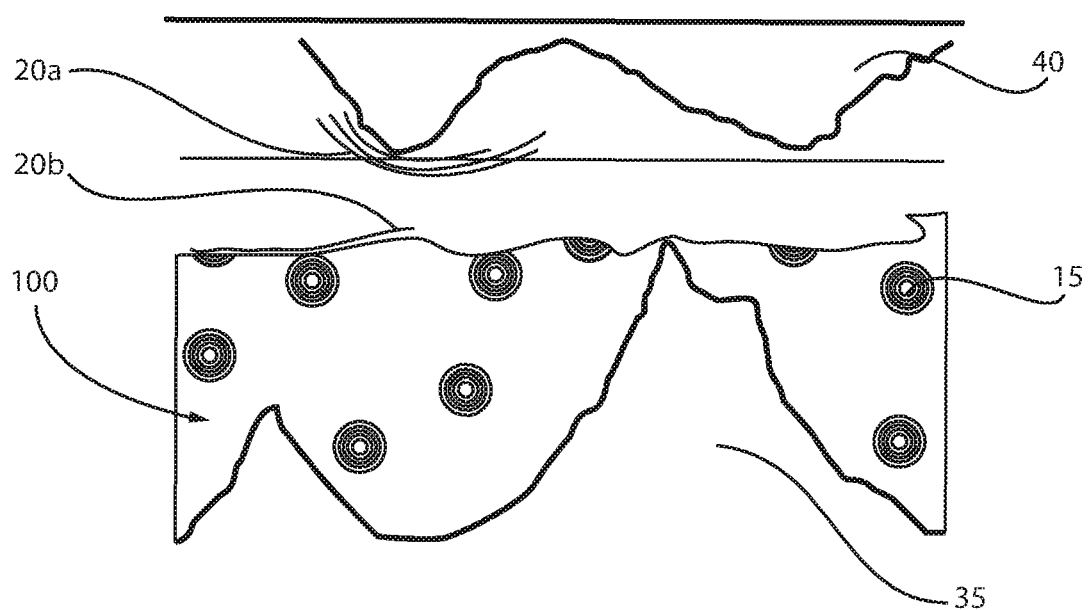
FIG. 12C is an illustration depicting a further stage of the application of a friction force to the surface that has been coated with a coating including a polymeric base material and a dispersed phase of metal chalcogenide having a molecular formula $MX_2$ and a fullerene-like geometry, in accordance with one embodiment of the present disclosure.

Referring to FIGS. 12A-12C, a polymer coating 100 containing metal chalcogenide, e.g., tungsten disulfide $WS_2$, with a fullerene like or tubular-like geometry 15 (with and/or without sectioned outer portion) decreases the coefficient, protects the bearing surface 35 and prevents its wear, thanks to its inherent active protection layer. FIG. 12A depicts the polymer coating 100 on a bearing surface 35 prior to the application of frictional force, such as contact between the frictional contact surface 40 and the polymer coating 100. Frictional contact between the polymer coating 100 that is present on the bearing surface 35 and the friction contact surface 40 is depicted in FIG. 12B, in which motion between the frictional contacting surfaces is illustrated by the depicted arrows. As depicted in FIG. 12C, wear of a coating 100 including the chalcogenide of tungsten disulfide ($WS_2$) having a fullerene like geometry 15 creates a tribofilm 20a of exfoliated material of metal chalcogenide, e.g., tungsten disulfide $WS_2$, with a fullerene like or tubular-like geometry 15 (with and/or without the sectioned outer portion) from the polymer coating 100 on the surface 40 contacting the polymer coating 100. Further, exfoliated material of metal chalcogenide, e.g., tungsten disulfide $WS_2$, with a fullerene like or tubular-like geometry 15 (with and/or without a sectioned outer portion) from the polymer coating 100 can create a fresh tribofilm 20b on the coating 100 itself. Consequently, the coefficient of friction for the coated structure is constantly low. The phenomena described with reference to FIGS. 12A-12C prolong the life of the automotive components coated in accordance with the present disclosure, reduce fuel consumption, and increase vehicle reliability. Although, FIGS. 12A-12C describe the advantages of the exfoliated tribofilm from a coating having a polymeric base material, the description is equally applicable to all the coatings described in the present disclosure, so long as the coating contains inorganic metal chalcogenide having the composition $MX_2$, with a fullerene like (with or without a sectioned outer portion) or tubular-like geometry, such as tungsten disulfide $WS_2$.

The common coatings for metallic bearing surfaces are currently lead-based alloys (e.g. Babbitt), which are undesirable. Some alternatives to lead containing films are composed of polymers with an addition of PTFE, graphite and/or molybdenum disulfide. The first advantage of a polymer coating containing metal chalcogenide, e.g., tungsten disulfide $WS_2$, with a fullerene like or tubular-like geometry over these solid lubricants is their resistance to extreme conditions, namely, high pressures and temperatures.

For example, the shock-wave resistance of $WS_2$ nanotubes has been studied and compared to that of carbon nanotubes, in which it has been determined that WS$_2$ nanotubes are capable of withstanding shear stress caused by shock waves of up to 21 GPa. Under similar shock conditions, WS$_2$ tubes are more stable than carbon nanotubes, the latter being transformed into a diamond phase. In some embodiments, the supershock-absorbing ability of the IF-WS$_2$ enables them to survive pressures up to 25 GPa accompanied with concurrent temperatures of up to 1000° C. without any significant structural degradation or phase change. IF-WS$_2$ are stable in air at temperatures higher than 400° C.

Another advantage of the disclosed metal chalcogenide, e.g., tungsten disulfide (WS$_2$), with a fullerene like (with and/or without a sectioned outer portion) or tubular-like geometry is the high strength of the individual nanoparticles, i.e., tungsten disulfide (WS$_2$), making the material that is coated more resistant to wear, which is another desirable property of a tribological coating in accordance with the present disclosure.

One application for the coating including particles of a metal chalcogenide comprising a fullerene-like geometry (with and/or without a sectioned outer layer), a tubular-like geometry or a combination of fullerene-like geometries and tubular-like geometries is the automotive market, including both vehicle manufacturers and vehicle maintenance providers. For example, coatings in accordance with the present disclosure may be applied to internal combustion engine components, such as, pistons, piston rings, piston pins, crankshafts, crankshaft bearings, main bearings, camshafts, camshaft bearings, timing chain, timing gears, intake and exhaust valves, valve springs, valve guides, push rods, rocker arms, rocker arm shafts, hydraulic lifters, solid lifters, hydraulic roller lifters, solid roller lifters, camshaft followers, camshaft button, camshaft plug, compression rings, connecting rod bearings, connecting rod bolts, connecting rod caps, connecting rods, engine mounts, exhaust manifolds, exhaust valves, oil rings, pins, valve keepers, valve retainers, valve seats, and combinations thereof. In some embodiments, the coatings in accordance with the present disclosure may be applied to automotive transmission components, such as torque converter components, vacuum modulator components, accumulator rings, accumulator seals, bands, bearings, boost valves, bushings, chains, check balls, clips, clutch drums, clutch pistons, clutch plates, clutch seals, clutch packs, control rings, counter shafts, servo components, detent camshafts, gears, governor components, idler shafts, input shafts, intermediate shafts, output shaft, main shafts, manual valves, modulator valves, planetary gear carriers, planetary gears, pump gears, pump guide rings, pump vanes, ring gears, roller clutches, servo rings, servo seals, servo sleeve, shift forks, shift shafts, shift valves, shifter shaft, snap rings, shift solenoids, speedometer drive, sprags, sprockets, strators, strator shafts, sun gear shell, sun gears, synchronizer key(s), synchronizer ring, synchronizer sleeves, synchronizer(s), throttle valve, turbine, transfer shaft, valve body and associated components, valve pack and combinations thereof. The coating may also be applied to supercharger and turbo charger components, such as vanes, turbines, impellers, shafts, bearings and housings. In other embodiments, the coating may be applied to components of automotive front differential, rear differential and transfer cases. For example, the coating may be applied to pinion bearings, pinion gears, pinion flange, propeller shafts, "U" joints and "U" joint caps, pinion flange, propeller shafts, axle shafts, axle bearings and races, axle flange, axle shafts, CV joints, carrier bearings, center bearings, drive axle, drive axle bearings, drive shaft, flex disc, half shafts, pinion gear, pins, ring gear, shaft couplings, side gears, spyder gears, yoke, lock ring, pinion and related mechanisms. It is noted that the above description of automotive applications is provided for illustrative purposes only, and is not intended to limit the present disclosure. The coatings disclosed herein may be applied to any automotive component that experiences friction, and would benefit from a lower coefficient of friction coating, such as manual and automatic locking hub and bearing assembly, C/V axles, plain bearings, spindles, gears, chain elements, valves and combinations thereof.

Some other applications for the coatings may be include household and general maintenance, e.g. locking systems, springs, bolts, slides, and hinges etc. This could apply for any type of industrial mechanical system. In some other embodiments, the coatings disclosed herein may be applied to metal working applications, e.g., forging and wire drawing etc. In yet other embodiments, the coatings disclosed herein may be applicable to weapons (small-arms) lubrication. One of the advantages of the disclosed coatings for lubrication in weapons is the reduction or even total elimination of the use of liquid lubrication, which can increase the firearm maintenance intervals, and improve their performance in the battle field (solid lubrication is not prone to the absorption of moist and dry debris, such as its liquid equivalent).

In some embodiments, in comparison to a coating that does not include particles having the fullerene-like geometry (with and/or without a sectioned outer layer) and/or tubular-like geometry, the coating including the inorganic material of the metal chalcogenide composition having the fullerene-like geometry (with and/or without a sectioned outer layer) and/or tubular-like geometry provides a smoother surface, greater scratch resistance, reduced coefficient of friction and reduced wear. In some examples, a coating including the inorganic material of the metal chalcogenide composition having the fullerene-like geometry (with and/or without a sectioned outer layer) and/or tubular-like geometry will have up to 3× less wear, and up to 1.75 less friction, than a coating having a comparable base material layer without the inorganic material of the metal chalcogenide composition having the fullerene-like geometry (with and/or without a sectioned outer layer) and/or tubular-like geometry.

The following examples are provided to further illustrate the present invention and demonstrate some advantages that arise therefrom. It is not intended that the invention be limited to the specific examples disclosed.

EXAMPLES

Layered materials, such as molybdenum disulfide and graphite are in use worldwide in lubrication coating systems. In the present example, a coating having a polymer base material, and a dispersed phase of tungsten disulfide (WS$_2$) with the fullerene like geometry was prepared in accordance with the present disclosure is compared with existing lubricants that include molybdenum disulfide (MoS$_2$).

First, coating formulations having a polymer base material and a dispersed phase of tungsten disulfide (WS$_2$) with the fullerene like or tubular-like geometry were produced, in which one of the coating formulations intended for application via spray coating and a second coating formation is intended for application via brushing. The formulations are represented in the following Table 3:

TABLE 3

| Material | Spraying | Brushing |
| --- | --- | --- |
| PAI (polyamide-imide) | 6.4 | 9.5 |
| NMP (N-methyl-pyrrolidone) | 42.6 | 38.0 |
| 3AG (IF powder) | 21.0 | 33.5 |
| Butyl acetate |  | 19.0 |
| Ethyl benzene | 7.3 |  |
| Xylene | 22.7 |  |

The mixtures described in Table 3 were grinded for 8 hours in a high-shear mixer (Dispermat) with 0.6 mm ceramic beads.

The comparative molybdenum disulfide ($MoS_2$) products are included in Table 4, as follows:

TABLE 4

| Product | Manufacturer | polymer |
| --- | --- | --- |
| Molykote D7620 | Dow Corning | PAI |
| Evercoat 643 | Everlube | Epoxy |
| Xylane 1052 | Whitford | classified |

The tribological characterization techniques used in this project were—Brugger test (DIN 51347) to measure its wear resistance, and roller on block (ASTM G77), to measure the COF. The results of the tribological testing are included in Table 5, as follows:

TABLE 5

| Product | Brugger [MPa] | COF |
| --- | --- | --- |
| Molykote D7620 | 112.5 | 0.013 |
| Ecoalube 643 | 170.9 | 0.054 |
| Xylane 1052 | 97.4 | 0.074 |
| $WS_2$ brushing product | 194.3 | 0.034 |
| Neat PAI | 24.1 | 0.049 |
| $WS_2$ spraying product | 180.0 | 0.040 |

Inorganic Fullerene-Like Particles and Inorganic Tubular-Like Particles in Fluids and Lubricants and Applications to Subterranean Drilling In one embodiment, a lubricant is provided that includes a fluid medium and at least one intercalation compound of a metal chalcogenide having molecular formula $MX_2$ that is in suspension in the fluid medium, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The intercalation compound typically includes a fullerene-like geometry with a sectioned outer layer, a fullerene like geometry without a sectioned outer layer, and/or a tubular like geometry. The description of the metal chalcogenide composition having a fullerene-like geometry without a sectioned outer layer, a fullerene-like geometry with a sectioned outer layer, and/or tubular-like geometry is provided by the above sections titled "MULTI-LAYERED FULLERENE-LIKE NANOPARTICLE STRUCTURE HAVING SECTIONED OUTER LAYER WITH SECTIONED PORTIONS PROTRUDING FROM THE SURFACE OF NANOPARTICLE" and "METAL CHALCOGENIDE FULLERENE-LIKE NANOPARTICLE AND METAL CHALCOGENIDE TUBULAR-LIKE GEOMETRY". The term "with and/or without a sectioned outer layer" and "with or without a sectioned outer layer" denote that the fullerene-like nanoparticles used can be solely those have a sectioned outer layer, solely nanoparticles without a sectioned outer layer or a combination of nanoparticles including the sectioned outer layer and nanoparticles without the sectioned outer layer.

The fluid medium may be water based, oil based or can be an emulsion of water and oil. In one example, the fluid medium is an oil selected from Group I, II, III, IV and V, as designated by the American Petroleum Institute (API). Group I base oils are classified as less than 90 percent saturates, greater than 0.03 percent sulfur (S) with a viscosity-index range of 80 to 120. In some embodiments, the temperature range for these oils is from 32 degrees F. to 150 degrees F. Group I base oils can be manufactured by solvent extraction, solvent or catalytic dewaxing, and hydro-finishing processes. Common Group I base oil may include 150SN (solvent neutral), 500SN, and 150BS (brightstock). Group I base oils are typically mineral oils.

Group II base oils are defined as being more than 90 percent saturates, less than 0.03 percent sulfur and with a viscosity index of 80 to 120. Group II base oils can be often manufactured by hydrocracking. Since all the hydrocarbon molecules of these oils are saturated, Group II base oils have better antioxidation properties than Group I base oils. Group II base oils are also typically mineral oils.

Group III base oils are defined as being greater than 90 percent saturates, less than 0.03 percent sulfur and have a viscosity index above 120. These oils are refined even more than Group II base oils and generally are hydrocracked with a higher pressure and heat than Group II. The processing for forming Group III base oils are typically longer than the processing for Group II base oils, and are designed to achieve a purer base oil. Although typically made from crude oil, Group III base oils are sometimes described as synthesized hydrocarbons. Group III base oils can be manufactured by processes, such as isohydromerization, and can be manufactured from base oil or slax wax from dewaxing process.

Group IV base oils are polyalphaolefins (PAOs). These synthetic base oils are made through a process called synthesizing. More specifically, in some embodiments, the process may begin with oligomerisation of alpha olefins and a catalyst. Oligomerization is followed by distillation. The oligomerization and distillation steps may include steam cracking hydrocarbons to produce ultra high-purity ethylene, ethylene oligomerization to develop 1-decene and 1-dodecene, and decene or dodecene oligomerization to form a mixture of dimers, trimers, tetramers and higher oligomers. Distillation is followed by hydrogenation including hydrogen and a catalyst. Group IV base oils such as polyalphaolefins (PAOs) are suitable for a broader temperature range that Group I, II and III base oils, and are applicable for use in extreme cold conditions and high heat applications. Group IV base oils typically have a viscosity index of at least 140.

Group V base oils are classified as all other base oils, including silicone, phosphate ester, polyalkylene glycol (PAG), polyolester, biolubes, etc. These base oils are at times mixed with other base stocks, such as the aforementioned Group I, II, III and IV base oils. An example would be polyalphaolefin (PAO) that is mixed with a polyolester. Esters are common Group V base oils used in different lubricant formulations to improve the properties of the existing base oil. In some embodiments, ester oils can take more abuse at higher temperatures and will provide superior detergency compared to a polyalphaolefin (PAO) synthetic base oil, which in turn increases the hours of use. Examples of synthetic oils include olefins, isomerized olefins, synthetic esters, phosphate esters, silicate esters, polyalkylene glycols, etc.

In another embodiment, the fluid component, i.e., fluid medium, of the lubricant can be a biolubricant. Biolubricants can primarily be triglyceride esters derived from plants and animals. Examples of biolubricants that are suitable for the fluid component that is mixed with the intercalation compound of the metal chalcogenide having the molecular formula $MX_2$ include lanolin, whale oil, canola oil, castor oil, palm oil, sunflower seed oil, rapeseed oil and tall oil.

In one example, the fluid medium is a water based fluid. The water based fluid may be a fluid or gel that is made from a base of water and typically a cellulose or glycerin solution. A water based fluid may be used on its own or in combination with other materials described herein to provide the fluid medium of the lubricant. It is noted that the above compositions provided for the fluid medium of the lubricants disclosed herein are provided for illustrative purposes only, and are not intended to limit the present disclosure. Other compositions and fluids have also been contemplated for use with the at least one intercalation compound of the metal chalcogenide having molecular formula $MX_2$.

The term "intercalation compound" denotes a compound that can be inserted between elements or layers. The intercalation compound typically has a fullerene-like geometry having a sectioned outer layer, a fullerene like geometry without a sectioned outer layer or a tube-like geometry. As used herein, the term "inorganic fullerene-like" denotes a sphere like geometry. The description of the metal chalcogenide composition having a fullerene-like geometry without a sectioned outer layer, a fullerene-like geometry with a sectioned outer layer, and/or tubular-like geometry is provided by the above sections titled "MULTI-LAYERED FULLERENE-LIKE NANOPARTICLE STRUCTURE HAVING SECTIONED OUTER LAYER WITH SECTIONED PORTIONS PROTRUDING FROM THE SURFACE OF NANOPARTICLE" and "METAL CHALCOGENIDE FULLERENE-LIKE NANOPARTICLE AND METAL CHALCOGENIDE TUBULAR-LIKE GEOMETRY". The intercalation compound of the inorganic fullerene-like and/or tube-like geometry is formula $MX_2$. The metallic elements that are suitable for M in the formula $MX_2$, and the chalcogen elements that are suitable for X in the formula $MX_2$ are provided above.

The surface of the inorganic fullerene-like (with and/or without a sectioned outer layer) and/or tube-like having the molecular formula $MX_2$ is functionalized or modified in order to obtain their homogeneous dispersion in the fluid medium of the lubricant, prevent particles agglomeration and settling. A "dispersion" is a system of two phases, in which discrete particles, i.e., primary particles, such as the inorganic fullerene-like (with and/or without a sectioned outer layer) and/or tube-like having the molecular formula $MX_2$, provide a first phase that are distributed in the other second phase, in which the second phase is a substantially continuous phase (dispersion medium) differing from the dispersed phase in composition. Dispersions are homogeneous when the ratio of solute, i.e., primary particles, such as the inorganic fullerene-like (with and/or without a sectioned outer layer) and/or tube-like having the molecular formula $MX_2$, to solvent, i.e., fluid medium, remains the same throughout the solution even if homogenized with multiple sources, and stable because, the solute will not settle out. This type of mixture, which is provided by the methods and compositions disclosed herein, is very stable, i.e., its particles do not settle, or separate. As used herein, "agglomeration" means an association of primary particles, which can range from relatively weak (based upon, for example, charge or polarity) to relatively strong (based upon, for example, chemical bonding). When the primary particles, i.e., inorganic fullerene-like (with and/or without a sectioned outer layer) and/or tube-like having the molecular formula $MX_2$, agglomerate they can fall, i.e., settle, from suspension. The methods and compositions that are provided herein provide dispersions that do not agglomerate or settle for a period of time that may be as great as 5 years, e.g., as great as 3 years. The dispersions are stabilized from agglomeration or settling by the functionalization agents that is described below, and the particle size that is provided by mechanical downgrading, such as particle size reductions provided by milling and/or high pressure homogenization and/or high shear mixing and/or ultrasonic mixing and/or a combination thereof.

The surface of the inorganic fullerene-like (with and/or without a sectioned outer layer) and/or tube-like particles having the molecular formula $MX_2$ may be functionalized or modified by forming an adsorption-solvate protective layer on the particle surfaces, i.e., surface of the inorganic fullerene-like (with and/or without a sectioned outer layer) and/or tube-like particles having the molecular formula $MX_2$, and preventing the close approach and coagulation of particles under the action of short-range forces of molecular attraction. The close approach of particles may be impeded by the disjoining pressure of the liquid dispersion medium, which is solvated by molecules or ions of the stabilizer in the adsorption layer, by electrostatic repulsion of like-charged ions adsorbed on the particle surfaces, or by enhanced structural viscosity of the surface protective layer, which can also be referred to as being a structural-mechanical barrier.

Surface functionalization for the surface of the inorganic fullerene-like (with and/or without a sectioned outer layer) and/or tube-like particles having the molecular formula $MX_2$ may be provided by functionalizing agents that include silanes, thiols, ionic, anionic, cationic, nonionic surfactants, amine based dispersant and surfactants, succinimide groups, fatty acids, acrylic polymers, copolymers, polymers, monomers and combinations thereof.

In some embodiments, the functionalizing agents can be described as comprising a headgroup (a part that interacts primarily with the surface of the inorganic fullerene-like (with and/or without a sectioned outer layer) and/or tube-like particles having the molecular formula $MX_2$) and a tailgroup (a part that interacts with the solvent, i.e., fluid medium). For example, the headgroup of the functionalizing agent may interact with the sectioned portion 2 of the outer layer of the fullerene like particle that is depicted in FIG. 7. Useful headgroups include those that comprise alkoxy, hydroxyl, halo, thiol, silanol, amino, ammonium, phosphate, phosphonate, phosphonic acid, phosphinate, phosphinic acid, phosphine oxide, sulfate, sulfonate, sulfonic acid, sulfinate, carboxylate, carboxylic acid, carbonate, boronate, stannate, hydroxamic acid, and/or like moieties. Multiple headgroups can extend from the same tailgroup, as in the case of 2-dodecylsuccinic acid and (1-aminooctyl) phosphonic acid. Useful hydrophobic and/or hydrophilic tailgroups include those that comprise single or multiple alkyl, aryl, cycloalkyl, cycloalkenyl, haloalkyl, oligo-ethylene glycol, oligo-ethyleneimine, dialkyl ether, dialkyl thioether, amino-alkyl, and/or like moieties. Multiple tailgroups can extend from the same headgroup, as in the case of trioctylphosphine oxide.

Examples of silanes that are suitable for use as functionalizing agents with the inorganic fullerene-like (with and/or without a sectioned outer layer) and/or tube-like particles having the molecular formula $MX_2$ and the fluid medium of the present disclosure include organosilanes including, e.g., alkylchlorosilanes, alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, ipropyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, polytriethoxysilane, vinyltrimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri(t-butoxy)silane, vinyltris(isobutoxy)silane, vinyltris (isopropenoxy) silane, and vinyltris (2-methoxyethoxy) silane; trialkoxyarylsilanes; isooctyltrimethoxy-silane; N-(3-triethoxysilylpropy-1) methoxyethoxyethyl carbamate; N-(3-triethoxysilylpropyl) methoxyethoxyethyl carbamate; silane functional (meth)acrylates including, e.g., 3-(methacryloyloxy) propyltrimethoxysilane, 3-acryloyloxypropyltrimethoxysilane, 3-(methacryloyloxy) propyltriethoxysilane, 3-(methacryloyloxy)propylmethyldimethoxysilane, 3-(acryloyloxypropyl) methyldimethoxysilane, 3-(methacryloyloxy) propyldime-thylethoxysilane, 3-(methacryloyloxy) methyltriethoxysilane, 3-(methacryloyloxy) methyltrimethoxysilane, 3-(methacryloyloxy) propyldimet-hylethoxysilane, 3-methacryloyloxy) propenyltrimethoxysilane, and 3-(methacryloyloxy) propyltrimethoxysilane; polydialkylsiloxanes including, e.g., polydimethylsiloxane, arylsilanes including, e.g., substituted and unsubstituted arylsilanes, alkylsilanes including, e.g., substituted and unsubstituted alkyl silanes including, e.g., methoxy and hydroxy substituted alkyl silanes, and combinations thereof.

Examples of amines that are suitable for use as functionalizing agents with the inorganic fullerene-like (with and/or without a sectioned outer layer) and/or tube-like particles having the molecular formula $MX_2$ and the fluid medium of the present disclosure include alkylamines including, e.g., octylamine, oleylamine, decylamine, dodecylamine, octadecylamine, monopolyethylene glycol amines, and combinations thereof.

Useful organic acid functionalizing agents include, e.g., oxyacids of carbon (e.g., carboxylic acid), sulfur and phosphorus, and combinations thereof.

Representative examples of polar functionalizing agents having carboxylic acid functionality include $CH_3O(CH_2CH_2O)_2C$—$H_2COOH$ (hereafter MEEAA) and 2-(2-methoxyethoxy) acetic acid having the chemical structure $CH_3OCH_2CH_2OCH_2COOH$ hereafter MEAA) and mono (polyethylene glycol) succinate in either acid or salt forms.

Representative examples of non-polar functionalizing agents having carboxylic acid functionality include octanoic acid, dodecanoic acid and oleic acid.

Examples of suitable phosphorus containing acids that are suitable as functionalizing agents include phosphonic acids including, e.g., octylphosphonic acid, laurylphosphonic acid, decylphosphonic acid, dodecylphosphonic acid, octadecylphosphonic acid, and monopolyethylene glycol phosphonate in either acid or salt forms.

Examples of other useful functionalizing agents include acrylic acid, methacrylic acid, beta-carboxyethyl acrylate, mono-2-(methacryloyloxyethyl) succinate, and combinations thereof. A useful surface modifying agent is mono (methacryloyloxypolyethyleneglycol-) succinate.

Examples of suitable alcohols for functionalizing agents include, e.g., aliphatic alcohols including, e.g., octadecyl, dodecyl, lauryl and furfuryl alcohol, alicyclic alcohols including, e.g., cyclohexanol, and aromatic alcohols including, e.g., phenol and benzyl alcohol, and combinations thereof.

In some embodiments, the functionalizing agents may be introduced to the inorganic fullerene-like (with and/or without a sectioned outer layer) and/or tube-like particles having the molecular formula $MX_2$ during their formation prior to having the opportunity to agglomerate or destabilize from solution. In other embodiments, agglomerates of the inorganic fullerene-like (with and/or without a sectioned outer layer) and/or tube-like particles having the molecular formula $MX_2$ are first mechanically broken down into their primary size, i.e., the size of the primary particles prior to agglomeration. The mechanical reduction of the agglomerates of the inorganic fullerene-like and/or tube-like particles having the molecular formula $MX_2$ to their primary size may be referred to as milling.

In some embodiments inorganic fullerene nanoparticles (with and/or without a sectioned outer layer) can be mixed with other solid particles, which may be from 1 nm to 10 microns in size, such as carbon fullerenes, carbon nanotubes, graphite, 2H—$MoS_2$, 2H—$WS_2$, boron, Zn, Cu, silver, graphite, MgOH, carbon diamond or combinations of thereof.

In some embodiments, the milling process may begin with agglomerates having a particle size ranging from 5 microns to 20 microns. The particles size of the agglomerates may be reduced using a high-shear mixer, two or three roll mixers, homogenizers, bead mills, ultrasonic pulverizer and a combination thereof. A high-shear mixer disperses, or transports, one phase or ingredient (liquid, solid, gas) into a main continuous phase (liquid), with which it would normally be immiscible. A rotor or impellor, together with a stationary component known as a stator, or an array of rotors and stators, is used either in a tank containing the solution to be mixed, or in a pipe through which the solution passes, to create shear. In some embodiments, the high shear mixer may be a batch high-shear mixers, an inline powder induction, a high-shear granulator, an ultra-high-shear inline mixers and a combinations thereof.

Other means for reducing the particle size of the agglomerates to the primary particle size of the inorganic fullerene-like (with and/or without a sectioned outer layer) and/or tube-like particles having the molecular formula $MX_2$ include an attritor, agitator, ball mill, bead mill, basket mill, colloid mill, high speed disperser, edge runner, jar mill, low speed paddle mixer, variable speed mixer, paste mixer, ribbon blender, pug mixer, nauta mixer, sand/perl mill, triple roll mill, two roll mill, planetary mixer, slow speed mixer, high speed mixer, twin shaft mixer, multi shaft mixer, sigma kneader, rotor-stator mixer, homogenizer/emulsifier, high shear mixer, conical blender, V-blender, double cone blender, suspended mixer and combinations thereof. The particle size of the agglomerates may also be reduced using a sonicator. The mixing may be performed at room temperature or at an elevated temperature. The reduction of the size of agglomerates by milling is distinguished from the milling of the nanoparticles themselves to provide that the nanoparticles have dimensions within the nanoscale realm.

In one embodiment of Applicants' method, the physical dimensions and geometry of the nanoparticles, e.g., inorganic fullerene like nanoparticles, is provided by the chemical methods described above in the sections titled "MULTI-LAYERED FULLERENE-LIKE NANOPARTICLE STRUCTURE HAVING SECTIONED OUTER LAYER WITH SECTIONED PORTIONS PROTRUDING FROM THE SURFACE OF NANOPARTICLE" and "METAL CHALCOGENIDE FULLERENE-LIKE NANOPARTICLE AND METAL CHALCOGENIDE TUBULAR-LIKE GEOMETRY".

In some embodiments, the fluid medium for the lubricant is mixed with the inorganic fullerene-like (with and/or without a sectioned outer layer) and/or tube-like particles having the molecular formula $MX_2$ during the milling step in which the agglomerates of the inorganic fullerene-like (with and/or without a sectioned outer layer) and/or tube-like particles having the molecular formula $MX_2$ are mechanically broken down into their primary size. The inorganic fullerene-like (with and/or without a sectioned outer layer) and/or tube-like particles having the molecular formula $MX_2$ may be mixed with the fluid medium in an amount ranging from 0.1% to 60% by volume. In another embodiment, the inorganic fullerene-like (with and/or without a sectioned outer layer) and/or tube-like particles having the molecular formula $MX_2$ may be mixed with the fluid medium in an amount ranging from 0.5% to 40% by volume. In yet another embodiment, the inorganic fullerene-like (with and/or without a sectioned outer layer) and/or tube-like particles having the molecular formula $MX_2$ may be mixed with the fluid medium in an amount ranging from 0.5% to 20% by volume.

In some embodiments, the agglomerates of the inorganic fullerene-like (with and/or without a sectioned outer layer) and/or tube-like particles having the molecular formula $MX_2$ is reduced during the milling step to a diameter ranging from 1 nm to 15 μm for fullerene like geometries. In another embodiment, the agglomerates of the inorganic fullerene-like and/or tube-like particles having the molecular formula $MX_2$ is reduced during the milling step to a diameter ranging from 2 nm to 10 μm for fullerene like geometries. In yet another embodiment, the agglomerates of the inorganic fullerene-like and/or tube-like particles having the molecular formula $MX_2$ is reduced during the milling step to a diameter ranging from 5 nm to 5 μm for fullerene like geometries. Following milling, the inorganic fullerene-like (with and/or without a sectioned outer layer) and/or tube-like particles having the inorganic fullerene like geometry may have a diameter that is any value within the above ranges. It is noted that the above dimensions are provided for illustrative purposes only, and are not intended to limit the present disclosure.

In some embodiments, the agglomerates of the inorganic fullerene-like (with and/or without a sectioned outer layer) and/or tube-like particles having the molecular formula $MX_2$ is reduced during the milling step to a diameter ranging from 1 nm to 150 nm, and a length that ranges from 1 nm to 20 cm, for tube like geometries. In another embodiment, the agglomerates of the inorganic fullerene-like and/or tube-like particles having the molecular formula $MX_2$ is reduced during the milling step to a diameter ranging from 5 nm to 125 nm, and a length that ranges from 5 nm to 15 cm, for tube like geometries. In yet another embodiment, the agglomerates of the inorganic fullerene-like and/or tube-like particles having the molecular formula $MX_2$ is reduced during the milling step to a diameter ranging from 10 nm to 100 nm, and a length that ranges from 100 nm to 10 cm, for tube-like geometries. Following milling, the inorganic fullerene-like and/or tube-like particles having the inorganic tube-like geometry may have a diameter and length that is any value within the above ranges. It is noted that the above dimensions are provided for illustrative purposes only, and are not intended to limit the present disclosure.

In some embodiments, once the agglomerates of the inorganic fullerene-like (with and/or without a sectioned outer layer) and/or tubelike particles having the molecular formula $MX_2$ are broken down into their primary size, the functionalizing agent may be added to the mixture of the fluid medium and the inorganic fullerene-like and/or tube-like particles having the molecular formula $MX_2$.

A functionalizing agent of amine may be added to the mixture in an amount ranging from 0.1 wt % to 50 wt. % of the inorganic fullerene-like (with and/or without a sectioned outer layer) and/or tube-like particles. For example, when functionalizing agent is an amine, such as oleylamine, the minimum functionalizing agent would be 0.1 g for 1 gram of inorganic fullerene-like (with and/or without a sectioned outer layer) band/or tube-like particles having the molecular formula $MX_2$, e.g. 1 gram of fullerene-like tungsten disulfide ($WS_2$), in 100 grams of the fluid medium, e.g., an olefin based oil. For example for 100 grams of isomerized alpha olefin fluid (drilling fluid) 1 wt % i.e. 1 gram of $WS_2$ fullerene-like (with and/or without a sectioned outer layer) particles and 0.1 gram of oleilamine are added). In another example, when functionalizing agent is an amine, such as oleylamine, the maximum functionalizing agent would be 20 grams for 1 gram of inorganic fullerene-like (with and/or without a sectioned outer layer) and/or tube-like particles having the molecular formula $MX_2$, e.g. 1 gram of fullerene-like tungsten disulfide ($WS_2$) or molybdenum disulfide ($MoS_2$), in 100 grams of the fluid medium, e.g., an olefin based oil.

A functionalizing agent of silane may be added to the mixture in an amount ranging from 0.1 wt % to 50 wt. % of the inorganic fullerene-like and/or tube-like particles. For example, when functionalizing agent is a silane, e.g., octadecyltrichlorosilane (OTS), the minimum functionalizing agent would be 0.1 g for 1 gram of inorganic fullerene-like (with and/or without a sectioned outer layer) and/or tube-like particles having the molecular formula $MX_2$, e.g., 1 gram of fullerene-like tungsten disulfide ($WS_2$), in 100 grams of the fluid medium, e.g., an olefin based oil. In another example, when functionalizing agent is an silane, e.g., octadecyltrichlorosilane (OTS), the maximum functionalizing agent would be 50 grams for 1 gram of inorganic fullerene-like and/or tube-like particles having the molecular formula $MX_2$, e.g. 1 gram of fullerene-like tungsten disulfide ($WS_2$), in 100 grams of the fluid medium, e.g., an olefin based oil.

The functionalizing agent applied to the mixture of the fluid medium and the inorganic fullerene-like (with and/or without a sectioned outer layer) and/or tube-like particles having the molecular formula $MX_2$ provide dispersions that do not agglomerate or settle for a period of time that may range from 3 hours to 5 years. In another embodiment, the functionalizing agent applied to the mixture of the fluid medium and the inorganic fullerene-like (with and/or without a sectioned outer layer) and/or tube-like particles having the molecular formula $MX_2$ provide dispersions that do not agglomerate or settle for a period of time that may range from 5 hours to 3 years. In yet another embodiment, the functionalizing agent applied to the mixture of the fluid medium and the inorganic fullerene-like and/or tube-like particles having the molecular formula $MX_2$ provide dispersions that do not agglomerate or settle for a period of time that may range from 24 hours to 1 year.

In one embodiment, the lubricant further includes an additive for antiwear performance, extreme pressure performance, anticorrosion performance, rust inhibiting performance, antifoam, viscosity modifying, friction modifying additives. The extreme pressure and antiwear additives may be selected from at least one of organophosphorus, organophosphorus sulfur, organosulphur, chlorine, sulfur-phosphorus-boron compounds and combinations thereof.

Figure 13:
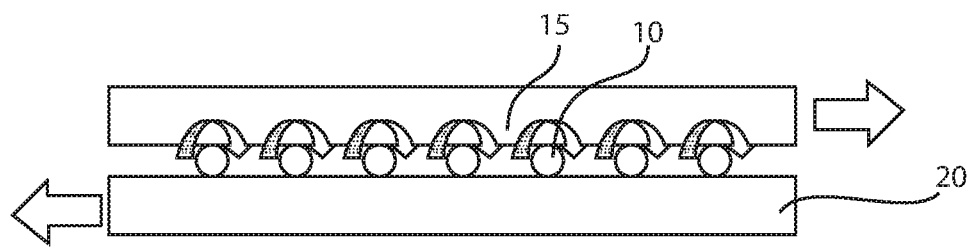
FIG. 13 is a pictorial view depicting an intercalation compound that is in simultaneous contact with two surfaces being lubricated by a rolling action of the intercalation compound, in accordance with one embodiment of the present disclosure.

FIG. 13 depicts the application of the lubricant including the fluid medium containing the inorganic fullerene-like (with and/or without a sectioned outer layer) and/or tube-like particles having the molecular formula $MX_2$ and the functionalizing agent to a surface to be lubricated. FIG. 13 depicts how the sphere geometry of the inorganic fullerene-like particles (with and/or without a sectioned outer layer) 10 having the molecular formula $MX_2$ provide roller effect when simultaneously in contract with opposing surfaces 15, 20 that are being lubricated. More specifically, the rolling action of the sphere geometry of the inorganic fullerene-like particles 10 provides a low friction sliding motion between the opposing surfaces 15, 20 being lubricated. The sphere geometry of the inorganic fullerene-like particles 10 (with and/or without a sectioned outer layer) acts as an anti-friction agent enhancing the effectiveness of the fluid lubricant. The column shape of the tube-like particles having the molecular formula $MX_2$ provide a roller effect similar to the performance that is provided by the sphere geometry of the inorganic fullerene-like particles 10.

Figure 14:
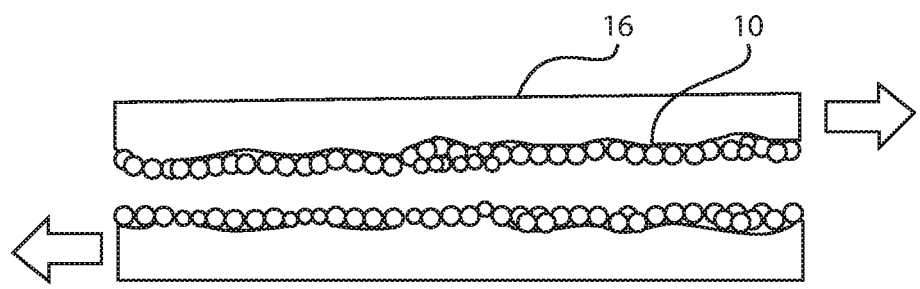
FIG. 14 is a pictorial view depicting an intercalation compound that is in simultaneous contact with two surfaces being lubricated by a rolling action of the intercalation compound, in accordance with another embodiment of the present disclosure.
Figure 15:
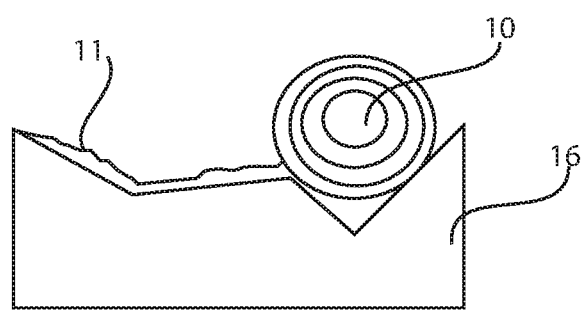
FIG. 15 is a pictorial view depicting a layer of the intercalation compound adhering to a surface that is being lubricated by the intercalation compound, in accordance with one embodiment of the present disclosure.

FIGS. 14 and 15 further depict a surface reconditioning effect that is provided by the lubricant including the fluid medium containing the inorganic fullerene-like (with and/or without a sectioned outer layer) and/or tube-like particles 10 having the molecular formula $MX_2$ and the functionalizing agent. More specifically, the inorganic fullerene-like (with and/or without a sectioned outer layer) and/or tube-like particles 10 having the molecular formula $MX_2$ are layered structures, in which when the exterior layers contact the surface being lubricated, the exterior layer 11 peels (also referred to as exfoliates) from the inorganic fullerene-like and/or tube-like particles and adheres to the surface 16 being lubricated, as depicted in FIG. 15. An inorganic fullerene-like and/or tube-like particle of tungsten disulfide ($WS_2$) may have alternating layers of tungsten (W) and sulfur (S). An inorganic fullerene-like (with and/or without a sectioned outer layer) and/or tube-like particle of molybdenum disulfide ($MoS_2$) may have alternating layers of molybdenum (Mo) and sulfur (S). One molybdenum (Mo) atom is sandwiched between two hexagonally packed sulfur atoms. The bonding between Mo and two S is covalent, however the bonding between each $MoS_2$ sandwich is week (Vander Waals). In this manner, the inorganic fullerene-like and/or tube-like particles having the molecular formula $MX_2$, such as molybdenum disulfide ($MoS_2$) and tungsten disulfide ($WS_2$), can deposit a metal-chalcogen (metal-sulfide for example) layer, such as molybdenum ($MoS_2$) or tungsten ($WS_2$), on the eroded surface being lubricated. Therefore, the inorganic fullerene-like and/or tube-like particle can recondition eroded surfaces, i.e., smooth rough and damaged surfaces, and lubricate to protect from additional wear. In some embodiments, the hollow feature of the inorganic fullerene-like and/or tube-like particle provides enhanced impact resistance.

In some embodiments, the lubricant may further include a carbon containing nanomaterial, such as carbon nanotubes, e.g., single wall carbon nanotubes (CNT) or multi-wall carbon nanotubes (SWNT), or graphitic materials, such as carbon black (CB), graphitic fibers, graphite platelets and diamond like carbon (DLC). In one embodiment, the carbon containing nanomaterial is provided by carbon nanotubes that may have a high purity on the order of about 95% to about 99% carbon. In an even further embodiment, the carbon nanotubes have a high purity on the order of about 99% or greater. In one embodiment, the carbon nanotubes may be provided by laser vaporization. In one embodiment, the single wall carbon nanotubes are formed using laser vaporization in combination with a catalyst, such as a metal catalyst. In one embodiment, the catalyst is supported on a substrate, such as a graphite substrate, or the catalyst may be floating metal catalyst particles. In one embodiment, the metal catalyst may be composed of Fe, Ni, Co, Rh, Y or alloys and combinations thereof.

The diameter of a single wall carbon nanotube may range from about 1 nanometer to about 50 nanometers. In another embodiment, the diameter of a single wall carbon nanotube may range from about 1.2 nanometers to about 1.6 nanometers. In one embodiment, the nanotubes used in accordance with the present invention have an aspect ratio of length to diameter on the order of approximately 200:1.

The carbon nanotubes comprise a majority of carbon typically being of high purity. In other examples, the carbon nanotubes include a carbon content ranging from being greater than 50%, wherein a purification process is utilized to provide carbon nanotubes having of high purity, such as greater than 90% carbon. In one embodiment, the carbon nanotubes may be purified by a process that includes an acid treatment followed by an oxidation. In one embodiment, the acid treatment may include treatment and oxidation steps are provided by a dilute $HNO_3$ reflux/air oxidation procedure.

Other methods of forming the carbon nanotubes may also be employed, such as chemical vapor deposition (CVD). In another embodiment, the carbon nanotubes may be multi-walled. Carbon black (also known as acetylene black, channel black, furnace black, lamp black or thermal black) is also suitable for providing the at least one carbon containing nanomaterial that is present in the lubricant. Carbon black is a material produced by the incomplete combustion of heavy petroleum products such as FCC tar, coal tar, ethylene cracking tar, and a small amount from vegetable oil.

In some embodiments, the carbon containing nanomaterial may be present in the lubricant in an amount ranging from 0.1 wt % to 50 wt. %. In another embodiment, the carbon containing nanomaterial may be present in the lubricant in an amount ranging from 0.1 wt % to 40 wt. %. In yet another embodiment, the carbon containing nanomaterial in the lubricant in an amount ranging from 0.1 wt % to 25 wt. %.

In some applications, the above described lubricant may be suitable for engine oil treatments for automotive, transportation, and generator applications. For example, the engine oil treatments may be suitable for gasoline and diesel engines used in cars, trucks, industrial engines, boats and motorcycles. Other automotive applications for the above described lubricant include gears, transmissions, e.g., manual and automatic transmissions, rear and front differentials, transfer cases, such as those used in 4×4 vehicles and trucks, and final drive apparatus, such as those used in tractors and earth moving equipment. Industrial applications include gears, chains, conveyors, and sliding components.

Figure 16:
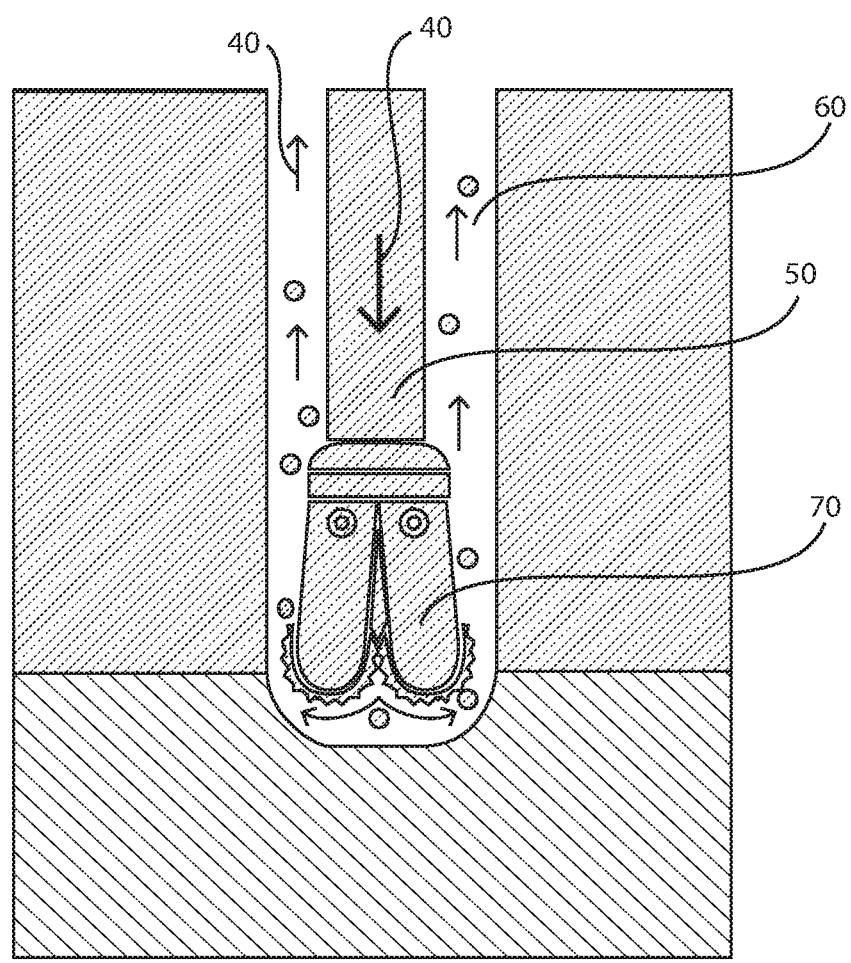
FIG. 16 is a pictorial view of a drilling operation using the drilling fluid including the intercalation compound of a metal chalcogenide having molecular formula $MX_2$, which has a fullerene-like and/or tube-like geometry, in accordance with one embodiment of the present disclosure.

In another application, the methods and compositions can provide a drilling fluid for subterranean drilling. FIG. 16 is a pictorial view of a drilling operation using the drilling fluid (flow identified by reference number 40) including the intercalation compound of a metal chalcogenide having molecular formula $MX_2$, which has a fullerene-like (with and/or without a sectioned outer layer) and/or tube like geometry. In one embodiment, the subterranean drilling method may include providing a drilling member 50, and applying the drilling member 50 to a terrain and surface to form a subterranean wellbore 60. The drilling member 50 includes at least a drill string and a drill component.

The subterranean drilling method may further include lubricating at least one of the subterranean wellbore 19 and the drilling member 50 with a drilling fluid including at least one intercalation compound of a metal chalcogenide having molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The intercalation compound has a fullerene-like structure (with and/or without a sectioned outer layer) or tubular-like structure. The intercalation compound is present in the drilling fluid 40 in an amount of greater than 0.1 wt % by weight. In some embodiments, the drilling fluid 40 may further includes a functionalizing agent. The functionalizing agent provides that the intercalation compound is kept in suspension within the drilling fluid 40.

Drilling fluid, also referred to as drilling mud, is used to aid the drilling of boreholes, also referred to as wellbores 50, into the earth. Often used while drilling oil and natural gas wells and on exploration drilling rigs, drilling fluids are also used for much simpler boreholes, such as water wells. One of the most critical roles of drilling mud is as a lubricant. Drilling generates tremendous friction, which can damage the drill or the formation being drilled. Drilling mud cuts down on the friction, lowering the heat of drilling and reducing the risk of friction-related complications. The mud also acts as a carrier for the materials being drilled, with material becoming suspended in the mud and then being carried up the drill to the surface. Using drilling mud protects the stability of a borehole by controlling variables such as friction and pressure. In some embodiments, the function of drilling fluids further include providing hydrostatic pressure to prevent formation fluids from entering into the well bore, keeping the drill bit cool 70 and clean during drilling, carrying out drill cuttings, and suspending the drill cuttings while drilling is paused and when the drilling assembly is brought in and out of the hole.

In some embodiments, the fluid medium for the drilling fluid used in accordance with the methods and structures disclosed herein may be selected from the group consisting of water, air and water, air and foaming agent, a water based mud, an oil based mud, a synthetic based fluid, and a combination thereof. A most basic water-based mud system begins with water, then clays and other chemicals are incorporated into the water to create a homogenous blend. The clay (called "shale" in its rock form) is usually a combination of native clays that are suspended in the fluid while drilling, or specific types of clay that are processed and sold as additives for the water-based mud system. One example of an additive used in water-based mud systems is bentonite. Other additives, such as calcium chloride, calcium bromide, zinc bromide, potassium formate, calcium carbonate, ground cellulose, bentonite, natural & synthetic polymer, asphalt and gilsonite, are added to a water based mud system to achieve various effects, including: viscosity control, shale stability, enhance drilling rate of penetration, cooling and lubricating of equipment.

Oil-based mud can be a mud where the base fluid is a petroleum product such as diesel fuel. Oil-based muds contain oil as the continuous phase and water as a contaminant, and not an element in the design of the mud. They typically contain less than 5% (by volume) water. Oil-based muds are usually a mixture of diesel fuel and asphalt, however can be based on produced crude oil and mud. Oil-based muds are used for many reasons, some being increased lubricity, enhanced shale inhibition, and greater cleaning abilities with less viscosity. Oil-based muds also withstand greater heat without breaking down. Additives for oil based muds include emulsifying agents (alkaline soaps and fatty acids), wetting agents (dodecylbenzene sulfonate), water, barite or barium sulfate, (weighting agent), asbestos (employed as viscosification agent) and/or, aminetreated clays (also as viscosification agent). Synthetic-based fluid (Otherwise known as Low Toxicity Oil Based Mud or LTOBM) is a mud where the base fluid is a synthetic oil.

Some other additives that may be employed in drilling fluids include calcium carbonate, crushed or ground marble, limestone, dolomite (calcium magnesium carbonate), zinc carbonate, barium carbonate, lithium carbonate, iron carbonate, other metal carbonates, hematite, ilmenite, magnesium oxide, manganese tetroxide, zinc oxide, magnesium oxychloride, colemanite, ulexite, analcite, apatite, bauxite, brucite, gibsite, hydrotalcite, other metal oxides, metal hydroxides, magnesium oxysulfate, other metal sulfates, metal tungstates, metal fluorides, lithium phosphate, other metal phosphates, magnesium sulfite, lead sulfide, metal peroxides, magnesium potassium phosphate hexahydrate, magnesium hydrogen phosphate trihydrate, magnesium ammonium phosphate hexahydrate, metal fluorosilicates, sodium chloride, other water-soluble salts, crushed or ground nut shells, crushed or ground seeds, crushed or ground fruit pits, materials obtained from barks of trees, calcined petroleum coke, asphalts, barite particles, clay particles, micaparticles, talc particles, silica particles, sands, feldspar, bauxite particles, ceramic particles, cement particles, melamine, solid or hollow micro spheres, graphitic materials, other forms of carbon, celluloses, starches, polysaccharides, acrylic polymers, natural rubbers, synthetic rubbers, styrene-diene diblock and triblock copolymers, other natural or synthetic polymers, expanded polystyrene beads, other foam beads, carbon fibers, glass fibers, polymer fibers, other fibers, water, dispersants, thinners, crystalline additives of low molecular weight (such as 1-Sendo-Bomeol, camphor, iodine, beta carotene, lycophene, cholesterol, lanosterol, or agnosterol), and combinations thereof.

It is noted that the above described fluid mediums and the inorganic fullerene-like (with and/or without a sectioned outer layer) and/or tube-like particles having the molecular formula $MX_2$ for the lubricants described with reference to FIGS. 1-15, may be suitable for use with the drilling fluid that is described with reference to FIG. 16. For example, the drilling fluid may include multi-layered fullerene-like geometry nanoparticles that are substantially spherical, wherein the multi-layered fullerene-like geometry has a diameter ranging from 5 nm to 5 microns. The fullerene particles may also be tubular in geometry. In the embodiments in which the outer layer of the fullerene-like nanoparticle is sectioned, at least one sectioned portion that extends along a direction away from the curvature of the multi-layered fullerene-like geometry extends along a direction that is tangent to the curvature surface of the multi-layered fullerene-like geometry. In another embodiment, the at least one section portion includes a plurality of sectioned portions of the outer layer positioned around an entirety of the curvature surface of the multi-layered fullerene-like geometry. In some embodiments, the intercalation compound of the metal chalcogenide used in the drilling fluid is tungsten disulfide ($WS_2$), molybdenum disulfide ($MoS_2$) or a combination thereof. Further, the inorganic fullerene-like (with and/or without a sectioned outer layer) and/or tube-like particles having the molecular formula $MX_2$ may be stabilized within the drilling fluid using the functionalizing agents and methods that are also described above with reference to FIGS. 1-15. For example, the drilling fluid may further include a functionalizing agent, wherein the functionalizing agent comprises silanes, thiols, ionic surfactants, anionic surfactants, cationic surfactants, nonionic surfactants, amine based dispersant and surfactants, polymers, monomers and combinations thereof.

The lubricants and drilling fluids disclosed herein provide an increase in friction reduction of up to two times, and more, when compared to conventional materials, and a wear reduction of up to three times, and more. The lubricants and drilling fluids disclosed herein also provide a surface reconditioning effect. Applications for the drilling fluids disclosed herein may include application to drill string, bit and other mechanical parts used in subterranean drilling. Other applications for the lubricants disclosed herein can include ski waxes, anti-stick coatings and antistick scratches.

The following examples are provided for illustrative purposes and are not intended to limit the present disclosure.

EXAMPLES

Friction Reduction

Pin on disc tests (stainless steel (SS) ball or a stainless steel (SS) substrate) were performed using test samples of drilling fluid of an isomerized alpha olefin (hydrocarbon fluid with isomerized molecules rearranged) with additives of 2% tungsten disulfide ($WS_2$) fullerene like geometry particles and a functionalization agent of ∈-caprolactam monomer, and a comparative sample of drilling fluid of an isomerized alpha olefin (hydrocarbon fluid with isomerized molecules rearranged) without additives. The test included a 1N load, a 0.4 cm/s speed and a test duration of 30 minutes. The data was plotted in FIG. 17, in which the tests samples of drilling fluid of an isomerized alpha olefin (hydrocarbon fluid with isomerized molecules rearranged) with additives of 2% tungsten disulfide ($WS_2$) fullerene-like geometry particles and a functionalization agent of E-caprolactam monomer are identified in FIG. 17 as "base fluid $WS_2$+E 2%-test 1" and "base fluid $WS_2$+E 2%-test 2". The data from testing of the comparative sample is identified in FIG. 17 as "base fluid". The data included in FIG. 7 illustrated a 36% decrease in friction for the test samples of isomerized alpha olefin with additives of 2% tungsten disulfide ($WS_2$) fullerene-like geometry particles and a functionalization agent of ∈-caprolactam monomer when compared to the comparative sample that did not include the tungsten disulfide ($WS_2$) fullerene-like geometry particles. There was also no measurable friction increase measured for the test samples of isomerized alpha olefin with additives of 2% tungsten disulfide ($WS_2$) fullerene-like geometry particles over a period of 650 cycles.

Wear Reduction

Figure 9A:
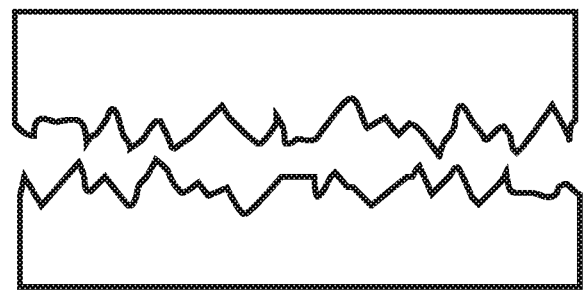
FIG. 9A is an illustration depicting a non-coated surface.
Figure 9B:
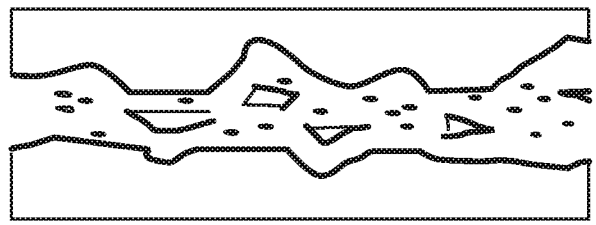
FIG. 9B is an illustration depicting a non-coated surface under friction.
Figure 17:
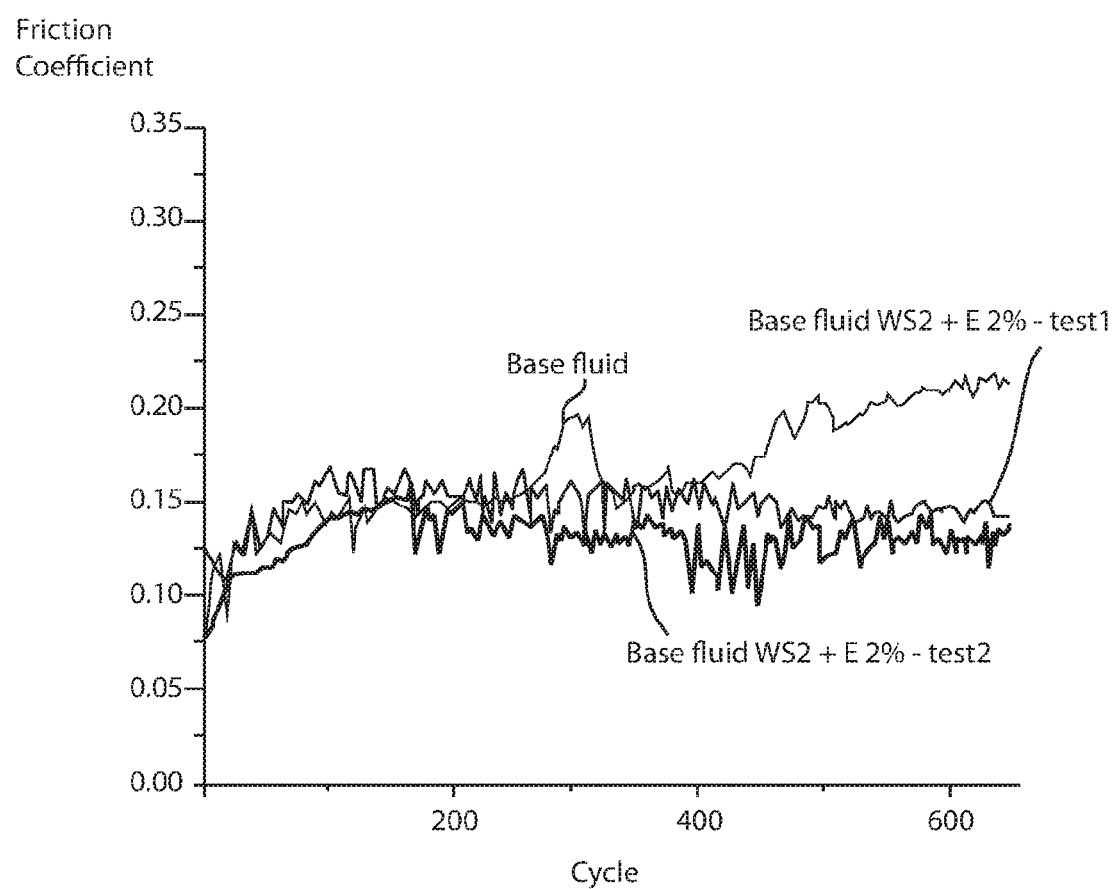
FIG. 17 is a plot of data from a pin on disc test for drilling fluid including the intercalation compound of a metal chalcogenide having molecular formula $MX_2$, which has a fullerene-like and/or tube-like geometry in comparison to a drilling fluid without the intercalation compound, in accordance with one embodiment of the present disclosure.
Figure 18:
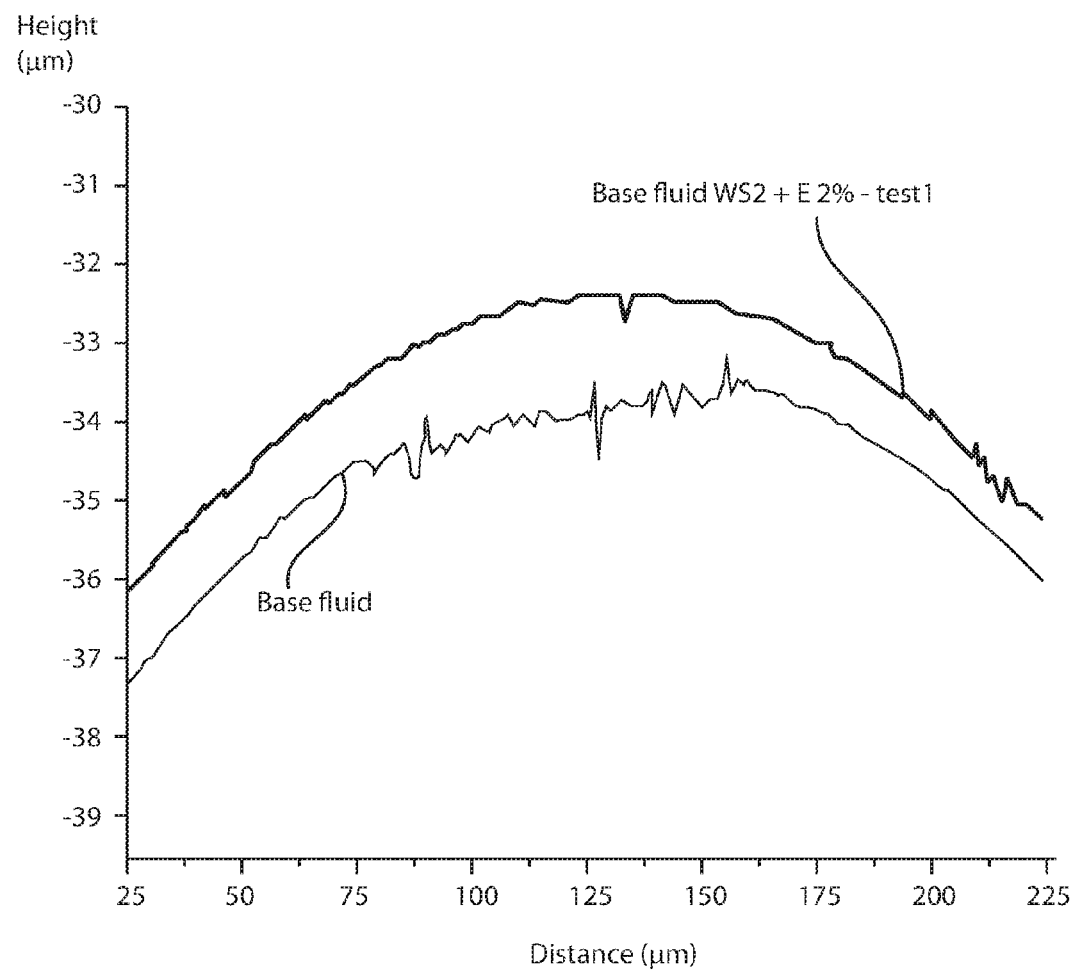
FIG. 18 depicts profilometry curves for the ball from the pin on disc test that provided the data in FIG. 17.
Figure 19A:
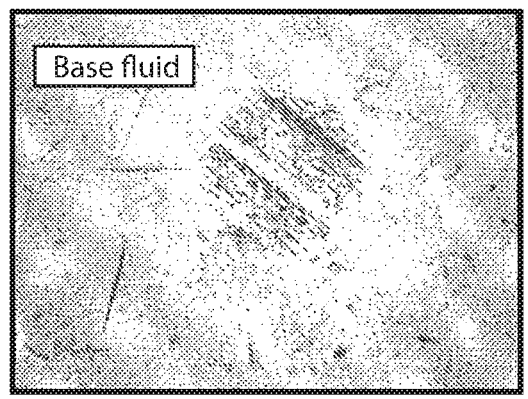
FIG. 19A is an optical microscope image of the ball from the pin on disc test applied to the comparative example composition that provided the data in FIG. 17.
Figure 19B:
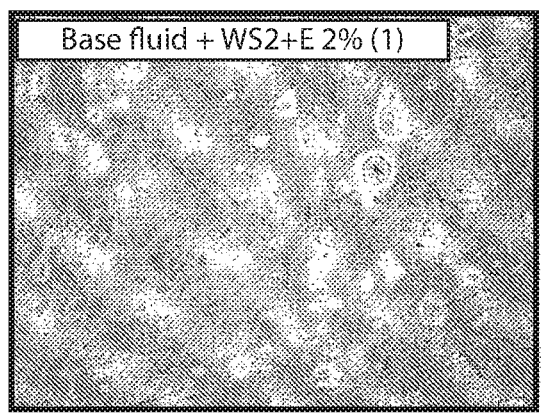
FIG. 19B is an optical microscope image of the ball from the pin on disc test applied to a first test sample including a composition having fullerene like nanoparticles in accordance with the present disclosure that provided the data in FIG. 17.
Figure 19C:
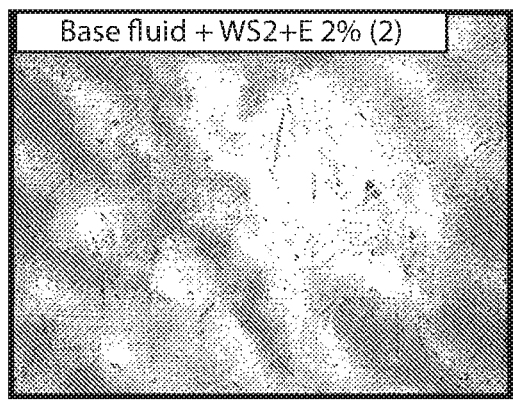
FIG. 19C is an optical microscope image of the ball from the pin on disc test applied to a second test sample including a composition having the fullerene like nanoparticles in accordance with present disclosure that provided the data in FIG. 17.

FIG. 18 depicts profilometry curves measured for the ball from the pin on disc test that provided the data in FIG. 17. The profilometry curve plotted in FIG. 18 for the test sample is identified as "base fluid $WS_2$+E 2%-test I". The profilometry curve plotted in FIG. 18 for the comparative sample is identified as "base fluid". The profilometry curves measured from the ball of the pin on disc test that included the drilling fluid of isomerized alpha olefin (hydrocarbon fluid with isomerized molecules rearranged) with additives of 2% tungsten disulfide ($WS_2$) fullerene-like geometry particles and a functionalization agent of ∈-caprolactam monomer indicated no wear. FIGS. 9B and 9C are optical microscope images of the ball from the pin on disc test including the drilling fluid of isomerized alpha olefin (hydrocarbon fluid with isomerized molecules rearranged) with additives of 2% tungsten disulfide ($WS_2$) fullerene-like geometry particles and a functionalization agent of E-caprolactam monomer. There is not visible wear depicted in FIGS. 19B and 19C. The profilometry curve for the ball of the comparative example of isomerized alpha olefin without tungsten disulfide ($WS_2$) fullerene-like geometry particles illustrated ball volume loss. Specifically, a scar having a depth of 0.5 μm was measured. The scar on the ball from the comparative example test is clearly depicted in the optical microscope image depicted in FIG. 19A.

Reduction of Engine Wear

Figure 20:
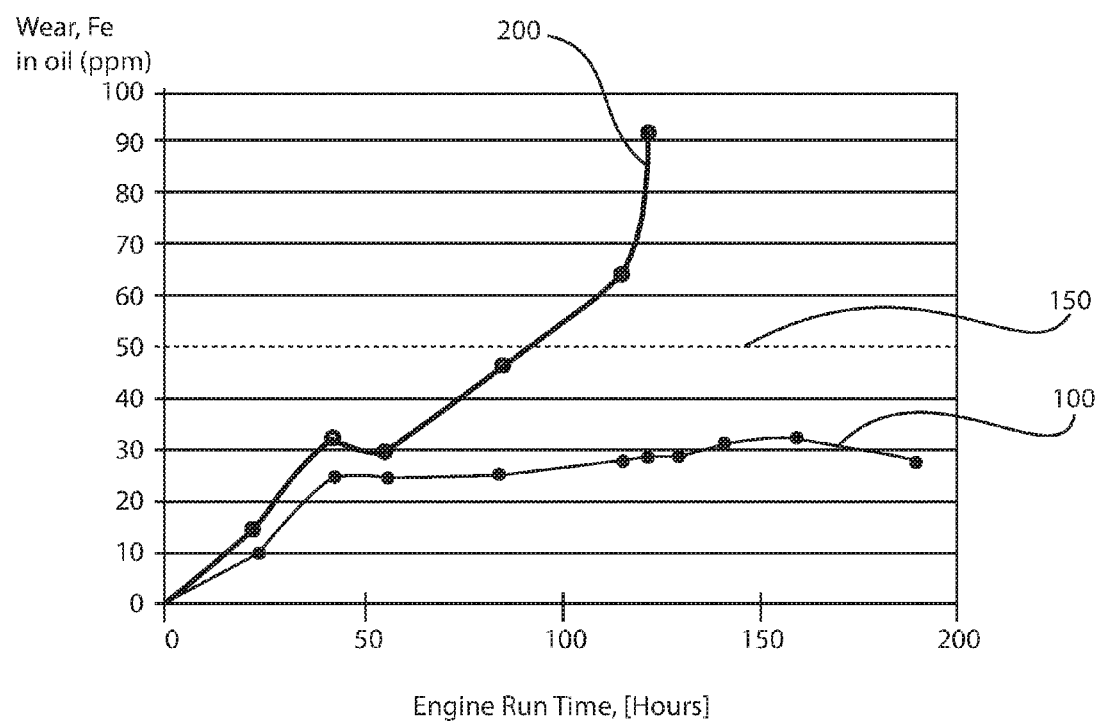
FIG. 20 is a plot of engine wear (measured by presence of iron (Fe) in oil (ppm) as a function of engine run time for a sample of 30 SAE oil including at least one intercalation compound of a metal chalcogenide having molecular formula $MX_2$ in comparison with a comparative sample of 30 SAE oil without the intercalation compound.

FIG. 20 is a plot of engine wear (measured by presence of iron (Fe) in oil (ppm) as a function of engine run time for a sample of 30 SAE oil including at least one intercalation compound of a metal chalcogenide having molecular formula $MX_2$ in comparison with a comparative sample of 30 SAE oil without the intercalation compound. In this example, the intercalation compound was fullerene like tungsten disulfide ($WS_2$) having a diameter ranging from 30 nm to 200 nm, and present in 30 SAE oil in an amount ranging from 0.1 wt % to 7 wt %. The plot identified by reference number 100 is the engine wear as a function of engine run time measured by the presence of iron (Fe)(worn from internal engine components) in SAE 30 oil lubricating the internal engine components during engine run time, wherein the oil lubricating the engine during the engine run time contained fullerene like tungsten disulfide ($WS_2$) intercalation compounds, in accordance with lubricants disclosed herein. The plot identified by reference number 200 is a comparative example, which was run in an identical engine using identical SAE oil with the exception that the oil did not include fullerene like tungsten disulfide ($WS_2$) intercalation compounds. The dashed line identified by reference number 150 illustrates the oil change level of iron (Fe) being measured in the oil. As indicated by plot in FIG. 20, when the engine run time approaches approximately 90 hours the iron content within the comparative example of oil (which does not contain fullerene like tungsten disulfide ($WS_2$) intercalation compounds) reaches the oil change level, whereas the iron (Fe) content in the oil treated with the fullerene like tungsten disulfide ($WS_2$) intercalation compounds does not reach the oil change level for up to approximately 180 hours.

Composite Materials Including Inorganic Fullerene-Like Particles and Inorganic Tubular-Like Particles in a Polymer Matrix In one embodiment, a composite is provided having a dispersed phase of an inorganic material of a metal chalcogenide composition with a fullerene-like geometry with a sectioned outer layer, a fullerene-like geometry without a sectioned outer layer, or tubular-like geometry that is present in a polymeric matrix. The description of the metal chalcogenide composition having a fullerene-like geometry without a sectioned outer layer, a fullerene-like geometry with a sectioned outer layer, and/or tubular-like geometry is provided by the above sections titled "MULTI-LAYERED FULLERENE-LIKE NANOPARTICLE STRUCTURE HAVING SECTIONED OUTER LAYER WITH SECTIONED PORTIONS PROTRUDING FROM THE SURFACE OF NANOPARTICLE" and "METAL CHALCOGENIDE FULLERENE-LIKE NANOPARTICLE AND METAL CHALCOGENIDE TUBULAR-LIKE GEOMETRY". The term "with and/or without a sectioned outer layer" and "with or without a sectioned outer layer" denote that the fullerene-like nanoparticles used can be solely those have a sectioned outer layer, solely nanoparticles without a sectioned outer layer or a combination of nanoparticles including the sectioned outer layer and nanoparticles without the sectioned outer layer.

A composite is a material composed of two or more distinct phases, e.g., matrix phase and dispersed phase, and having bulk properties different from those of any of the constituents by themselves. As used herein, the term "matrix phase" denotes the phase of the composite that is present in a majority of the composite, and contains the dispersed phase, and shares a load with it. In the present case, the matrix phase may be provided by a polymer. As used herein, the term "dispersed phase" denotes a second phase (or phases) that is embedded in the matrix phase of the composite. In some embodiments, the dispersed phase may be uniformly distributed throughout the entirety of the matrix phase. In other embodiments, the dispersed phase may be graded. By being graded it is meant that in some embodiments, the dispersed phase may be present in one portion of the matrix in a greater concentration than another portion of the matrix. For example, a greater concentration of the dispersed phase may be present in the portions of the composite structure that contact a frictional surface or a surface that would require repair from frictional contact.

In one example, the matrix phase is provided by an elastomer. An elastomer is a cross-linked, amorphous polymer when above its glass transition temperature. Each of the monomers, which link to form the polymer in an elastomer is usually made of carbon, hydrogen, oxygen and/or silicon. At ambient temperatures, elastomers are relatively soft, e.g., E-3 MPa, and deformable. Elastomers are usually thermosets (requiring vulcanization), but may also be thermoplastic. The long polymer chains cross-link during curing, i.e., vulcanizing. The elasticity is derived from the ability of the long chains to reconfigure themselves to distribute an applied stress. The covalent cross-linkages ensure that the elastomer will return to its original configuration when the stress is removed. As a result of this extreme flexibility, elastomers can reversibly extend from 5-700%, depending on the specific material. Without the cross-linkages or with short, uneasily reconfigured chains, the applied stress would result in a permanent deformation.

Examples of elastomers that are suitable for use with the present disclosure include unsaturated rubbers that can be cured by sulfur vulcanization, which include, but are not limited to: natural polyisoprene: cis-1,4-polyisoprene natural rubber (NR) and trans-1,4-polyisoprene gutta-percha; synthetic polyisoprene (IR for Isoprene Rubber); polybutadiene (BR for Butadiene Rubber); chloroprene rubber (CR), polychloroprene, neoprene, baypren etc; butyl rubber (copolymer of isobutylene and isoprene, IIR); halogenated butyl rubbers (chioro butyl rubber: CIIR; bromo butyl rubber: BIIR); styrene-butadiene rubber (copolymer of styrene and butadiene, SBR); nitrile rubber (copolymer of butadiene and acrylonitrile, NBR)(also called Buna N rubbers); hydrogenated nitrile rubbers (HNBR); therban; and zetpol.

In another embodiment, examples of elastomers that are suitable for use with the present disclosure include saturated rubbers that cannot be cured by sulfur vulcanization, which include, but are not limited to: EPM (ethylene propylene rubber, a copolymer of ethylene and propylene) and EPDM rubber (ethylene propylene diene rubber, a terpolymer of ethylene, propylene and a diene-component); Epichlorohydrin rubber (ECO); Polyacrylic rubber (ACM, ABR); Silicone rubber (SI, Q, VMQ); Fluorosilicone Rubber (FVMQ); Fluoroelastomers (FKM, and FEPM) Viton, Tecnoflon, Fluorel, Aflas and Dai-El; Perfluoroelastomers (FFKM) Tecnoflon PFR, Kalrez, Chernraz, Perlast; Polyether block amides (PEBA); Chiorosulfonated polyethylene (CSM); Ethylene-vinyl acetate (EVA) and combinations thereof.

Other types of elastomers that are suitable for use with the present disclosure include thermoplastic elastomers (TPE); the proteins resilin and elastin; and polysulfide rubber.

In some embodiments, when an elastomer serves as the matrix of a composite having a dispersed phase of an inorganic material of a metal chalcogenide composition with a fullerene like (with and/or without a sectioned outer layer) or tubular-like geometry, the mechanical properties of the composite are greater than the elastomer by itself. For example, the mechanical properties are enhanced, e.g., the slope of the stress-strain curve is increased, in comparison to the elastomer. The composite also has greater lubricating qualities that the elastomer by itself.

Composites including elastomers in accordance with the present disclosure may be used in sealing engagement applications, such as gaskets, vehicle tires, pump housing, anti vibration mountings, etc.

In another embodiment, the polymer that is selected for the matrix of the composite may be an epoxy. Epoxies are typically thermosets. Epoxy resins, also known as polyepoxides are a class of reactive prepolymers and polymers which contain epoxide groups. Epoxy resins may be reacted (cross-linked) either with themselves through catalytic homopolymerisation, or with a wide range of co-reactants including polyfunctional amines, acids (and acid anhydrides), phenols, alcohols and thiols. These co-reactants are often referred to as hardeners or curatives, and the cross-linking reaction is commonly referred to as curing. Epoxy compositions that are suitable for use with the present disclosure may include bisphenol A epoxy resin, bisphenol F epoxy resin, novolac epoxy resin, aliphatic epoxy resin, glycidylamine epoxy resin and combinations thereof. One example of the repeating unit for an epoxy that is suitable for use with the present disclosure is a diglycidyl ether of bisphenol A, DGEPA, as follows:

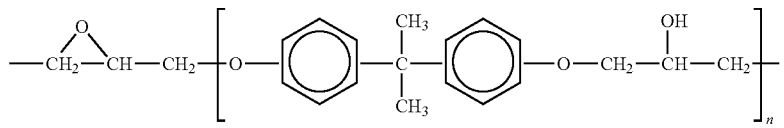

-continued

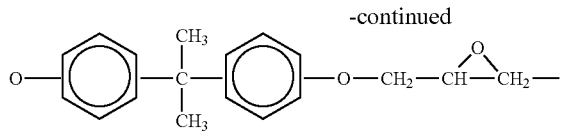

In some embodiments, when an epoxy serves as the matrix of a composite having a dispersed phase of an inorganic material of a metal chalcogenide composition with a fullerene-like (with and/or without a sectioned outer layer) or tubular-like geometry, the mechanical properties of the composite greater than the mechanical epoxy by itself. For example, the peel strength and shear strength performance of a composite of epoxy and the inorganic materials of the metal chalcogenide composition with the fullerene-like (with and/or without a sectioned outer layer) or tubular-like geometry is greater than the peel strength and shear strength performance of the epoxy by itself. In some embodiments, the inclusion of the dispersed phase of an inorganic material of the metal chalcogenide composition with the fullerene-like or tubular-like geometry can double the peel strength and shear strength performance of the composite when compared to the epoxy. Energy absorbance, as indicated from the area under the stress-strain curve (e.g. of a tensile test according to ASTM D638) is also increased when compared to epoxy. Impact strength is also increased. Applications for composites including an epoxy based matrix and a dispersed phase of inorganic material having a metal chalcogenide composition, e.g., tungsten disulfide ($WS_2$), and having a fullerene-like (with and/or without a sectioned outer layer) and/or tubular-like geometry include adhesives, in addition to structures that employ the epoxy as the matrix of the structures body.

Hardeners for use with the disclosed epoxies may include amine hardeners, such as Jeffamine T-403, TETA, HY 955; amide hardeners, such as Versamide V-x series; sulfide hardeners, such as Capcure 3-800, LP-x series; anhydride hardeners; and accelerators, such as Epon DMP-x series. The above noted hardeners are typically suitable for DGEBA. Other hardeners based on a variation of amines may be employed in the epoxy systems.

In another embodiment, the polymer may be a thermoplastic material, such as polyether ether ketone (PEEK) and polypropylene (PP). PEEK polymers are obtained by step-growth polymerization by the dialkylation of bisphenolate salts. When PEEK is employed as the matrix of a composite material including a dispersed phase of inorganic materials of the metal chalcogenide composition with the fullerene-like (with and/or without a sectioned outer layer) or tubular-like geometry, the mechanical properties of the composite are greater than the mechanical properties of PEEK without the dispersed phase of inorganic materials. For example, the Young's modulus may be doubled by the inclusion of the dispersed phase of inorganic materials of the metal chalcogenide composition with the fullerene-like (with and/or without a sectioned outer layer) or tubular-like geometry into a matrix of PEEK. Impact strength is also increased.

Applications for PEEK in accordance with the present disclosure include medical implants, aerospace structures, automotive structures, bearings, piston parts, pumps, compressor plate valves, and cable insulation.

Polypropylene (PP) is an addition reaction mechanism polymer made from the monomer propylene. Low-density polyethylene (LDPE) and high-density polyethylene (HDPE) are both suitable for use with the present disclosure. PP may be suitable for use as the matrix phase of a composite in accordance with the present disclosure, and is suitable for use in automotive and aerospace applications.

Automotive applications for composites including polypropylene, such as LDPE and HDPE, may include bumpers, fuel lines, door panels and fenders. PP may also be suitable for shielding piping and wire cable sheathing applications. The mechanical properties and impact strength of PP is increased by incorporation of a dispersed phase of inorganic material having a metal chalcogenide composition with a fullerene-like (with and/or without a sectioned outer layer) or tubular-like geometry.

In another embodiment, the polymer for the matrix for the composite may be a polyamide. A polyamide is a polymer containing monomers of amides joined by peptide bonds. An amide group has the formula —$CONH_2$. An amide link has this structure:

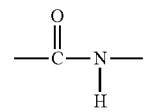

The polyamide polymer may have a high crystallinity, a low crystallinity or may be amorphous. Polyamide polymers that are suitable for use with the present disclosure may be homopolymers or copolymers. The polyamide polymers may aliphatic, semi aromatic, aromatic or a combination thereof.

In one embodiment, the polyamide used for the matrix phase of the polymer composite may be nylon. Nylon may be an aliphatic polymer. In nylon, the repeating units contain chains of carbon atoms. There are various different types of nylon depending on the nature of those chains. Examples of nylons that may be suitable for use as the base material layer of the coating may include nylon-6,6; nylon-6; nylon-6,9; nylon-6,10; nylon-6,12; nylon-11; nylon-12 and nylon-4,6. The repeating unit for nylon-6 is as follows:

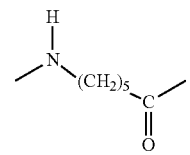

The repeating unit for nylon 6-6 is as follows:

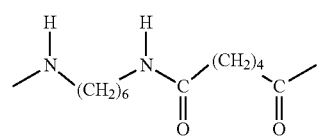

In some embodiments, nylons are condensation copolymers formed by reacting equal parts of a diamine and a dicarboxylic acid, so that amides are formed at both ends of each monomer in a process analogous to polypeptide biopolymers. Chemical elements included are carbon, hydrogen, nitrogen, and oxygen.

In another embodiment, the polyamide for the matrix phase of the polymer composite is kevlar. Kevlar is similar in structure to nylon-6,6 except that instead of the amide links joining chains of carbon atoms together, they join benzene rings.

In another embodiment, the polyamide used for the matrix phase of the composite may be polyphthalamide (aka. PPA, High Performance Polyamide). PPA is a thermoplastic synthetic resin of the polyamide (nylon) family. PPA's are polyamides containing aromatic rings in their backbones, which gives them high mechanical strength and thermal resistance. The term PPA is used when 60% or more moles of the carboxylic acid portion of the repeating unit in the polymer chain is composed of a combination of terephthalic (TPA) and isophthalic (IPA) acids. PPA's may be a semi-crystalline material composed from a diacid and a diamine. PPA is typically formed by the reaction of aromatic acids with aliphatic diamines. In some embodiments, the diacid portion contains at least 55% terephthalic acid (TPA) or isophthalic acid (IPA). Molar masses for PPA's made with direct polycondensation techniques range between 12,000 and 16,000 g/mol.

In another embodiment, the polyamide used for the matrix phase of the composite may be a polyphthalamide blend. For example, the matrix of the composite may be composed of at least one of polyphthalamide/polyamide blends and polyphthalamide/polyamide/polyolefin blends.

Other polyamides that are suitable for use as the matrix material of the composite include polyvinyl chloride (PVC), polyester (PES), polyethermide (PEI) and polyphenylene sulfide (PPS).

In some embodiments, the matrix phase of the composite may be provided by polyamide-imides. The polyamide-imides may be thermosetting or thermoplastic amorphous polymers. Polamide-imide polymers include a polymer chain that comprises amide linkages alternating with imide linkages. The mer unit for one example of a polyamide-imide used in accordance with the present disclosure is as follows:

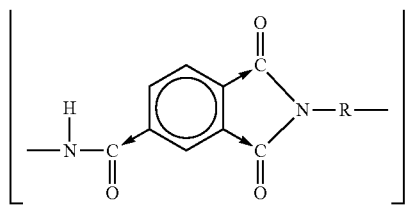

Polyamide-imides may be made from isocyanates and TMA (trimellic acid-anhydride) in N-methylpyrrolidone (NMP). For example, one route to the formation of polyamide-imides is the condensation of an aromatic diamine, such as methylene dianiline (MDA) and trimellitic acid chloride (TMAC). Reaction of the anhydride with the diamine produces an intermediate amic acid. The acid chloride functionality reacts with the aromatic amine to give the amide bond and hydrochloric acid (HCl) as a by-product. In the commercial preparation of polyamideimides, the polymerization is carried out in a dipolar, aprotic solvent such as N-methylpyrrolidone (NMP), dimethylacetamide (DMAC), dimethylformamide (DMF), or dimethylsulfoxide (DMSO) at temperatures between 20-60° C. The byproduct hydrochloric acid (HCl) is typically neutralized in situ or removed by washing it from the precipitated polymer. In another example, polyamide-imides may be formed by reacting diisocyanate, often 4,4'-methylenediphenyldiisocyanate (MDI), with trimellitic anhydride (TMA). Polyamide-imides that are suitable for the methods and structures disclosed herein may be available from Solvay Advanced Polymers under the trademark Torlon, such as Torlon 4301, Torlon ai-10, Torlon ai-10 LM or Torlon 4000. Polyamide-imides (PAI) may be used in conjunction with fluoropolymers.

In some embodiments, the matrix material of the composite may be provided by polyethylene (PE). The term polyethylene describes a family of resins obtained by polymerizing ethylene gas, $H_2C=CH_2$. In some examples, low density polyethylene typically has a density value ranging from 0.91 to 0.925 g/cm$^3$, linear low density polyethylene is in the range of 0.918 to 0.94 g/cm$^3$, while high density polyethylene ranges from 0.935 to 0.96 g/cm$^3$ and above.

In another embodiment, the matrix material of the composite may be cross-linked polyethylene (PEX). Typically, PEX is made from high density polyethylene (HDPE). Cross linked polyethylene (PEX) contains cross-linked bonds in the polymer structure, changing the thermoplastic to a thermoset. In one embodiment, in order to be classified as being cross linked polyethylene (PEX), the required degree of cross-linking, according to ASTM Standard F 876-93, is between 65% and 89%.

In yet another embodiment, the polymer for the composite may be a polyester. Polyester is a category of polymers which contain the ester functional group in their main chain. In some examples, polyester that is suitable for the composite may include polybutylene terephthalate (PBT) and polyethylene terephthalate (PET). The repeating unit of polybutylene terephthalate (PBT) is as follows:

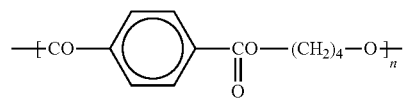

Polybutylene Terephthalate

The repeating unit of polyethylene terephthalate (PET) is as follows:

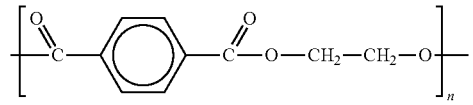

Polyesters are synthesized by reacting an organic acid, in this case terephthalic acid, with an alcohol. In the case of polybutylene terephthalate (PBT), the alcohol is generically referred to as butylene glycol, while in polyethylene terephthalate (PET) it is ethylene glycol. The resulting polymers are known, therefore, as polybutylene terephthalate (PBT) and polyethylene terephthalate (PET).

Other polymers that are suitable for use as the matrix phase of the composite include polyvinyl chloride (PVC), polyester (PES), polyamides (PA), polyethermide (PEI) and polyphenylene sulfide (PPS). PVC is suitable for shielding and piping applications. PES is suitable for use in fiber and textile applications; and PA is suitable fibers, toothbrush bristles, and car engine moldings. PEI and PPS are high temperature polymers. The structural properties of PVC, PES, PA, PEI and PPS may all be enhanced by incorporation of a dispersed phase of inorganic material having a metal chalcogenide composition with a fullerene-like (with and/or without a sectioned outer layer) or tubular-like geometry, in accordance with the present disclosure.

The dispersed phase of the inorganic material having the metal chalcogenide composition typically has a fullerene-like geometry with a sectioned outer layer, a fullerene-like geometry without a sectioned outer layer, and/or a tubular-like geometry that is present in a polymeric matrix. The description of the metal chalcogenide composition having a fullerene-like geometry without a sectioned outer layer, a fullerene-like geometry with a sectioned outer layer, and/or tubular-like geometry is provided by the above sections titled "MULTI-LAYERED FULLERENE-LIKE NANOPARTICLE STRUCTURE HAVING SECTIONED OUTER LAYER WITH SECTIONED PORTIONS PROTRUDING FROM THE SURFACE OF NANOPARTICLE" and "METAL CHALCOGENIDE FULLERENE-LIKE NANOPARTICLE AND METAL CHALCOGENIDE TUBULAR-LIKE GEOMETRY". In some embodiments, the inorganic materials having the metal chalcogenide composition and the fullerene-like (with and/or without a sectioned outer layer) and/or tubular-like geometry may be present in the polymer matrix in an amount greater than 0.01% by volume. In some embodiments, the inorganic materials having the metal chalcogenide composition and the fullerene-like (with and/or without a sectioned outer layer) and/or tubular-like geometry may be present in the polymer matrix in an amount ranging from 0.1 wt % to 60 wt. %. In another embodiment, the inorganic materials having the metal chalcogenide composition and the fullerene-like (with and/or without a sectioned outer layer) and/or tubular-like geometry may be present in the polymer matrix in an amount ranging from 0.1 wt % to 20 wt. %. In yet another embodiment, the inorganic materials having the metal chalcogenide composition and the fullerene-like and/or tubular-like geometry may be present in the polymer matrix in an amount ranging from 0.1 wt % to 10 wt. %.

In some embodiments, the composite structure may include a second dispersed phase of a carbon containing material, such as carbon nanotubes, e.g., single wall carbon nanotubes (CNT) or multi-wall carbon nanotubes (SWNT), or graphitic materials, such as carbon black (CB), graphitic fibers, diamond like carbon (DLC). The second dispersed phase of carbon containing materials could be used in polymer matrices for reinforcement or in order to obtain desired physical, chemical or mechanical properties.

In one embodiment, the carbon containing material is provided by carbon nanotubes may have a high purity on the order of about 95% to about 99% carbon. In an even further embodiment, the carbon nanotubes have a high purity on the order of about 99% or greater. In one embodiment, the carbon nanotubes may be provided by laser vaporization. In one embodiment, the single wall carbon nanotubes are formed using laser vaporization in combination with a catalyst, such as a metal catalyst. In one embodiment, the catalyst is supported on a substrate, such as a graphite substrate, or the catalyst may be floating metal catalyst particles. In one embodiment, the metal catalyst may be composed of Fe, Ni, Co, Rh, Y or alloys and combinations thereof.

The diameter of a single wall carbon nanotube may range from about 1 nanometer to about 400 nanometers. In another embodiment, the diameter of a single wall carbon nanotube may range from about 1.2 nanometers to about 1.6 nanometers. In one embodiment, the nanotubes used in accordance with the present invention have an aspect ratio of length to diameter on the order of approximately 200:1.

The carbon nanotubes comprise a majority of carbon typically being of high purity. In other examples, the carbon nanotubes include a carbon content ranging from being greater than 50%, wherein a purification process is utilized to provide carbon nanotubes having of high purity, such as greater than 90% carbon. In one embodiment, the carbon nanotubes may be purified by a process that includes an acid treatment followed by an oxidation. In one embodiment, the acid treatment may include treatment and oxidation steps are provided by a dilute $HNO_3$ reflux/air oxidation procedure.

Other methods of forming the carbon nanotubes may also be employed, such as chemical vapor deposition (CVD). In another embodiment, the carbon nanotubes may be multi-walled. Carbon black (also known as acetylene black, channel black, furnace black, lamp black or thermal black) is also suitable for providing the at least one carbon containing nanomaterial. Carbon black is a material produced by the incomplete combustion of heavy petroleum products such as FCC tar, coal tar, ethylene cracking tar, and a small amount from vegetable oil.

In some embodiments, the carbon containing material may be present in the polymer matrix in an amount ranging from 0.1 wt. % to 60 wt. %. In another embodiment, the carbon containing material may be present in the polymer matrix in an amount ranging from 0.1 wt. % to 40 wt. %. In yet another embodiment, the carbon containing material in the polymer matrix in an amount ranging from 0.1 wt % to 30 wt. %.

The process of obtaining homogeneous mix of inorganic fullerene-like (with and/or without a sectioned outer layer) and/or tubular particles with carbon containing materials may begin with premixing the inorganic material having the metal chalcogenide composition and the fullerene-like (with and/or without a sectioned outer layer) and/or tubular-like geometry with the carbon containing material. In one embodiment, the premixing step may be done by dry mixing. In another embodiment, the premixing step may employ a solvent as a mixing media, such as alcohol. Examples of mixing media that are suitable for mixing the inorganic material having the metal chalcogenide composition and the fullerene-like (with and/or without a sectioned outer layer) and/or tubular-like geometry with the carbon containing materials include an alcohol, such as methyl alcohol, ethyl alcohol, isopropyl alcohol, propanol, butanol, hexanol, heptanol, octanol, ethylene glycol, glycerol and combinations thereof. In another embodiment, the mixing media may be an inert solvent.

The polymer may then be added to the premixture of the inorganic fullerene-like (with and/or without a sectioned outer layer) and/or tubular particles with carbon containing materials. The polymer may be any precursor for providing the above described polymer compositions. In some examples, the monomer/polymer may be selected from the group consisting of ethylene, propylene, homopolymers, copolymers thereof with alpha-olefins, conjugated alpha-diolefins, styrene, cycloalkenes, norbornene, norbornadiene, cyclopentandiene, elastomer type of polymer and mixtures thereof. Mixing procedures could be conducted using at least one of high shear mixers, two or three roll mixers, homogenizers, bead mills, ultrasonic pulverizer, ribbon blender, v blender, continuous processor, cone screw blender, double planetary, counter-rotating, vacuum mixer, dispersion mixer, magnetic stirrers and variations thereof in combination with or without elevated temperature to the value of polymer melting point. In some embodiments, when alcohol is used as a mixing media, it should be evaporated prior to adding the polymer. The mixture may then be fed into an extruder to the form the polymer.

In one example, the inorganic material having the metal chalcogenide composition, e.g., tungsten disulfide $WS_2$, with the fullerene-like (with and/or without a sectioned outer layer) and/or tubular-like geometry is incorporated into the thermoplastic polymer, e.g., nylon, PE, PP, to improve the polymers mechanical properties (e.g. toughness), and/or its tribological properties. These materials can be used either as matrices in composites, and as stand-alone polymers.

The product may be provided as a granulated compound containing the metal chalcogenide composition, e.g., tungsten disulfide $WS_2$, with the fullerene-like and/or tubular-like geometry inside a matrix of thermoplastic polymers, e.g., nylons, PE, PP. The compounding can be provided by direct mixing of powder, e.g., tungsten disulfide $WS_2$, with twin-screw extruder. In another example, the compounding can be achieved by dispersion in a plasticizer compatible to the polymer by high shear mixer or stirred bead mill, and then incorporation to the compound by twin-screw extruder.

Extrusion is only one way to form a composite product in accordance with the present disclosure. For example, composite structures may be formed using molding methods. In one example, a composite structure including a polymeric matrix and a dispersed phase of the inorganic material having the metal chalcogenide composition, e.g., tungsten disulfide ($WS_2$), and having a fullerene-like like (with and/or without a sectioned outer layer) and/or tubular-like geometry may be formed using injection molding. In injection molding, a composite precursor including the a polymeric matrix and a dispersed phase of the inorganic material having the metal chalcogenide composition, e.g., tungsten disulfide ($WS_2$), and having a fullerene-like like (with and/or without a sectioned outer layer) and/or tubular-like geometry is melted and forced into a mold cavity. The mold cavity has the geometry for the composite structure. Once cooled, the melted composite precursor solidifies in the form of the geometry defined by the mold, and the mold can be removed. In another embodiment, the composite structure may be formed using blow molding. Blow molding is like injection molding except that hot liquid precursor composite material pours out of a barrel vertically in a molten tube. The mold closes on it, and forces it outward to conform to the inside shape of the mold. When it is cooled, a hollow geometry is formed for the composite structure. In another embodiment, the composite product of the polymer matrix and the dispersed phase of the inorganic material having the metal chalcogenide composition, e.g., tungsten disulfide ($WS_2$), and having a fullerene-like like (with and/or without a sectioned outer layer) and/or tubular-like geometry may be formed using compression molding. In this type of plastic molding, a slug of hard plastic, i.e., slug of solidified composite precursor including the polymeric matrix and a dispersed phase of the inorganic material having the metal chalcogenide composition, e.g., tungsten disulfide ($WS_2$), and having a fullerene-like like (with and/or without a sectioned outer layer) and/or tubular-like geometry, is pressed between two heated mold halves. Compression molding usually uses vertical presses instead of the horizontal presses used for injection and blow molding. The parts of the composite material that are formed are then air-cooled. In other examples, composite parts may be formed using rotational molding, structural foam molding, thermoforming, film insert molding, gas assist molding and combinations thereof.

In some embodiments, continuous friction applied to a metal chalcogenide of tungsten disulfide ($WS_2$) having a fullerene like geometry like (with and/or without a sectioned outer layer) 15 will exfoliate the outer layers of material, as depicted in FIG. 10, onto a frictional surface that is applying pressure to the tungsten disulfide material, wherein the exfoliating outer layers create a tribofilm layer 20. A "tribofilm" is defined as a thin solid film generated as a consequence of sliding contact, which is adhered on a contacting, i.e., frictional, surface, but has different chemical composition, structure and tribological behavior than the contacting surface. The exfoliated nano-particle layers accumulate in wear crevices in the surfaces that the tribofilm layer 20 comes in contact with, creating a continuous super-lubricating tribofilm layer 20. The exfoliated tribofilm layers from the metal chalcogenide of the coating may be referred to as lamellas. The lamellas orient parallel to the deposition surface in the direction of the frictional motion. Even between highly loaded stationary surfaces the lamellar structure is able to prevent contact. Therefore, in some embodiments, the composite structures disclosed herein may induce lubricating properties on surfaces that they come in contact with the composite structures, wherein the composite structures contain the metal chalcogenide having the fullerene like geometry, e.g., tungsten disulfide, that can exfoliate outer layers of the layered structure to provide tribofilm.

In some embodiments, the tirbofilm layer that may be exfoliated from the layered fullerene (with and/or without a sectioned outer layer) geometry metal chalcogenide, e.g., $WS_2$, of the composite provides a damping effect to absorb shock between the surface that the tribofilm layer is formed on an a second surface that the tribofilm layer contacts. The particles, being closed-cage, absorb pressure. Additionally, in the direction of motion the lamellas of the tribofilm layer easily shear over each other resulting in a low friction. The lubricating tribofilm layer repairs wear damage, prevents further wear, reduces the coefficient of friction and reduces the local temperature.

Figure 21:
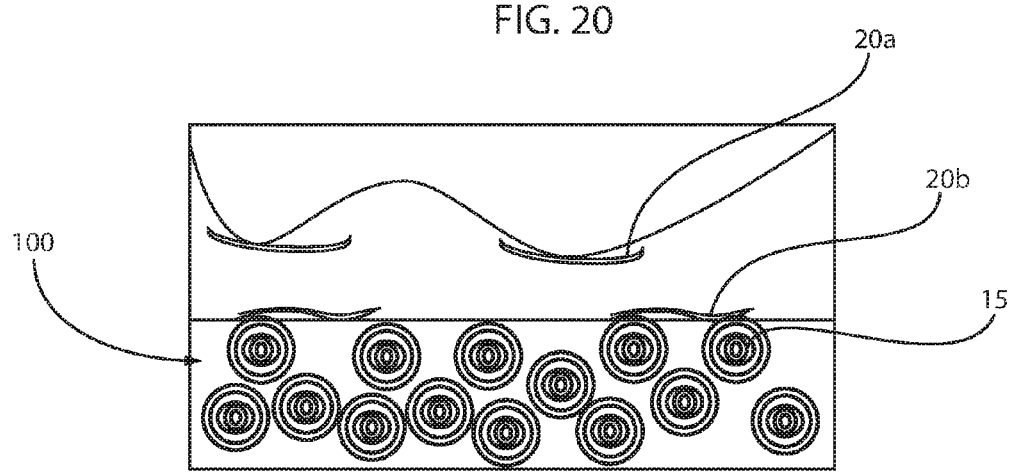
FIG. 21 is an illustration depicting the application of a friction force to a composite structure including a polymeric matrix and a dispersed phase of metal chalcogenide having a molecular formula $MX_2$ and a fullerene-like geometry, in accordance with one embodiment of the present disclosure.

Referring to FIG. 21, a composite 100 of a polymeric matrix containing a dispersed phase of metal chalcogenide with a fullerene like (with and/or without a sectioned outer layer) or tubular-like geometry 15, e.g., tungsten disulfide $WS_2$, is depicted adjacent to a frictional surface 16. The composite 100 including the chalcogenide of tungsten disulfide ($WS_2$) having a fullerene like geometry 15 (with and/or without a sectioned outer layer) creates a tribofilm 20a of exfoliated material of metal chalcogenide, e.g., tungsten disulfide $WS_2$, with a fullerene like or tubular-like geometry 15 on the frictional surface 16 contacting the composite structure 100. Further, exfoliated material of metal chalcogenide, e.g., tungsten disulfide $WS_2$, with a fullerene like or tubular-like geometry 15 from the composite structure 100 can create a fresh tribofilm 20b on the composite 100 itself. Consequently, the coefficient of friction for the composite structure 100 is constantly low.

Another advantage of the composite of the polymeric matrix containing the dispersed phase of metal chalcogenide with a fullerene like (with and/or without a sectioned outer layer) or tubular-like geometry 15, e.g., tungsten disulfide WS$_2$, is the shock wave resistance of the nanostructures. For example, the shock-wave resistance of WS$_2$ nanotubes has been studied and compared to that of carbon nanotubes, in which it has been determined that WS$_2$ nanotubes are capable of withstanding shear stress caused by shock waves of up to 21 GPa. Under similar shock conditions, WS$_2$ tubes are more stable than carbon nanotubes, the latter being transformed into a diamond phase. In some embodiments, the supershock-absorbing ability of the IF-WS$_2$ enables them to survive pressures up to 25 GPa accompanied with concurrent temperatures of up to 1000° C. without any significant structural degradation or phase change. IF-WS$_2$ are stable in air at temperatures higher than 400° C.

In another aspect of the present disclosure, the composite having the dispersed phase of the metal chalcogenide with a fullerene-like (with and/or without a sectioned outer layer) and/or tubular-like geometry that is present in a polymeric matrix may be employed as the stator of a drill string for subterranean drilling. In one embodiment, a "drill string" is a column, or string, of drill pipe that transmits drilling fluid and torque to the drill bit. Positive Displacement Motors (PDMs) are known in the art and are commonly used to drill wells in earth formations. PDMs operate according to a reverse mechanical application of the Moineau principle, wherein pressurized fluid is forced through a series of channels formed on a rotor and a stator. The channels are generally helical in shape and may extend the entire length of the rotor and stator. The passage of the pressurized fluid generally causes the rotor to rotate within the stator. For example, a substantially continuous seal may be formed between the rotor and the stator, and the pressurized fluid may act against the rotor proximate the sealing surfaces so as to impart rotational motion on the rotor as the pressurized fluid passes through the helical channels.

Figure 22:
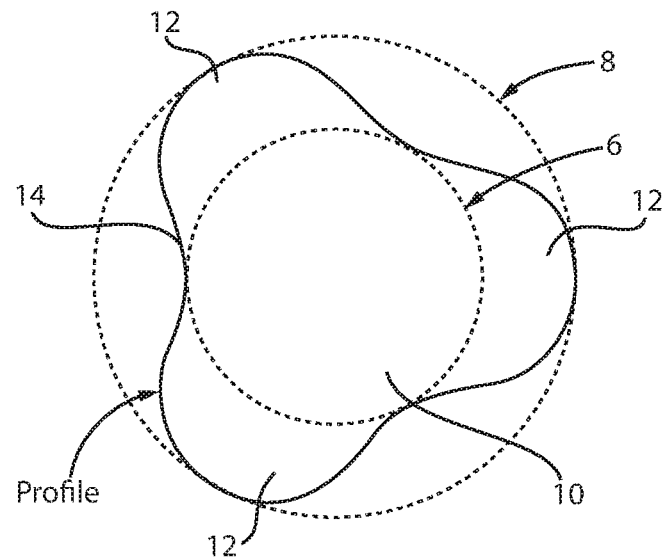
FIG. 22 is a first cross-sectional top down view of a drilling string having a stator composed of a composite having a dispersed phase of an inorganic material of a metal chalcogenide composition with a fullerene-like or tubular-like geometry that is present in a polymeric matrix, in accordance with one embodiment of the present disclosure.
Figure 23:
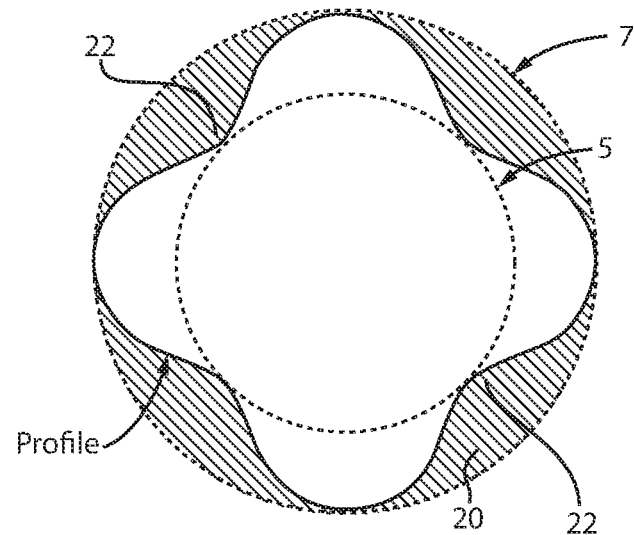
FIG. 23 is a second cross-sectional top down view of a drilling string having a stator composed of a composite having a dispersed phase of an inorganic material of a metal chalcogenide composition with a fullerene-like or tubular-like geometry that is present in a polymeric matrix.
Figure 24:
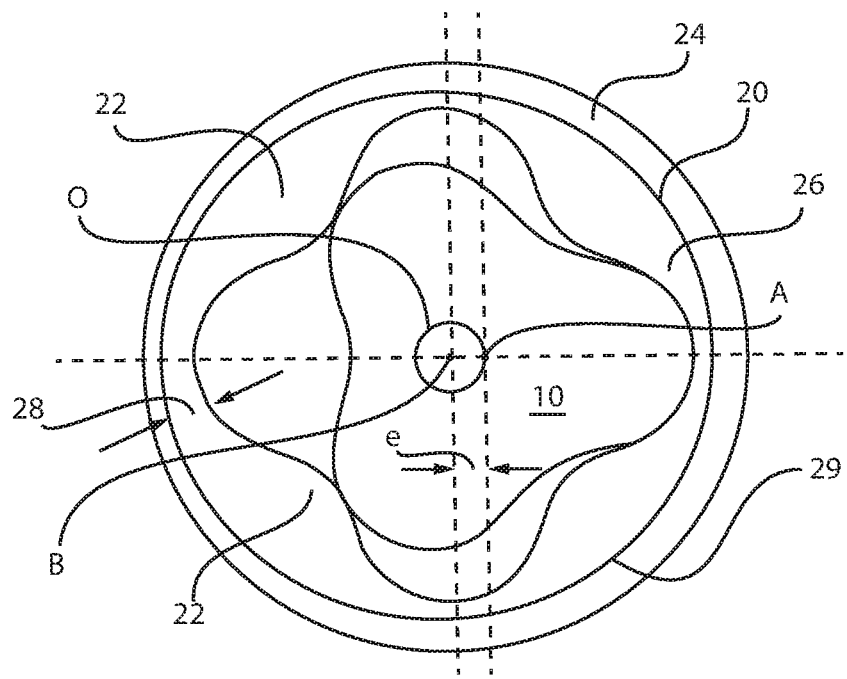
FIG. 24 is a third cross-sectional top down view of a drilling string having a stator composed of a composite having a dispersed phase of an inorganic material of a metal chalcogenide composition with a fullerene-like or tubular-like geometry that is present in a polymeric matrix.

Referring to FIG. 22, a typical rotor 10 includes at least one lobe 12 (wherein, for example, channels 14 are formed between lobes 12), a major diameter 8, and a minor diameter 6. The rotor 10 may be formed of metal or any other suitable material. The rotor 10 may also be coated to withstand harsh drilling environments experienced downhole. Referring to FIG. 23, a typical stator 20 comprises at least two lobes 22, a major diameter 7, and a minor diameter 5. Referring to FIG. 7, the stator 20 generally includes a cylindrical external tube 24, i.e., casing, and a liner 26. The liner 26 of the stator 20 may be composed of a composite having a dispersed phase of an inorganic material of a metal chalcogenide composition with a fullerene-like (with and/or without a sectioned outer layer) and/or tubular-like geometry that is present in a polymeric matrix. In one embodiment, the inorganic material of the metal chalcogenide has a molecular formula MX$_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The above description of the composite having a dispersed phase of an inorganic material of a metal chalcogenide composition with a fullerene-like (with and/or without a sectioned outer layer) or tubular-like geometry that is present in a polymeric matrix is suitable for the description of the composite for the liner 26 of the strator 20. For example, the inorganic material of the metal chalcogenide having the molecular formula MX$_2$ is present in the polymer matrix in an amount of greater than 0.01% by volume for the material of the liner 26. The liner 26 is typically injected into the cylindrical external tube 24 around a mold (not shown) that has been placed therein. The liner 26 is then cured for a selected time at a selected temperature (or temperatures) before the mold (not shown) is removed.

By forming the liner 26 of the stator 20 with the composite having the dispersed phase of inorganic materials of the metal chalcogenide composition with fullerene-like (with and/or without a sectioned outer layer) or tubular-like geometry that is present in a polymeric matrix, the strength and lubricity of the liner 26 for the stator 20 is increased. In some embodiments, the polymer matrix that is employed in the liner 26 of the stator 20 is composed of an elastomer. Any of the above-described elastomers are suitable to provide the matrix phase of the composite for the liner 26 of the stator 20.

Figure 25:
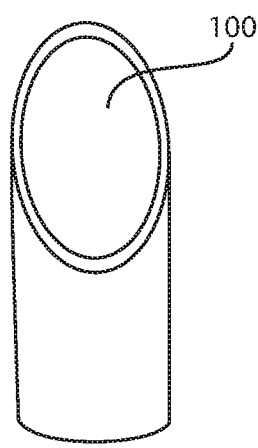
FIG. 25 is a perspective view of a drill pipe includes a coating on an interior wall of the drill pipe that is composed of a composite having a dispersed phase of an inorganic material of a metal chalcogenide composition with a fullerene-like or tubular-like geometry that is present in a polymeric matrix, in accordance with one embodiment of the present disclosure

In yet another embodiment, a drill pipe is provided that includes a coating 100 on an interior wall of the drill pipe that is composed of a composite having a dispersed phase of an inorganic material of a metal chalcogenide composition with a fullerene-like (with and/or without a sectioned outer layer) or tubular-like geometry that is present in a polymeric matrix, as depicted in FIG. 25. A drill pipe is a hollow thick-walled steel piping that is used in drilling rigs and horizontal drilling to facilitate drilling of a wellbore. They are hollows to allow drilling fluid to be pumped through them, down the hole and then back up to the surface. The coating 100 is composed of a composite having a dispersed phase of an inorganic material of a metal chalcogenide composition with a fullerene-like (with and/or without a sectioned outer layer) or tubular-like geometry that is present in a polymeric matrix. In one embodiment, the inorganic material of the metal chalcogenide has a molecular formula MX$_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The above description of the composite having a dispersed phase of an inorganic material of a metal chalcogenide composition with a fullerene-like or tubular-like geometry that is present in a polymeric matrix is suitable for the description of the composite material of the coating 100. For example, the inorganic material of the metal chalcogenide having the molecular formula MX$_2$ is present in the polymer matrix for the coating 100 in an amount of greater than 0.01% by volume. With fullerene-like or tubular-like geometry that is present in the coating composite, the strength and lubricity of the coating 100 for the drill pipe is increased.

The following examples are provided to further illustrate the present invention and demonstrate some advantages that arise therefrom. It is not intended that the invention be limited to the specific examples disclosed.

EXAMPLES

This following example details the stages involved in one embodiment for the preparation of a dispersion for forming a composite including a polymeric matrix and a dispersed phase of the inorganic material having the metal chalcogenide composition, e.g., tungsten disulfide ($WS_2$), and having a fullerene-like and/or tubular-like geometry. In some examples, the dispersed phase of the inorganic material having the metal chalcogenide composition, e.g., tungsten disulfide ($WS_2$), improves the polymers mechanical properties (e.g. toughness), and/or its tribological properties. The epoxy of the present example, may be employed as a matrixes for composites and as an adhesive, but other applications have been contemplated.

The method may begin with the formation of a dispersion. The dispersion was formed in a stirred bead mill, such as a stirred bead mill produced by WAB. The media to form the dispersion may be stirred in a vessel, and pumped into a closed chamber with $ZrO_2$ beads that stir at a high velocity. The grinded media may be circulated and stirred from between the chamber and the vessel of the stirred bead mill. It is noted that the dispersion may also be formed in a high-shear mixer, such as a high speed mixer sold under the tradename DISPERMAT® by VMA-GETZMANN GMBH.

The epoxy additive was comprised of the following materials, as included in\ Table 1:

TABLE 1

| Material | Percentage (by weight) |
|---|---|
| 815 (DGEBA resin diluted with butyl-glycidyl-ether) | 80.0 |
| Tungsten disulfide ($WS_2$) | 20.0 |

Manufacturing of the dispersion included weighing the epoxy resin, i.e., DGEBA resin diluted with butyl-glycidyl-ether, and tungsten disulfide $WS_2$ into a vessel. The composition, i.e., epoxy resin, i.e., DGEBA resin diluted with butyl-glcidyl-ether, and tungsten disulfide $WS_2$, was then mixed at low speeds. Thereafter, the composition was fed into the stirred bead mill and run for approximately 4 hours to form the dispersion. The dispersion was then collected from the vessel of the stirred bead mill and stored in a tin can.

Application of the dispersion can vary base on application, in which the concentration of the additive typically has to be determined for the specific application. Incorporation of the additive to the neat epoxy resin can be done with a high-shear mixer.

While the claimed methods and structures has been particularly shown and described with respect to preferred embodiments thereof, it will be understood by those skilled in the art that the foregoing and other changes in form and details may be made therein without departing from the spirit and scope of the presently claimed methods and structures.

What is claimed is:

1. A material including a nanostructure comprising:
   a first phase; and
   a second phase including a nanosphere being dispersed within the first phase, the nanosphere comprising at least one intercalation compound of a metal chalcogenide having molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof, wherein the intercalation compound is a multi-layered fullerene-like geometry.

2. The material of claim 1, wherein the material is a lubricant, and the first phase is a fluid medium that comprises Group I, II, III, IV, and V lubricants, synthetic oils, mineral oils or combinations thereof.

3. The material of claim 1, wherein the first phase is said synthetic oils, and said synthetic oil is selected from the group consisting of polyalpha-olefins, olefins, isomerized olefins, synthetic esters, phosphate esters, silicate esters, polyalkylene glycols and combinations thereof, or wherein the first phase is said bio-lubricants, and said bio-lubricants is selected from the group consisting of lanolin, whale oil, canola oil, castor oil, palm oil, sunflower seed oil, rapeseed oil, tall oil and combinations thereof.

4. The material of claim 1, further comprising a functionalizing agent selected from the group consisting of silanes, thiols, ionic surfactants, anionic surfactants, cationic surfactants, nonionic surfactants, amine based dispersant and surfactants, polymers, monomers and combinations thereof.

5. The material of claim 2, wherein the material is a drilling fluid, and the first phase is a drilling fluid medium selected from the group consisting of water, air and water, air and foaming agent, a water based mud, an oil based mud, a synthetic based fluid, and a combination thereof.

6. The material of claim 1, wherein the material is a composite material comprising a polymeric matrix for the first phase, wherein the second phase of the nanostructure is dispersed within the polymeric matrix, the polymer matrix having a composition selected from the group consisting of elastomers, epoxies, thermoplastic polymers, polyamides, polyphthalamide, polyphthalamide blend, poly-amide-imide, polyethylene, cross-linked polyethylene, polyester, polyurethanes, polyproplenes, and combinations thereof.

7. The material of claim 5, further comprising a carbon containing structure selected from the group consisting of a single wall carbon nanotube, a multi-wall carbon nanotube, graphite, carbon black, diamond like carbon (DLC) and a combination thereof.

8. The material of claim 1, wherein the nanospheres are free of oblong geometry, open ended oval shaped geometry, football shaped geometry, columnar shaped geometry, plate-like shaped geometry, or a combination thereof.

9. A coating comprising:
   a deposition surface; and
   a coating on the deposition surface, the coating including nanospheres of a metal chalcogenide having a fullerene-like geometry, wherein the metal chalcogenide composition has a molecular formula of $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof.

10. The coating composition of claim 9, wherein the coating further comprises a base material layer selected from the group consisting of chrome (Cr), chromium oxide (Cr2O3), diamond like carbon (DLC), carbon based materials, silicon carbide (SiC), silicon nitride (Si3N4), titanium carbide (TiC), nickel titanium (NiTi), aluminum oxide (AhO3), boron carbide (B4C), boron, tungsten cobalt (WCo) and combinations thereof.

11. The coating composition of claim 9, wherein the coating further comprises a base material layer selected from the group consisting base material layer comprises a polymer selected from the group consisting of elastomers, epoxies, thermoplastic polymers, polyamides, polyphthalamide, polyphthalamide blend, poly-amide-imide, polyethylene, cross-linked polyethylene, polyester, polyurethanes, polyproplenes, and combinations thereof.

12. The coating composition of claim 9, wherein the particles of the metal chalcogenide are functionalized with at least one of non-anionic surfactants, anionic surfactants, cationic surfactants, zwitterionic surfactants, surfactants, silanes, thiols, polymers and dopants.

13. The coating composition of claim 9, wherein the nanospheres are free of oblong geometry, open ended oval shaped geometry, football shaped geometry, columnar shaped geometry, plate-like shaped geometry, or a combination thereof.

14. A method of forming a material including a nanostructure comprising:
    forming a nanosphere phase being synthesized chemically at the nano-sized regime, the nanosphere phase comprising at least one intercalation compound of a metal chalcogenide having molecular formula MX2, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof, wherein the intercalation compound is a multi-layered fullerene-like geometry that is spherical; and
    mixing the nanosphere phase with a matrix phase.

15. The method of claim 14, wherein the nanosphere phase is formed by sulfidization of amorphous molybdenum and oxygen containing films in a reducing atmosphere at elevated temperatures.

16. The method of claim 14, wherein the nanosphere phase that is synthesized chemically at the nano-sized regime does not include physical particle size reduction mechanisms to provide said nano-sized regime.

17. The method of claim 14, wherein the matrix phase is a lubricant that comprises Group I, II, III, IV, and V lubricants, synthetic oils, mineral oils or combinations thereof.

18. The method of claim 14, wherein mixing further includes a functionalizing agent applied to the nanosphere phase, the functionalizing agent selected from the group consisting of silanes, thiols, ionic surfactants, anionic surfactants, cationic surfactants, nonionic surfactants, amine based dispersant and surfactants, polymers, monomers and combinations thereof.

19. The method of claim 14, wherein the matrix phase is a drilling fluid selected from the group consisting of water, air and water, air and foaming agent, a water based mud, an oil based mud, a synthetic based fluid, and a combination thereof.

20. The method of claim 14, wherein the material is a composite material, wherein the matrix phase is a polymer matrix having a composition selected from the group consisting of elastomers, epoxies, thermoplastic polymers, polyamides, polyphthalamide, polyphthalamide blend, poly-amide-imide, polyethylene, cross-linked polyethylene, polyester, polyurethanes, polypropylenes, and combinations thereof.

* * * * *